(12) United States Patent
Kitano et al.

(10) Patent No.: US 6,659,873 B1
(45) Date of Patent: Dec. 9, 2003

(54) GAME SYSTEM, GAME DEVICE CAPABLE OF BEING USED IN THE GAME SYSTEM, AND COMPUTER-READABLE MEMORY MEDIUM

(75) Inventors: Toyofumi Kitano, Kobe (JP); Kazuya Takahashi, Kobe (JP); Hirotaka Ishikawa, Tokyo-to (JP); Akinori Tamura, Tokyo-to (JP); Yasumi Takase, Ichikawa (JP); Takashi Nishibori, Tokyo-to (JP); Kei Nagaoka, Shiki (JP); Yoshiko Wada, Tokyo-to (JP); Yumi Yoshida, Tokyo-to (JP)

(73) Assignees: Konami Co., Ltd., Tokyo (JP); Konami Computer Entertainment Tokyo Co., Ltd., Tokyo (JP)

( * ) Notice: Subject to any disclaimer, the term of this patent is extended or adjusted under 35 U.S.C. 154(b) by 0 days.

(21) Appl. No.: 09/502,765

(22) Filed: Feb. 11, 2000

(30) Foreign Application Priority Data

Feb. 16, 1999 (JP) .......................................... 11-037835
Aug. 25, 1999 (JP) .......................................... 11-238670

(51) Int. Cl.⁷ .............................................. A63F 13/00
(52) U.S. Cl. ..................................... 463/42; 434/307 A
(58) Field of Search ..................... 434/307 A; 273/249; 84/609, 610, 611; 463/7, 1, 42, 43, 15, 23, 29; 345/3.2

(56) References Cited

U.S. PATENT DOCUMENTS

| | | | | |
|---|---|---|---|---|
| 4,657,247 A | * | 4/1987 | Okada | 465/247 |
| 4,752,068 A | * | 6/1988 | Endo | 463/15 |
| 4,752,069 A | * | 6/1988 | Okada | 463/23 |
| 4,858,930 A | | 8/1989 | Sato | |
| 5,014,982 A | * | 5/1991 | Okada et al. | 463/29 |
| 5,454,723 A | * | 10/1995 | Horii | 434/307 A |
| 5,489,103 A | * | 2/1996 | Okamoto | 463/29 |
| 5,552,799 A | * | 9/1996 | Hashiguchi | 345/3.2 |
| 5,747,716 A | * | 5/1998 | Matsumoto | 84/609 |
| 5,753,844 A | * | 5/1998 | Matsumoto | 84/609 |
| 5,782,692 A | * | 7/1998 | Stelovsky | 463/1 |
| 5,919,047 A | * | 7/1999 | Sone | 434/307 A |
| 5,961,386 A | * | 10/1999 | Sawaguchi | 463/43 |
| 6,132,315 A | * | 10/2000 | Miyamoto et al. | 463/43 |
| 6,183,367 B1 | * | 2/2001 | Kaji et al. | 463/42 |
| 6,338,680 B1 | * | 1/2002 | Connors | 463/43 |
| 6,371,854 B1 | * | 4/2002 | Ikeda et al. | 463/42 |
| 6,386,979 B1 | * | 5/2002 | Ho et al. | 463/43 |
| 6,406,372 B1 | * | 6/2002 | Turmell et al. | 463/43 |

FOREIGN PATENT DOCUMENTS

| | | |
|---|---|---|
| EP | 0974382 | 1/2000 |
| JP | 11-007504 | 1/1999 |

OTHER PUBLICATIONS

RPB Tuskuru 3 Official Guide Book, the sixth edition, published on Oct. 5, 1998, ASCII Corporation.

* cited by examiner

Primary Examiner—Jessica Harrison
Assistant Examiner—Y Cherubin
(74) Attorney, Agent, or Firm—Jordan and Hamburg LLP

(57) ABSTRACT

Data link-up between multiple game devices can be more flexibly achieved. A game system (1) comprises a game device for business (2) and a game device for use at home (3), which execute games in accordance with predetermined programs, it being possible to exchange information between these games devices, and the game device for business (2) comprises an information output device for outputting judgement information for judging whether predetermined conditions have been satisfied in the game device for business (2). The contents of the game executed on the game device for use at home (3) are changed based on the judgement information output from the game device for business (2). For example, when a predetermined game result has been achieved in the game device for business, the content of the judgement information is updated, and a hidden element appears in the game device for use at home (3) in correspondence therewith.

38 Claims, 31 Drawing Sheets

FIG.10

FLAG DATA D11

| HIDDEN TUNE X FLAG |
| --- |
| HIDDEN TUNE Y FLAG |
| HIDDEN TUNE Z FLAG |
| EDIT MODE FLAG |
| HIGH SCORE FLAG |
| MESSAGE FLAG |
| SPECIFICATION UPDATE FLAG |

FIG.11

HIGH SCORE DATA D13

| TOTAL SCORE |
| --- |
| SCORE OF TUNE A |
| SCORE OF TUNE B |

FIG.12

ADDITINAL TUNE DATA D13

| NUMBER OF ADDITINAL TUNE |
| --- |
| TITLE OF TUNE $\alpha$ |
| TITLE OF TUNE $\beta$ |

FIG.27

| NAME OF CONTROL MEMBER | REFERENCE CODE | OPERATION |
|---|---|---|
| UP KEY | PB1 | SCROLL UP EDIT WINDOW 231 |
| DOWN KEY | PB2 | SCROLL DOWN EDIT WINDOW 231 |
| LEFT KEY | PB3 | SWICH TARGET FOR OPERATION BETWEEN 1P AND 2P IN WINDOW 232 AND WINDOW 231 |
| RIGHT KEY | PB4 | SWICH TARGET FOR OPERATION BETWEEN 1P AND 2P IN WINDOW 232 AND WINDOW 231 |
| △ BUTTON | PB5 | INSERT OR DELETE ↑OBJECT |
| × BUTTON | PB6 | INSERT OR DELETE ↓OBJECT(CANCEL AT COMMAND SELECT) |
| □ BUTTON | PB7 | INSERT OR DELETE ←OBJECT |
| ○ BUTTON | PB8 | INSERT OR DELETE →OBJECT(DATERMINE AT COMMAND SELECT) |
| L1 BUTTON | PB9 | CHANGE NUMBER OF BEATS |
| L2 BUTTON | PB10 | INSERT OR DELETE AREA SELECTION MARK 233 |
| R1 BUTTON | PB11 | SCROLL WINDOW 231 AT HIGH SPEED SIMULTANEOUS TO PB1 AND PB2 |
| R2 BUTTON | PB12 | DELETE ALL OBJECTS AT POSITION OF CURSOR 231a |
| SELECT BUTTON | PB13 | SWITCH DISPLAY OF INFORMATION IN CENTER OF WINDOW 231 |
| START BUTTON | PB14 | RETRIEVE AREA SELECTION MENU 235 |

FIG. 33A

| OPERATION MEMBER | REFERENCE SYMBOLS | PROCESSING CONTENTS |
|---|---|---|
| DIRECTION KEYS | PB1 TO PB4 | SWITCH SELECTED ITEM |
| ○ BUTTON | PB8 | DETERMINE ITEM |
| START BUTTON | PB14 | SWITCH TO PAINT MODE |

FIG. 33B

| NAME OF OPERATION MEMBER | REFERENCE SYMBOLS | PROCESSING CONTENTS |
|---|---|---|
| DIRECTION KEYS | PB1 TO PB4 | MOVE CURSOR |
| △ BUTTON | PB5 | WRITE IN PREDETERMINED RANGE BASED ON CURSOR POSITION |
| X BUTTON | PB6 | CHANGE COLOR NUMBER AT CURSOR POSITION TO 0 |
| □ BUTTON | PB7 | ACQUIRE COLOR NUMBER AT CURSOR POSITION |
| ○ BUTTON | PB8 | WRITE AT CURSOR POSITION |
| L1 BUTTON | PB9 | CHANGE COLOR NUMBER TO NUMBER IMMEDIATELY PRECEDING IT |
| L2 BUTTON | PB10 | OFFICIAL MARK ANIMATION |
| R1 BUTTON | PB11 | CHANGE COLOR NUMBER TO NUMBER IMMEDIATELY FOLLOWING IT |
| R2 BUTTON | PB12 | ANIMATION OF MARK BEING PAINTED |
| SELECT BUTTON | PB13 | RETRIEVE GUIDE SCREEN |
| START BUTTON | PB14 | SWITCH TO MENU MODE |

GAME SYSTEM, GAME DEVICE CAPABLE OF BEING USED IN THE GAME SYSTEM, AND COMPUTER-READABLE MEMORY MEDIUM

BACKGROUND OF THE INVENTION

1. Field of the Invention

The present invention relates to a game system capable of linking data between multiple game devices, for example, a game device for business and a game device for use at home, and coordinating together games executed on the devices.

2. Description of the Related Art

A game device for business (commercial use) which can only be played in a range corresponding to an inserted financial value, and a game device for use at home which can be freely and repeatedly played by setting a memory medium such as a CD-ROM having software for games written therein, are types of game device. Japanese Patent Application Laid-Open (JP-A) No. S63-242293 discloses a game system capable of exchanging data between these game devices, wherein role-playing games and simulation games are executed on the game device for use at home, characters appearing in the game are developed, and data relating to the development of the characters are input as initial capability data of the characters appearing in a game executed on the game device for business.

Furthermore, Japanese Patent Application Laid-Open (JP-A) No. HEI8-299596 discloses a game system in which a measurement of a player's physical strength, taken by a physical-strength-measuring game device, is stored in an IC memory, and the capabilities (e.g. jumping power and kicking power in a game) of characters operated by a player on a fighting game device are judged by referring to the data in the IC memory.

In the games industry, when a new game is made available on the game devices for business, some times later, software enabling a similar game to be played on a game device for use at home is marketed by the same company or a related company. Conversely, sometimes the software for the game device for use at home appears first, and a game having identical content is later made available for playing on game devices for business. This sort of activity is generally termed "Transplanting". When transplanting, since the game contents are identical or closely similar at the transplant source and at the transplant destination, it may be imagined that it is comparatively easy to link up data in the manner of the patent applications mentioned above.

However, in the game systems of the applications mentioned above, since the data specifying the capabilities of characters appearing in the competitive game is common to both game devices, there are the following limitations.

Generally, capabilities of characters are judged by a combination of a great number of parameters, and in order to share the data among different game devices, the treatment of the respective parameters in the software of each of the game devices must be judged in detail beforehand. Consequently, the development schedules of software of multiple game devices to be linked must be synchronised, and there occurs limitations on developing software for other games devices to match the software specifications of a specific game device which has already been developed. These limitations make it practically impossible to link up the data.

Recently, musical games devices such as a game device which instructs the player to dance by operating an input device such as a stepping board in time with music, and a game device which simulates playing as a disc jockey or playing on various types of musical instruments, are becoming popular. These game devices do not involve playing a game while operating specific characters. Therefore, the conventional link-up methods of the patent applications described above cannot be applied with no modification. A data link-up for a musical game has not previously been attempted, and consequently a data link-up system appropriate for such game contents must be considered afresh.

Moreover, link-up in conventional game systems mainly concentrate on playing the game by inputting data created in the game device for use at home to the game device for business, and do not consider the usefulness of transferring the data in the opposite direction.

SUMMARY OF THE INVENTION

Accordingly, it is an object of the present invention to provide a game system which is enhanced in its realisation and novelty by making a data link-up among multiple game devices more flexible, and to provide particular data link-up suitable for musical games.

The present invention will be explained below. To facilitate understanding of the present invention, reference symbols from the accompanying drawings are mentioned in brackets, but the constitution of the present invention is not limited to those shown in the drawings.

A first aspect of the game system (1) of the invention comprises first and second game devices (2, 3) for executing games in compliance with predetermined programs, capable of exchanging information between the game devices, the first game device (2) comprising an information output device (51, 80) for outputting judgement information (D11) for judging whether or not predetermined conditions have been satisfied in a game executed on the game device; and the second game device comprising a game content controller (101) for changing the content of the game executed on the second game device based on the judgement information output from the first game device.

According to this invention, in a game executed on the first game device, since the second game device judges only whether or not predetermined conditions have been satisfied and changes the contents of its game, the mutual relationship between the game devices need not be minutely specified beforehand as when the capability parameters of characters are transferred. For example, the judgement information may be flag information of one bit, and there is no particular need to recognise how the second game device changes the content of the game in accordance with the state of the flag at the development stage of the game to be executed by the first game device. Furthermore, in the development stage of the game executed on the second game device, there is no particular need to check the conditions on which the judgement information output from the first game device is based. Consequently, there are no limitation relating to the stage of development, enabling multiple game devices to be more flexibly and easily linked together.

A second aspect of the invention comprises the game system according to the first aspect, further comprising memory devices (4, 5) for link-up, functioning as media for exchanging information between the first game device (2) and the second game device (3), the judgement information being transmitted from the first game device to the second game device via the memory device for link-up. Therefore, when for example exchanging information between a game device for business and a game device for use at home, it is not necessary to carry the game device for use at home to the place where the game device for business is installed. The memory devices for link-up may for example comprise a portable miniturized semiconductor memory, and the like.

A third aspect of the invention comprises the game system according to the first aspect, wherein the judgement information is transmitted via a predetermined communications medium from the first game device (2) to the second game device (3). In this invention, there is no need to provide a memory device for linking up separately from the game devices.

A fourth aspect of the invention comprises the game system according to one of the first to third aspects, wherein the information output device changes the content of the judgement information prior to outputting it, based on a play result of a game executed on the first game device (2). As a consequence, the contents of the game of the second game device can be changed in accordance with the game result of the first game device, and therefore, since the player's interest does not incline toward only one of the game devices, the first game device and the second game device both remain highly valuable. Play results may, for example, comprise high scores or numbers of stages cleared.

A fifth aspect of the invention comprises the game system according to one of the first to fourth aspects, wherein the game content controller provided in the second game device (3) comprises the following devices for changing the content of the game: a judging device 101 for judging whether or not permission has been given for a predetermined hidden element to appear in the game, based on the judgement information; and a hidden element controller (101) for making a hidden element appear in the game when the permission has been given, and prohibit the appearance when the permission has not been given.

Hidden elements are concepts incorporated in many games, like a stage which has been unselectable appears when certain conditions are fulfilled, or characters which can be selected by the player are added. In the present invention, the state of the game in the first game device influences whether or not the hidden elements should appear in the second game device. Consequently, the game devices can be set so that hidden elements appear infrequently or not at all when the player continuously plays only the second game device, but appear relatively easily when he or she plays the first game device. As a result, the player's interest is maintained in both the first and second game devices, keeping their values high.

A sixth aspect of the invention comprises the game system according to the fifth aspect, wherein the information output device provided in the first game device (2) outputs after setting permission for the judgement information when the play result of the game is equal to or greater than a fixed standard, and setting no permission for the judgement information when the play result of the game is below the fixed standard; and the judging device provided in the second game device (3) judges that an appearance has been permitted when the judgement information is permitted, and judges that an appearance has not been permitted when the judgement information is not permitted.

Therefore, when the player wishes to make the hidden elements of the second game device appear, he or she has to play the first game device until he or she achieves a play result above a fixed standard. Consequently, the value of the first game device is increased. In particular, when the second game device is a game device for use at home and the first game device is a game device for business, the player tends to prefer the game device for use at home for financial reasons. The present invention is able to correct this point, and hold the player's interest in the game device for business over a long period of time.

A seventh aspect of the invention comprises the game system according to one of the fifth and sixth aspects, wherein the second game device (3) further comprises as devices for executing the game an input device (112) having at least one operation member for outputting a signal in correspondence with the operation state of the operation member; memory devices for game (7, 103) in which are stored music data for reproducing multiple tunes, and guide data for each tune required for guiding the operations of the input device in correspondence with tunes reproduced based on the music data; a tune selector (101) for selecting one tune from the multiple tunes; music reproduction devices (101, 106, 108) for reproducing the selected tune based on music data corresponding to the selected tune; and operation guide devices (101, 104, 109) for instructing a player to operate the input device in correspondence with the reproduction of the tune by the music reproduction devices, based on guide data corresponding to the selected music data; some of the multiple tunes being set as the hidden elements; and when the permission for appearance has been given, the hidden element controller enables the selector to select a tune set as the hidden element, and when permission for appearance has not been given, the hidden element controller does not enable the tune set as the hidden element to be selected.

According to this invention, a musical game, in which the player enjoys operating the input device in time with the music, can be executed on the second game device. Then, since some of the tunes, which are important elements for enjoying the musical game, are set as hidden elements, the player also actively plays the first game device in order to make the hidden tunes appear. Then, when the game on the first game device has satisfied a predetermined condition, the hidden tune needs only to be made selectable in the second game device, enabling link-up to be more flexibly and easily achieved than a case when the capabilities of characters are transferred, since the arrangements and processing for link-up between the game devices are simplified.

An eighth aspect of the invention comprises the game system according to one of the fifth to sixth aspects, wherein the second game device (3) comprises as devices for executing the game an input device (112) having at least one operation member (112a, 112b)for outputting a signal in correspondence with the operation state of the operation member; a memory device for game (7, 103) in which are stored music data for reproducing a predetermined tune, and guide data required for guiding the operations of the input device in correspondence with tunes reproduced based on the music data; a music reproduction device (101, 106, 108) for reproducing the predetermined tune based on the music data stored in the memory device for game; and an operation guide device (101, 104, 109) for instructing a player to operate the input device in correspondence with the reproduction of the tune by the music reproduction device, based on the guide data stored in the memory device for game. Furthermore, the second game device comprises a mode selector (101) for selecting one mode from a plurality of modes comprising an edit mode set as the hidden elements; an edit device (101) for creating the guide data in accordance with an operation of the input device when the edit mode has been selected; and when permission for appearance has been given, the hidden element controller (101) enables the selector to select the edit mode, and when permission for appearance has not been given, the hidden element controller does not enable the edit mode to be selected.

According to this invention, as in the invention of the seventh aspect, a musical game, in which the player enjoys operating the input device in time with the music, can be executed on the second game device. In this musical game, the specified contents of the input operation of the operation guide device has a considerable influence on the feeling of the game when it is played, the interest being different for each player. Accordingly, by allowing the player himself or herself to edit the guide data, which forms a basis for the specifications for these operations, the player can develop a play environment in accordance with his or her own tastes, increasing his or her interest in the game over a longer period. In the present invention, since the mode for editing the guide data is regarded as one of the hidden elements, the player also actively plays the first game device, as in the invention according to the seventh aspect. Consequently, the player's interest can be divided evenly between both game devices, increasing their relative values.

A ninth aspect of the invention comprises the game system according to the eighth aspect, wherein the first game device (2) further comprises as devices for executing the game an input device (30) having at least one operation member for outputting a signal in correspondence with the operation state of the operation member; a memory device for game (6, 53) in which are stored music data for reproducing the same tune as that reproduced by the music reproducing device of the second game device (3), and guide data required for guiding the operations of the input device in correspondence with tunes reproduced based on the music data; a music reproduction device (51, 60, 56) for reproducing the tune based on the music data stored in the memory device for the game; and an operation guide device (51, 54, 14) for instructing a player to operate the input device in correspondence with the reproduction of the tune by the music reproduction device, based on the guide data stored in the memory device for game; and information for identifying content of guide data created by the edit device can be transmitted from the second game device to the first game device, and the operation guide device of the first game device can specify operations to the player based on the transmitted information.

According to this invention, a musical game, in which a player enjoys operating an input device in time with the music, can be executed in the first game device and the second game device. Since this musical game mainly involves tunes and operations commands in accordance with the tunes, provided that the same tunes can be reproduced and the same operation commands can be offered to the player, almost same play environments can be created even when the exteriors and processing capabilities of the devices are different, as in a game device for business and a game device for use at home. Accordingly, when operation commands can be applied in one game device based on the contents of guide data created in another game device, similar games can be enjoyed using data created by the player himself or herself on different game devices Here, since the game device for use at home has no time restriction for playing the game, and therefore enables the player to take his or her time over the editing operation, it is particularly suitable as the second game device of the present invention. Furthermore, since a game device for business naturally allows a player to show his or her playing to other people, it is suitable as the first game device of the present invention. By playing the game based on data created by himself or hers elf in such an environment, the player can feel a heightened sense of satisfaction. Moreover, he or she is able to practise on the game device for use at home as often as he or she likes based on that data.

A tenth aspect of the invention comprises the game system according to one of the eighth and ninth aspects, wherein the guide data comprises timing data defining timings for operating the operation members of the input device, and the edit device can create the timing data. According to this invention, the player can use timing data created by using the second game device on the first game device, thereby enabling him or her to show off to others the operations adjusted by himself or herself.

An eleventh aspect of the invention comprises the game system according to one of the first to tenth aspects, wherein one of the first game device and the second game device is a game device for business (2), and the other is a game device for use at home (3). The invention described above in the first to tenth aspects enables games to be flexibly and easily linked, and is therefore suitable for a game system comprising a game device for business and a game device for use at home. In particular, when transplanting software between these game devices, the invention of the first to tenth aspects can be effectively utilised, since it allows deviation in the schedules of the software developments.

A twelfth aspect of the invention comprises a game system (1) comprising first and second game devices (2, 3) for executing games in compliance with predetermined programs, it being possible to exchange information between the game devices, the first and second game devices respectively comprising as devices for executing the games an input device (30, 112) having at least one operation member for outputting a signal in correspondence with the operation state of the operation member; a memory device for game (6, 7, 53, 103) in which are stored music data for reproducing the same tunes on the first game device and the second game device respectively, and guide data required for guiding the operations of the input device in correspondence with tunes reproduced based on the music data; a music reproduction device (51, 60, 56, 101, 106, 108) for reproducing a tune based on the music data stored in the memory device for game; and an operation guide device (51, 54, 14, 101, 104, 109) for displaying to a player operations of the input device in correspondence with the reproduction of the tune by the music reproduction device, based on the guide data stored in the memory device for game; the second game device (3) comprising an edit device (101) for creating the guide data in accordance with an operation of the input device, and an information output device (101) for outputting information for identifying the contents of the created guide data; and the operation guide device of the first game device being capable of specifying operations to the player based on information for identifying the contents of the created guide data output from the second game device.

According to this invention, as explained in relation to the invention of the ninth aspect, the same game can be played on game devices of different constitutions using data created by the player himself or herself. In particular, when a game device for use at home is set as the second game device and a game device for business is set as the first game device, a wide range of play which is not available on a single game device can be provided by the player by utilising the different characteristics of the devices, noticeably increasing the value of the software of the game device for business and the game device for use at home executing a musical game.

A thirteenth aspect of the invention comprises the game system according to the twelfth aspect, further comprising a memory device for link-up (4, 5), functioning as a medium for exchanging information between the first game device (2) and the second game device (3), information for identifying the contents of the timing data being transmitted from the second game device to the first game device via the memory device for link-up. Therefore, as in the invention according to the second aspect, information can easily be exchanged between the game device for business and the game device for use at home.

A fourteenth aspect of the invention comprises the game system according to the twelfth aspect, wherein information for identifying the contents of the timing data is transmitted via a predetermined communications device from the second game device to the first game device. Therefore, as in the invention of the third aspect, it is not necessary to provide a memory device for link-up separate to the game devices.

A fifteenth aspect of the invention comprises the game system according to the twelfth aspect, wherein the guide data comprises timing data defining timings for operating the operation members of the input device, and the edit device can create the timing data. Therefore, the operation timing of the input device can be adjusted in line with the player's taste.

In the game system according to the twelfth aspect, when a timing for operating the operation members of the input device has arrived, the operation guide device can guide predetermined indicator (e.g. 204L) to a predetermined position (e.g. the same position where the mark 203L is located) in the game screen (200)(sixteenth aspect). Then, the edit device can set the period of time in which the indicator reaches the predetermined position in accordance with an operation of the input device (seventeenth aspect). In this case, the player adjusts the timing for operating the input device as he or she wishes. Furthermore, the guide data may comprise image data required to display the indicator, and the edit device may be able to create the image data required to display the indicator (eighteenth aspect). In this case, the player is able to adjust the indicator displayed in the game screen as he or she wishes. Then, the indicator can be created in, for example, by the game device for use at home, and used on the game device for business, thereby advertising this creativity to a wide group of people. Consequently, the desire to play the game device for business, and the desire to create indicator on the game device for use at home, are both stimulated, increasing the player's interest in both game devices.

A nineteenth aspect of the game system (1) of the present invention comprises first and second game devices (2, 3) for executing games in compliance with predetermined programs, and a memory device for link-up (4, 5), functioning as a medium for exchanging information between these game devices; the first game device (2) comprising an information memory device (51, 80) for storing announcement information (D12, D13, D14) in the memory device for guide intended as a notification to the player; and the second game device (3) comprising an information display device (101, 104) for reading the announcement information stored in the memory device for link-up, and displaying it on a screen of a display device (109) provided in the second game device.

According to this invention, information stored in the memory device for link-up in the first game device can be displayed and confirmed in the second game device. In this case, particularly when a game device for business is set as the first game device and a game device for use at home is set as the second game device, various kinds of information can be transmitted from the game device for business via the memory device for link-up to each home. The announcement information may comprise the results of the game such as high scores achieved by the player on the first game device, information of the specification alterations or the like relating to the first game device, advertisement for individual shops where the first game device is installed, and information about events.

A twentieth aspect of the invention comprises the game system according to the nineteenth aspect, the first game device further comprising an information input device (68, 30, 51) for inputting the announcement information. Therefore, the operator and the like of the first game device can input given textual information as the announcement information, and transmit it to the place where the second game device is installed.

A twenty-first aspect of the invention comprises the game system according to one of the nineteenth and twentieth aspects, wherein the first game device (2) and the second game device (3) execute practically identical games, and the announcement information comprises information (D12) corresponding to play results of the first game device.

According to this invention, since practically identical games are executed on the first and second game devices, play results such as game results obtained on each game device can be compared and used for a reference during the play. In particular, when results such as high scores achieved on the game device for business are displayed on the game device for use at home, the same game can be repeatedly practised on the game device for use at home with reference to the results. It can be judged whether or not contrasting games are practically identical by, for example, referring to their method of play, the rules, screen constitution, game progression, and the like.

A twenty-second aspect of the invention comprises the game system according to one of the nineteenth and twentieth aspects, wherein the first game device and the second game device (2, 3) each comprise the following devices for executing games an input device (30, 112) having at least one operation member for outputting a signal in correspondence with the operation state of the operation member; a memory device for game (6, 7, 53, 103) in which are stored music data for reproducing a plurality of tunes, and guide data for each tune required for guiding the operations of the input device in correspondence with tunes reproduced based on the music data; a tune selector (51, 101) for selecting one tune from the plurality of tunes; a music reproduction device (51, 60, 56, 101, 106, 108) for reproducing the selected tune based on the music data corresponding to the selected tune; an operation guide device (51, 54, 14, 101, 104, 109) for instructing a player to operate the input device in correspondence with the reproduction of the tune by the music reproduction device, based on guide data corresponding to the selected music data; and an evaluation device (51, 101) for evaluating play contents of the player based on the deviation between the operations of the input device as specified by the operation guide device, and the player's actual operation of the input device; the information memory device (51, 80) of the first game device being capable of storing information (D12) corresponding to the evaluation results of the evaluation device, provided in the first game device, as the announcement information in the memory device for link-up (4, 5).

In this invention, musical games, in which the input device is operated in compliance with commands supplied in time with the music, are executed on the first game device and the second game device. In the musical games, if the tunes are matched to the operation commands of the tunes, approximately similar play environments can be created even when the exteriors and processing capabilities of the devices are different, as described above. Then, since the player can check the evaluation of the play contents of the first game device on the second game device, the evaluation can be utilised as a standard during the practice of the game using the second game device.

A twenty-third aspect of the game system of the present invention comprises first and second game devices (2,3) for executing games in compliance with predetermined programs, capable of exchanging information between the game devices, wherein the first and second game devices each comprise the following devices for executing the games an input device (30, 112) having at least one operation member for outputting a signal in correspondence with the operation state of the operation member; a memory device for the game (6, 7, 53, 103) in which are stored music data for reproducing a plurality of tunes, and guide data for each tune required for guiding the operations of the input device in correspondence with tunes reproduced based on the music data; a tune selector (51, 101) for selecting one tune from the plurality of tunes; a music reproduction device (51, 60, 56, 101, 106, 108) for reproducing the selected tune based on music data corresponding to the selected tune; and an operation guide device (51, 54, 14, 101, 104, 109) for instructing a player to operate the input device in correspondence with the reproduction of the tune by the music reproduction device, based on guide data corresponding to the selected music data; and an evaluation device (51, 101) for evaluating play contents of the player based on the deviation between the operations of the input device as specified by the operation guide device, and the player's actual operation of the input device; the first game device comprising an information output device (51, 80) for outputting information (D12) corresponding to the evaluation results of the evaluation device provided in the first game device; and the second game device comprising an information display device (101, 104) for displaying the evaluation results of the evaluation device provided in the first game device on a display device (109) provided in the second game device, based on information corresponding to the evaluation results output from the first game device.

According to this invention, as in the invention of the twenty-second aspect, an evaluation of the play contents of the first game device can be checked by the player on the second game device, enabling him or her to practise the game on the second game device and aim for that evaluation.

A twenty-fourth aspect of the invention comprises the game system according to one of the nineteenth to twenty-third aspects, wherein the first game device is a game device for business (2), and the second game device is a game device for use at home (3). Therefore, as in the invention of the nineteenth aspect, various information can be transmitted from the game device for business to each home.

A twenty-fifth aspect of the invention comprises a game device (2) capable of executing a game in compliance with a predetermined program and exchanging information with another game device (3), comprising a judging device (51) for judging whether or not predetermined conditions have been satisfied in the executed game; and an information output device (51, 80) for outputting judgement information D11 corresponding to the judgement result of the determinator, to be used in the other game device. This game device can be used as the first game device in the game system of the first aspect.

A twenty-sixth aspect of the invention comprises the game device according to the twenty-fifth aspect, wherein the information output device stores the judgement information in a memory device for link-up 4, 5, from which information can be read by the other game device. This game device can be used as the first game device in the game system of the second aspect.

A twenty-seventh aspect of the invention comprises the game device according to the twenty-fifth aspect, wherein the information output device outputs the judgement information to the other game device via a predetermined communications medium. This game device can be used as the first game device in the game system of the third aspect.

A twenty-eighth aspect of the invention comprises a game device (3) capable of executing a game in compliance with a predetermined program and exchanging information with another game device (2), comprising an information detector (101) for detecting judgement information (D11), for judging whether or not predetermined conditions have been satisfied in a game executed in the other game device, output from the other game device; and a game content controller (101) for changing the contents of a game executed by the game device itself, based on the detected judgement information. This game device can be used as the second game device in the game system of the first aspect.

A twenty-ninth aspect of the invention comprises the game device according to the twenty-eighth aspect, wherein the judgement information is stored in a predetermined memory device for link-up (4, 5) from the other game device, and the information detector detects the judgement information stored in the memory device for link-up. This game device can be used as the second game device in the game system of the second aspect.

A thirtieth aspect of the invention comprises the game device according to the twenty-eighth aspect, wherein the information detector detects the judgement information via a predetermined communications medium. This game device can be used as the second game device in the game system of the third aspect.

A thirty-first aspect of the invention comprises the game device according to one of the twenty-eighth to thirtieth aspects, wherein the game content controller (101) comprises a judging device (101) for judging whether permission has been given for a predetermined hidden element to appear in the game, based on the judgement information (D11); and a hidden element controller (101) for making a hidden element appear in the game when permission has been given, and prohibiting the appearance of the hidden element when permission has not been given. This game device can be used as the second game device in the game system of the fifth aspect.

A thirty-second aspect of the invention comprises the game device according to the thirty-first aspect, further comprising an input device (112) having at least one operation member for outputting a signal in correspondence with the operation state of the operation member; a memory device for the game (7, 103) in which are stored music data for reproducing multiple tunes, and guide data for each tune required for guiding the operations of the input device in correspondence with tunes reproduced based on the music data; a tune selector (101) for selecting one tune from the multiple tunes; a music reproduction device (101, 106, 108) for reproducing the selected tune based on music data corresponding to the selected tune; and an operation guide device (101, 104, 109) for instructing a player to operate the input device in correspondence with the reproduction of the tune by the music reproduction device, based on guide data corresponding to the selected music data; part of the plurality of tunes being set as the hidden elements; and when permission for appearance has been given, the hidden element controller enables the selector to select a tune set as the hidden element, and when permission for appearance has not been given, the hidden element controller does not enable the tune set as the hidden element to be selected. This game device can be used as the second game device in the game system of the seventh aspect.

A thirty-third aspect of the invention comprises the game device according to the thirty-first aspect, further comprising an input device (112) having at least one operation member for outputting a signal in correspondence with the operation state of the operation member; a memory device for the game (7, 103) in which are stored music data for reproducing a predetermined music, and guide data for each tune required for guiding the operations of the input device in correspondence with tunes reproduced based on the music data stored in the memory device for game; a music reproduction device (101, 106, 108) for reproducing the predetermined tune based on music data stored in the memory device for game; and an operation guide device (101, 104, 109) for instructing a player to operate the input device in correspondence with the reproduction of the tune by the music reproduction device, based on the guide data stored in the memory device for game; a mode selector (101) for selecting one mode from a plurality of modes comprising an edit mode set as the hidden elements; an edit device (101) for creating the guide data in accordance with an operation of the input device when the edit mode has been selected; and when permission for appearance has been given, the hidden element controller enables the selector to select the edit mode, and when permission for appearance has not been given, the hidden element controller does not enable the edit mode to be selected. This game device can be used as the second game device in the game system of the eighth aspect.

A thirty-fourth aspect of the invention comprises the game device according to the thirty-third aspect, wherein the guide data comprises timing data defining timings for operating the operation members of the input device, and the edit device can create the timing data. Therefore, the player can adjust the timings for operating the input device as he or she wishes.

A thirty-fifth aspect of the invention comprises a game device (2) capable of executing a game in compliance with a predetermined program and exchanging information with another game device, comprising an input device (30) having at least one operation member for outputting a signal in correspondence with the operation state of the operation member; a memory device for the game (6, 53) in which are stored music data for reproducing a predetermined tune, and guide data required for guiding the operations of the input device in correspondence with tune reproduced based on the music data; a music reproduction device (51, 60, 56) for reproducing the tune based on the music data stored in the memory device for the game; and an operation guide device (51, 54, 14) for instructing a player to operate the input device in correspondence with the reproduction of the tune by the music reproduction device, based on the guide data stored in the memory device for game; and an information receiver (51, 80) for receiving information (F2) for identifying contents of guide data corresponding to the predetermined tune prepared by the other game device; the operation guide device being capable of specifying operations to the player based on the information received by the information receiver. This game device can be used as the first game device in the game system of the ninth and twelfth aspects.

A thirty-sixth aspect of the invention comprises the game device according to the thirty-fifth aspect, wherein the guide data comprises timing data defining timings for operating the operation members of the input device, and the information receiver receives information for identifying the contents of the timing data. This game device can be used as the first game device in the game system of the fifteenth aspect.

A thirty-seventh aspect of the invention comprises the game device according to the thirty-fifth aspect, wherein, when a timing at which the operation member of the input device is to be operated has arrived, the operation guide device guides the operation by relatively moving a predetermined indicator (e.g. 204L) to a predetermined position (e.g. a position overlapping the 203L) in a game screen and displaying it at that position. This game device can be used as the first game device in the game system of the sixteenth aspect.

A thirty-eighth aspect of the invention comprises the game device according to the thirty-seventh aspect, wherein the information receiver receives information relating to a time period in which the indicator reaches the predetermined position, as the information for identifying contents of the guide data. This game device can be used as the first game device in the game system of the seventeenth aspect.

A thirty-ninth aspect of the invention comprises the game device according to the thirty-seventh aspect, wherein the guide data comprises image data required for displaying the indicator, and the information receiver receives the information relating to the image data required for displaying the indicator as the information for identifying the content of the guide data. This game device can be used as the first game device in the game system of the eighteenth aspect.

A fortieth aspect of the invention provides a game device comprising an input device (112) having at least one operation member for outputting a signal in correspondence with the operation state of the operation member; a memory device for the game (103) in which are stored music data for reproducing predetermined tunes, and guide data for each tune required for guiding the operations of the input device in correspondence with the tune reproduced based on the music data; a music reproduction device (101, 106, 108) for reproducing the tune based on the music data stored in the memory device for the game; an operation guide device (101, 104, 109) for instructing a player to operate the input device in correspondence with the reproduction of the tune by the music reproduction device, based on the guide data stored in the memory device for game; an edit device (101) for creating the guide data in accordance with an operation of the input device; an information output device (101) for outputting information for identifying contents of created guide data; and the operation guide device guiding the operation by relatively moving predetermined indicator (e.g. 204L) to a predetermined position in a game screen (200) and displaying them at that position, when a timing at which the operation member of the input device is to be operated has arrived; the guide data comprising image data required to display the indicator; and the edit device being capable of creating the image data required to display the indicator. This game device can be used as the second game device in the game system of the sixteenth aspect.

A forty-first aspect of the invention provides a game device for business (2) comprising an input device (30) having at least one operation member for outputting a signal in correspondence with the operation state of the operation member; a memory device for a game (6, 53) in which are stored music data for reproducing predetermined tunes, and guide data for each tune required for guiding the operations of the input device in correspondence with the tune reproduced based on the music data; a music reproduction device (51, 60, 56) for reproducing the tune based on music data stored in the memory device for the game; an operation guide device (51, 54, 14) for instructing a player to operate the input device in correspondence with the reproduction of the tune by the music reproduction device, based on the guide data stored in the memory device for game; an evaluation device (51) for evaluating play contents of the player based on the deviation between the operations of the input device as specified by the operation guide device, and the player's actual operation of the input device; and an information memory device (51, 80) for storing information (D12) corresponding to an evaluation result of the evaluation device in a memory device (4, 5) used in the game device for use at home (3), in a state readable by the game device for use at home. This game device can be used as the first game device in the game system of the twenty-second aspect.

A forty-second aspect of the invention provides a game device for business (2) with which play is permitted in a range set in accordance with a financial value inserted by a player, comprising an information creator (51) for creating information comprising text; and an information memory device (51, 80) for storing information created by the information creator in a memory device (4, 5) used in the game device for use at home (3), in a state readable by the game device for use at home. This game device can be used as the first game device in the game system of the nineteenth aspect.

A forty-third aspect of the invention comprises the game device according to the forty-second aspect, wherein the information creator (51) creates the information in accordance with operations of an input device (68, 30) provided in the game device for business. This game device can be used as the first game device in the game system of the twentieth aspect.

A forty-fourth aspect of the invention provides a computer-readable memory medium (6) in which is stored a program for executing a predetermined game on a game device (2) using a computer, the program giving the computer functions of a judging device for judging whether or not predetermined conditions have been satisfied in the game; and an information output device for outputting judgement information in correspondence with the judgement result of the judging device for use in another game device (3). By reading and executing the program stored in the memory medium of this invention with a computer, the game device of the twenty-fifth aspect can be formed.

A forty-fifth aspect of the invention provides a computer-readable memory medium (7) in which is stored a program for executing a predetermined game on a game device (3) using a computer, the program giving the computer functions of an information detector for detecting judgement information (D11) output for judging whether or not predetermined conditions have been satisfied in a game executed on another game device (2), when the judgement information has been output from the other game device; and a game content controller for changing the contents of a game executed by the game device itself, based on the detected judgement information. By reading and executing the program stored in the memory medium of this invention with a computer, the game device of the twenty-eighth aspect can be formed.

A forty-sixth aspect of the invention provides a computer-readable memory medium (6) in which are stored music data for reproducing a predetermined tune, guide data required for guiding the operations of an input device (30) of a game device (2) in correspondence with tunes reproduced based on the music data, and a program for executing a musical game using the music data and the guide data on a computer of a game device, the program giving the computer functions of an information receiver for receiving information (F2) for identifying contents of guide data corresponding to the predetermined tune prepared by another game device (3); and an operation specifier for specifying to the player operations of the input device in correspondence with the reproduction of the predetermined tune, based on the information received by the information receiver. By reading and executing the program stored in the memory medium of this invention with a computer, it can form the game device of the thirty-fifth aspect.

A forty-seventh aspect of the invention provides a computer-readable memory medium (6) in which are stored music data for reproducing a predetermined tune, guide data required for guiding the operations of an input device (30) of a game device (2) in correspondence with tunes reproduced based on the music data, and a program for executing a musical game using the music data and the guide data on a computer of a game device, the program giving to the computer functions of a music reproduction device for reproducing the tune based on the music data; an operation guide device for instructing a player to operate the input device in correspondence with the reproduction of the tune by the music reproduction device, based on the guide data; an evaluation device for evaluating play contents of the player based on the deviation between the operations of the input device as specified by the operation guide device, and the player's actual operation of the input device; and an information memory device for storing information (D12) corresponding to an evaluation result of the evaluation device in a memory device (4, 5) used in a game device for use at home (3), in a state readable by the game device for use at home. By reading and executing the program stored in the memory medium of this invention with a computer, the game device of the forty-first aspect can be formed.

A forty-eighth aspect of the invention provides a computer-readable memory medium (7) in which are stored music data for reproducing a predetermined tune, guide data required for guiding the operations of an input device (112) of a game device 3 in correspondence with tunes reproduced based on the music data, and a program for executing a musical game using the music data and the guide data on a computer of a game device, the program giving to the computer functions of a music reproduction device for reproducing the tune based on the music data; an operation guide device for instructing a player to operate the input device in correspondence with the reproduction of the tune by the music reproduction device, based on the guide data; an edit device for creating the guide data in accordance with an operation of the input device; an information output device for outputting information for identifying contents of created guide data; and the operation guide device guiding the operation by relatively moving predetermined indicator (e.g. 204L) to a predetermined position (e.g. overlapping a mark 203L) in a game screen (200) and displaying them at that position, when a timing at which the operation member of the input device is to be operated has arrived; the guide data comprising image data required to display the indicator; and the edit device being capable of creating the image data required to display the indicator. By reading and executing the program stored in the memory medium of this invention with a computer, the game device of the fortieth aspect can be formed.

A forty-ninth aspect of the invention provides a game system (1) comprising first and second game devices (2, 3) for executing games in compliance with predetermined programs, and capable of exchanging information between the game devices, the first and second game devices each comprising the following devices for executing the games an input device (30, 112) having at least one operation member for outputting a signal in correspondence with the operation state of the operation member; a memory device for game (6, 7, 53, 103) in which are stored music data for reproducing predetermined tunes of the first game device and the second game device, and data for play created in correspondence with operations of the input device corresponding to the tunes reproduced based on the music data; a music reproduction device (51, 60, 56, 101, 106, 108) for reproducing the tunes based on music data stored in the memory device for game; and an operation guide device (51, 54, 14, 101, 104, 109) for indicating a player to operate the input device in correspondence with the reproduction of the tune by the music reproduction device, based on the data for play stored in the memory device for game; the second game device comprising an edit device (101) for creating the data for play in accordance with an operation of the input device, and an information output device (101) for outputting information for identifying contents of the created data for play; and the first game device being capable of executing the game using the data for play output from the second game device. According to this invention, at least part of the data for play created in correspondence with the music data is created in accordance with the player's taste, enabling him or her to enjoy playing using the creative nature of that data. In the invention of the forty-ninth aspect, the data for play may, for example, comprise guide data for guiding the player to the operations, and data defining performance effects to be generated when the input device has been operated in accordance with a command from the operation guide device. Then, the edit device may be able to create data defining performance effects (fiftieth aspect). Sounds and images can be used as the performance effects.

In the invention described in the aspects above, the memory devices and memory media such as the memory device for link-up comprise various types of memory media such as a semiconductor memory, a magnetic memory medium, an optical memory medium, and a photomagnetic memory medium. The communications medium may comprise a cable-type medium using network cables or the like, or a non-cable medium using an infrared system or the like. The timing data may be created by creating new data, and creating new data after revising existing data. "Same tune" is a concept comprising a range in which at least part of the melody of the tune is identical, and provided that the same guide data can be used, tunes can be included in the same range even though their arrangement and tempo are different. The guide data may include all types of data used for operation guiding, for example, data defining timings for operating the input device, image data used in commands showing the player the sequence of processing defined by the timing data, and the like. The operation guide device may move the indicator itself within the game screen, or the indicator can be fixed, and a reference position to overlap the indicator can be moved to the indicator. That is, the indicator and the predetermined position corresponding thereto need only be relatively movable within the game screen.

BRIEF DESCRIPTION OF THE DRAWINGS

FIG. 10 is a diagram showing contents of flag data stored in the region for AM of FIG. 9;

FIG. 11 is a diagram showing contents of high score data stored in the region for AM of FIG. 9;

FIG. 12 is a diagram showing contents of additional tune data stored in the region for AM of FIG. 9;

FIGS. 16A and 6B are diagrams showing the relationship between a concrete structure of the timing data for link of FIG. 15 and a gauge display in correspondence therewith;

FIG. 27 is a diagram showing the corresponding relationship between operation members of the controller of FIG. 26 and operations allocated thereto;

FIGS. 33A and 33B are diagrams showing the relationship between operations of a controller and processing performed by a CPU when executing the processing of FIG. 32;

DESCRIPTION OF THE PREFERRED EMBODIMENTS

Figure 1:
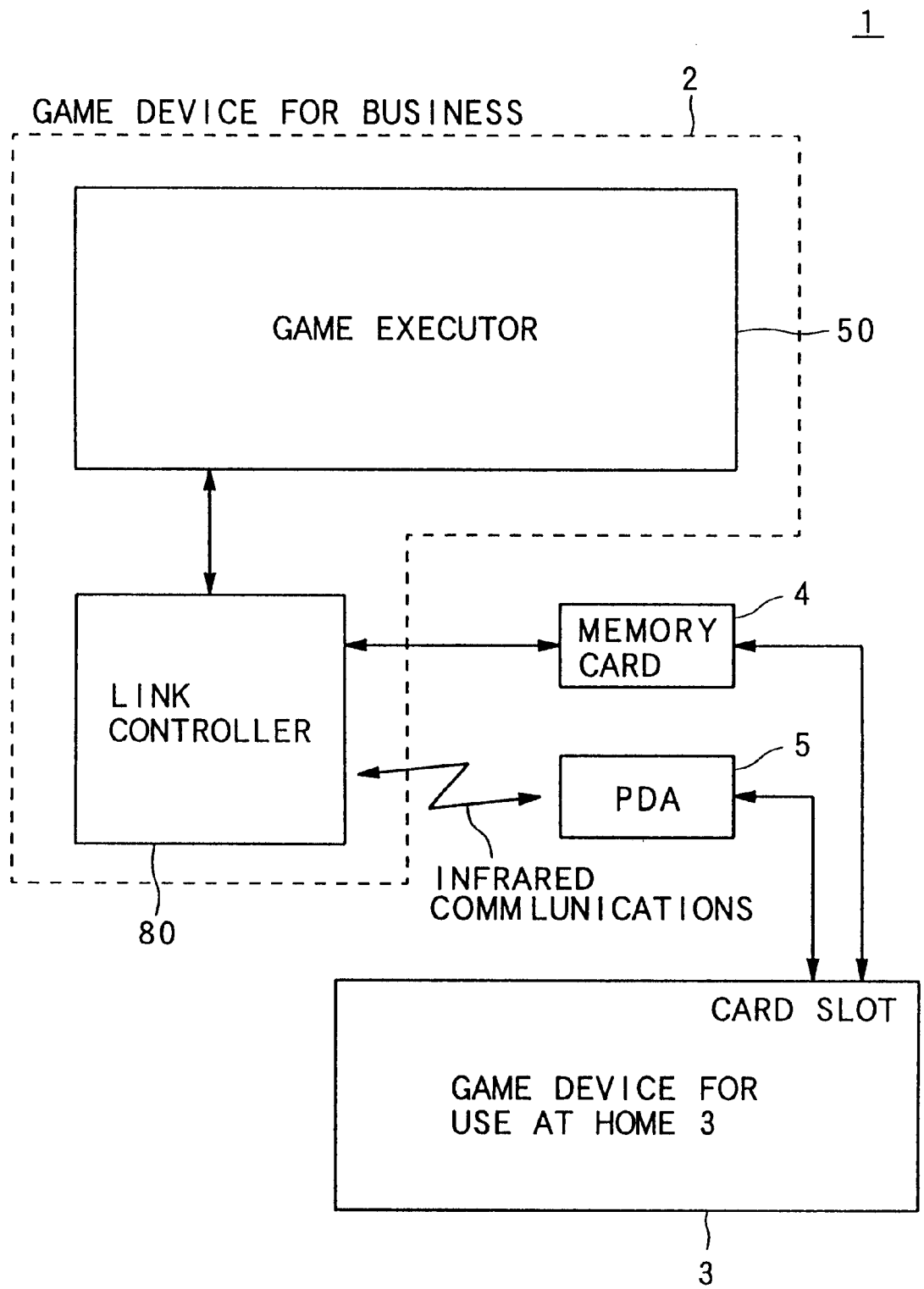
FIG. 1 is a schematic view of a constitution of a game system according to an embodiment of the present invention.

FIG. 1 is a diagram schematically showing a game system according to the present invention. In FIG. 1, a game system 1 comprises a game device for business 2, a game device for use at home 3, a memory card 4 as a medium for exchanging data between the two game devices 2 and 3, and a PDA (Personal Digital Assistant) 5. The game device for business 2 has a game executor 50 and a link controller 80, which will be explained in detail later. The memory card 4 comprises a semiconductor memory (e.g. a flash ROM) which can be rewritten and can store data. The memory region of the semiconductor memory is partitioned into an appropriate number of blocks (e.g. fifteen blocks). Each block is partitioned into sixty-four sectors, and each sector has a memory capacity of 128 bits.

When the memory card 4 is inserted into card slots provided in the game device for business 2 and the game device for use at home 3, it is electrically connected to the games devices 2 and 3. The PDA 5 is a portable computer comprising a CPU, a memory, a liquid crystal monitor, a loudspeaker, and the like, and can itself function as a portable game device for use at home in compliance with the program written into the built-in memory storage.

When the PDA 5 is inserted into a card slot provided in the game device for use at home 3, it becomes electrically connected thereto. The PDA 5 comprises an infrared communications device, and therefore it is possible to transmit communications between the game device for business 2 and the PDA 5 by a process conforming to standards of the IrDA (Infrared Data Association), for example. By using its memory, the PDA 5 is capable of functioning as a memory medium in the same way as the memory card 4. The explanation of the memory card 4 which follows also applies with no particular restrictions to the PDA 5. In the game system 1 of the present embodiment, since the game devices 2 and 3 mutually refer to data stored on the memory card 4, various types of link-up between the game devices 2 and 3 are possible. The contents of the game devices 2 and 3 will next be explained so as to elucidate these link-ups in detail.

Figure 2:
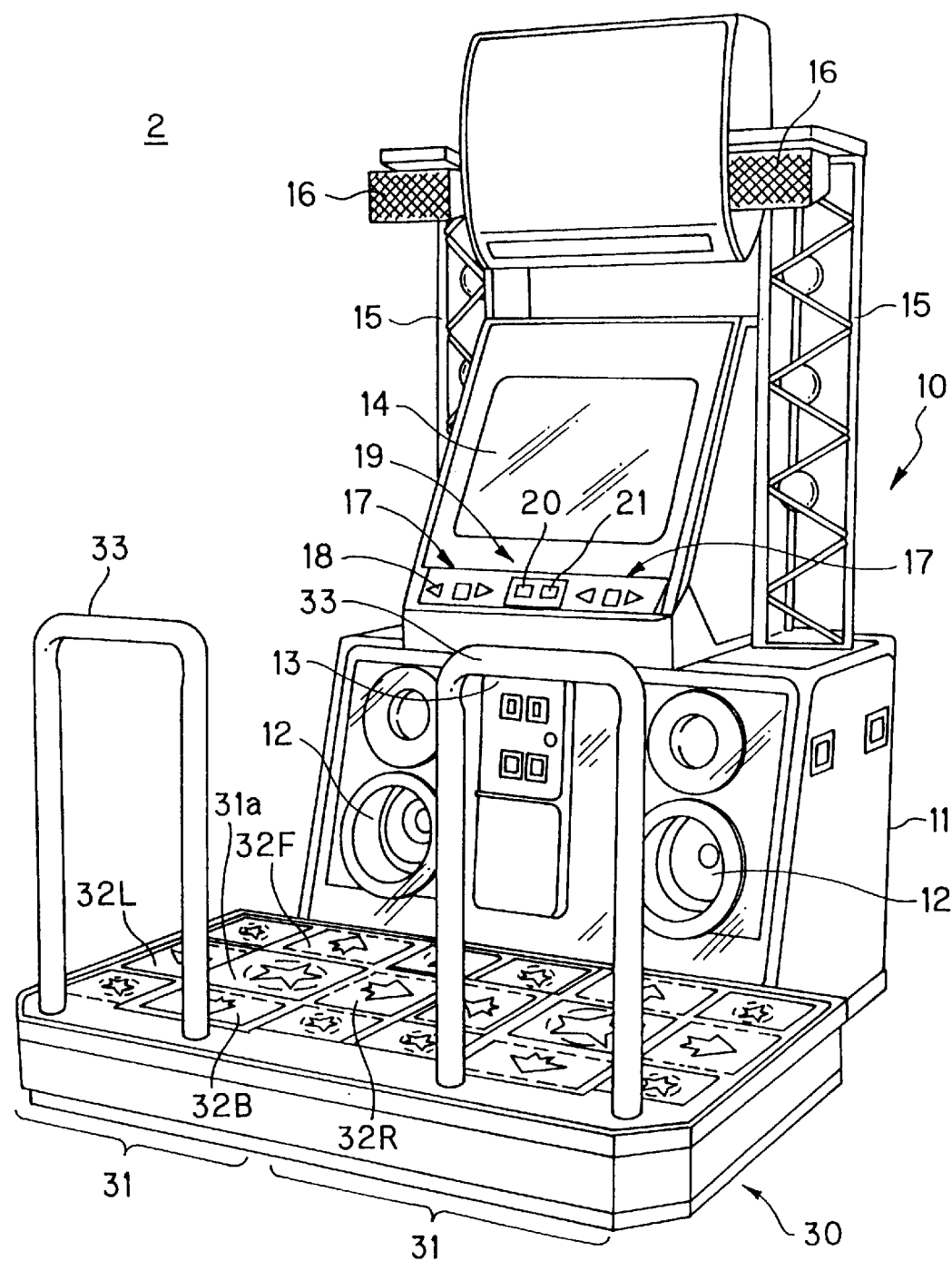
FIG. 2 is a perspective view of the outside of a game device for business included in the game system of FIG. 1.

FIG. 2 shows the outside of the game device for business 2. The object of the game device for business 2 is to allow a player to enjoy dancing in time with the music, and it comprises a main game unit 10, and a stage 30 provided in front of the main game unit 10. The main game unit 10 has a case 11 comprising a combination of wooden panels and the like, and loudspeakers for deep bass 12 and 12 are provided on both sides of the front of the case 11. A coin insertion portion 13 is provided between the loudspeakers 12 and 12. A monitor 14 using a CRT is provided on the top of the case 11, a pair of truss pillars 15 and 15 are provided on either side thereof, and loudspeakers for playing music 16 and 16 are provided at the top ends of the pillars 15 and 15. A pair of control input portions 17 and 17 are provided at the bottom of the monitor 14, and a predetermined number (three in the diagram) of push switches 18 . . . 18 are provided in each of the control input portions 17 and 17. The push switches 18 are for example used for selecting game modes, and such like.

A card insertion portion 19 is provided between the control input portions 17 and 17. The card insertion portion 19 comprises a card slot 20, which the memory card 4 can be inserted into, and an infrared communications unit 21 for transmitting infrared communications between the card insertion portion 19 and the PDA 5.

The stage 30 is specially designed as an input device for a dancing game, and has a pair of play portions 31 and 31 aligned on the left and right sides. Each play portion 31 has an area large enough for one player to dance freely therein, and the center thereof is set as a home position 31a of the player. Then, foot switches 32F, 32B, 32L, 32R (sometimes represented collectively by reference symbol 32) for outputting predetermined signals in correspondence with a stepping operation of the player are provided in a cross-like formation at the front, back, left, and right, in each play portion 31. In addition, handlebars 33 are provided at the front end of the play portions 31.

Figure 3:
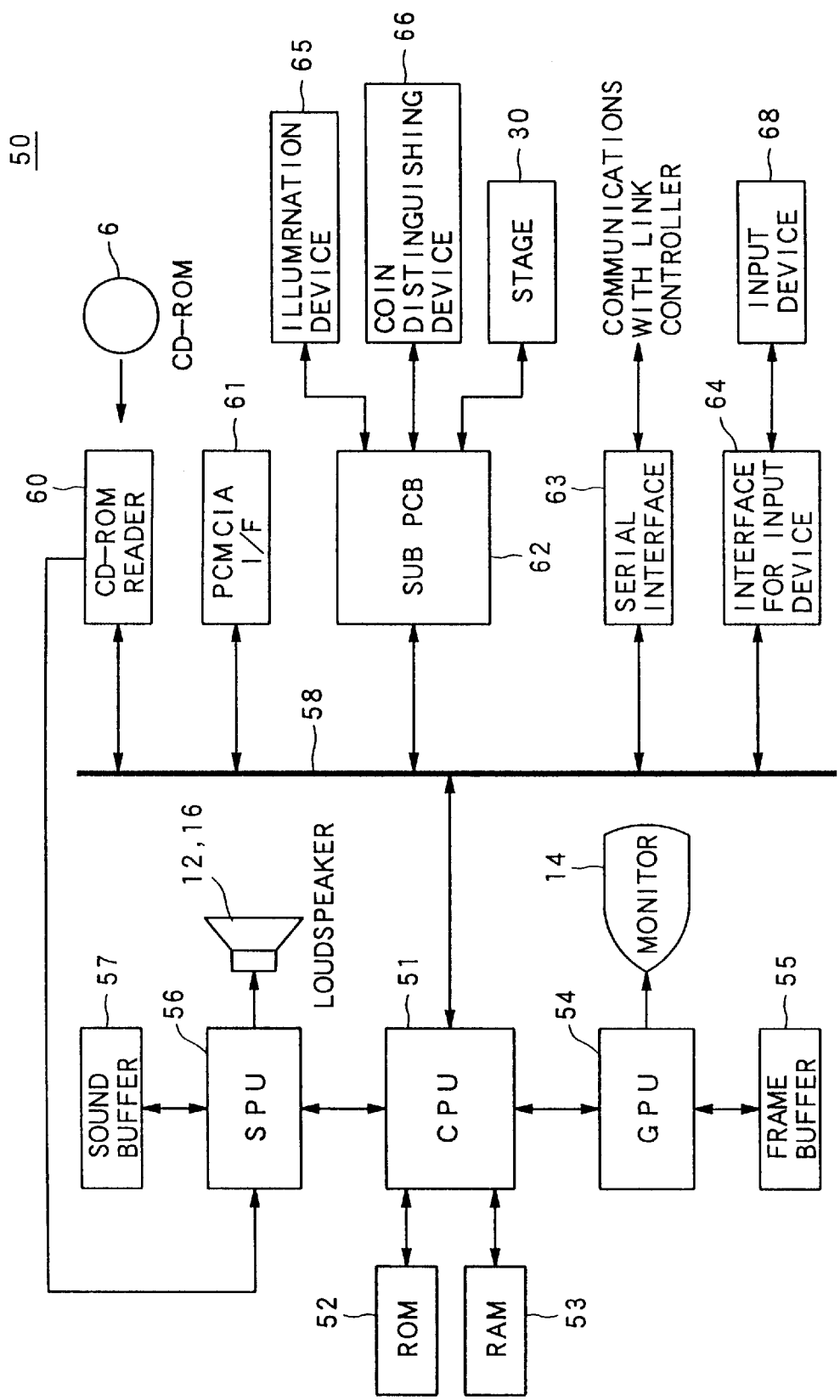
FIG. 3 is a block diagram showing a constitution of a game executor provided in a game device for business.

FIG. 3 is a block diagram of the game executor 50 provided in the game device 2. The game executor 50 is a portion for executing a dancing game in compliance with a game program stored in a CD-ROM 6 which constitutes the memory medium. A conventional control system generally provided in game devices for business can be used as the game executor 50.

The game executor 50 shown in FIG. 3 comprises a CPU 51 mainly comprising a microprocessor, a ROM 52 and a RAM 53 as memory devices for the CPU 51, and a graphics processing unit (GPU) 54 and a sound processing unit (SPU) 56 for executing processing needed to output visual images and sound respectively, in accordance with commands from the CPU 51. An operating system is a program needed for controlling the entire operation of the game device 2, and is written into the ROM 52. Programs and data for games are read out from the CD-ROM 6 and stored in the RAM 53 when required. The GPU 54 receives image data from the CPU 51 and paints game images on a frame buffer 55. In addition, the GPU 54 converts the images to predetermined video playback signals and outputs them to the monitor 14 at a predetermined timing. The SPU 56 plays back data such as audio data, music data, and sound source data, which are read out from the CD-ROM 6 and stored in a sound buffer 57, and outputs these data from the loudspeakers 12 and 16.

Furthermore, the CPU 51 is connected via a system bus 58 to a CD-ROM reader 60, a PCMCIA interface 61, a peripheral device control board (SUB PCB) 62, a serial interface 63, and an interface for input device 64. In accordance with commands from the CPU 51, the CD-ROM reader 60 reads programs and data stored in the CD-ROM 6, and outputs signals corresponding to the contents of the programs and data.

Figure 6:
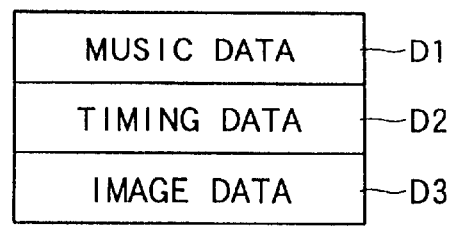
FIG. 6 is a diagram showing a concept of data stored in a CD-ROM of FIG. 3.

Here, as shown in FIG. 6, in addition to a program needed for executing a predetermined dancing game on the game device 2, the CD-ROM 6 also stores music data D1 for reproducing music (tunes) used in the game, timing data D2 for defining the sequence of steps on the foot switches 32 in correspondence with the music, and image data D3 for displaying dance scenes and the like on the monitor 14 in correspondence with the played-back music based on the music data D1. Multiple tunes are provided for the music data D1, and different image data D3 are provided for each tune. The tunes and image data are controlled by appending a code to each tune. Multiple groups of timing data D2 are provided for the music data D1 of one tune, by for instance changing the level of difficulty and the play mode. Play modes will be explained later. One group of the timing data D2 is further divided into data blocks, there being one data block for each bar of the corresponding tune. When a corresponding bar has been divided into a predetermined number of beats, for example four beats or eight beats, the data blocks comprise information specifying on which beat the foot switches 32 should be pressed.

The music data D1 is for example stored in CD-DA or CD-ROM XA format. The CD-ROM reader 60 is capable of decoding predetermined music data stored in the CD-ROM 6 in compliance with a command from the CPU 51, and supplying the decoded data directly to the SPU 56 without sending it through the bus 58. The SPU 56 D/A converts the data sent from the CD-ROM reader 60, and supplies it to the loudspeakers 12 and 16, from where the predetermined music is reproduced. The relationship between the performance position of music reproduced based on the music data D1 and the operation timing defined by the timing data D2, is judged, for example, based on a table listing the number of beats in each bar of the music in correspondence with the sector numbers in the CD-ROM 6.

The PCMCIA interface 61 is an interface for exchanging data and the like between so-called PC cards. The peripheral device control board (SUB PCB) 62 connects the various peripheral devices provided in the game device 2 to the CPU 51, and controls data communications and the like therebetween. The peripheral device control board 62 connects to an illumination device 65, a coin distinguishing device 66, and the stage 30. The illumination device 65 comprises an illuminating lamp, a halogen lamp, and the like, provided in each portion of the game device 2. The coin distinguishing device 66 distinguishes between genuine and fake coins inserted into the coin insertion portion 13, and outputs a signal in accordance with the judgement result to the CPU 51. The stage 30 has the constitution described above, and the signals output from the respective foot switches 32 are transmitted via the SUB PCB 62 to the CPU 51. The serial interface 63 sends and receives communications to/from the link controller 80. The serial interface 63 conforms to Japan Video Standard (JVS), which is the communications standard normally used for game devices for business. The interface for input device 64 is an interface for connecting the input device 68, comprising for example a device conventionally used in the game device for business 2 such as a joystick, to the CPU 51. Here, the push switches 18 of the control input portions 17 shown in FIG. 2 are connected to the interface 64 as the input devices 68.

Figure 4:
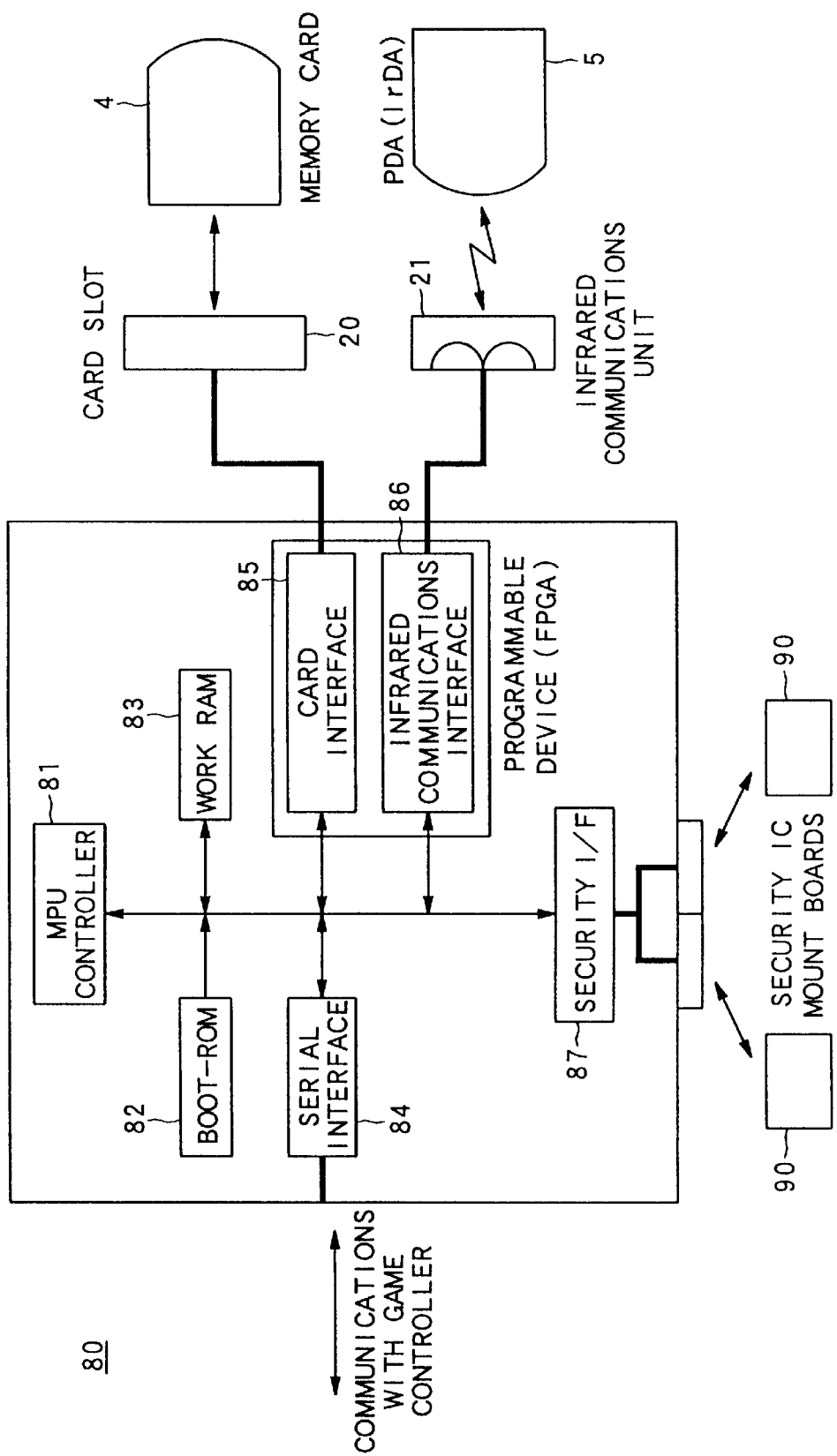
FIG. 4 is a block diagram showing a constitution of a link controller provided in a game device for business.

FIG. 4 shows the link controller 80 in detail. The link controller 80 is provided in order to link-up data, in particular, between the game device for business 2 and the game device for use at home 3 using the memory card 4, and from the point of view of the game executor 50 described above, it functions as one of the peripheral devices. When there is no need for data link-up with the game device for use at home 3, the game device for business 2 need not comprise the link controller 80.

As shown in FIG. 4, the link controller 80 has a microprocessor unit (MPU) 81 for control. The MPU 81 connects to a BOOT-ROM 82 in which a program for start-up processing of the link controller 80 is stored, a work RAM 83 functioning as a temporary memory device for the MPU 81, a serial interface 84 for transmitting serial communications conforming to JVS standards between the link controller 80 and the game executor 50 described above, interfaces 85 and 86 for the memory card slot 20 and the infrared communications unit 21, and an interface 87 for security IC mount boards 90. The MPU 81, the ROM 82, the RAM 83, and each interfaces 85, 86, and 87 are gathered together on a communal printed wiring board, and can be detached and attached as a single piece to/from the game device 2.

As initialisation process at the start-up of the game device 2, the MPU 81 prepares an operation confirmation of each portion of the link controller 80 and a maintenance of a communications protocol of the serial interface 84 in compliance with the program stored in the BOOT-ROM 82. Thereafter, the MPU 81 waits for an instruction from the CPU 51 of the game executor 50. Communications control programs needed to transmit and receive communications to/from the memory card 4 and the PDA 5 are transmitted to the work RAM 83 by a serial communication from the game executor 50, and are executed by the MPU 81. These communications control programs are not stored in the BOOT-ROM 82 so that it will not be necessary to rewrite the data in the BOOT-ROM 82 for future updated versions when the algorithms of the communications and infrared communications with the memory card 4 are updated, thereby enabling the device to be more flexible. Consequently, a card interface 85 and an infrared communications (IrDA) interface 86 are formed by a programmable device, such as for example an FPGA (Field Programmable Gate Array). The security IC mount boards 90 comprises a security IC for cooperating with the link controller 80 and judging whether the software is an illegal copy, by referring to an individual ID of the software stored in the CD-ROM 6.

After the initialization processing described above, the following sequence is executed until the link controller 80 is able to read and write data to/from the memory card 4. When the power of the game device 2 is switched ON and the above initialization processing has been carried out, the link controller 80 waits for the game executor 50 to transmit a communications control program, and for an instruction from the CPU 51 of the game executor 50. Thereafter, the CPU 51 of the game executor 50 confirms the start-up status of the link controller 80 via a serial communications wire conforming to JVS standards, and verifies the consistency of the security IC. If the security IC assumed by the game executor 50 is not mounted on the security IC mount boards 90, this fact of the inconsistency is displayed on the monitor 14, and subsequent processing is terminated. For example, if the CD-ROM 6 is an illegal copy, or if the security IC mount board 90 is a forgery, the software of the CD-ROM 6 does not match the security IC, and it is not possible to start the game.

On the other hand, when the security verification is successful, the game executor 50 sends a communications control program for the memory card 4 to the work RAM 83.

In tandem with this, a program is sent to the programmable device, which comprises the card interface 85 and the infrared communications interface 86, to make the device function as the interfaces 85 and 86.

When the programs have been transmitted, the MPU 81 commences its control based on the program which has been transmitted to a specific address in the work RAM 83. Firstly, the MPU 81 transmits circuit information to the programmable device (FPGA), initializing the circuit which function as the interfaces 85 and 86. Thereafter, the MPU 81 controls the interfaces 85 and 86 in accordance with commands sent via the serial communications wire from the CPU 51, and thereby reads and writes data to/from the memory card 4 and the PDA 5.

Figure 5:
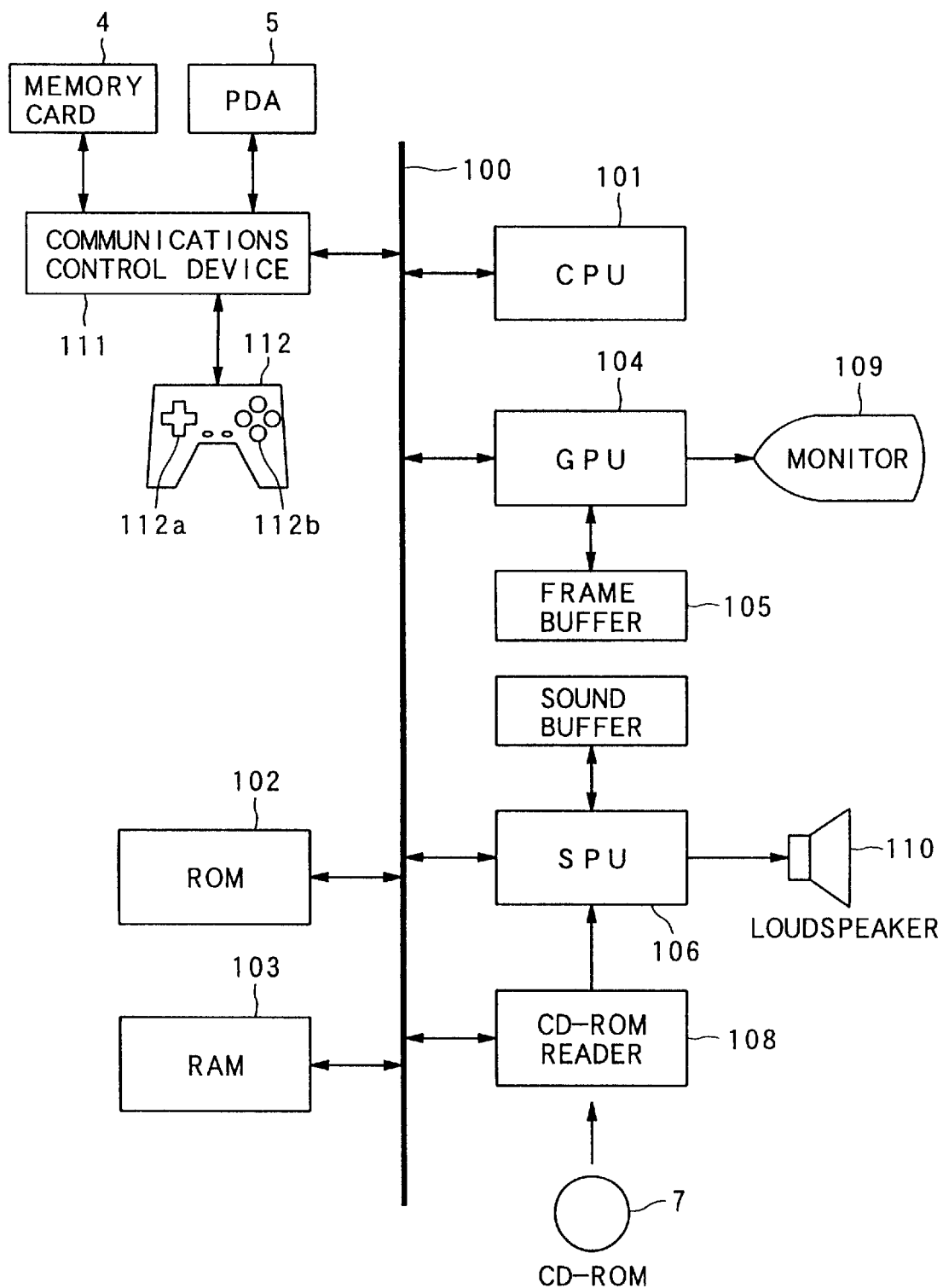
FIG. 5 is a block diagram showing a constitution of a game device for use at home included in the game system of FIG. 1.

FIG. 5 is a block diagram of the control system of the game device for use at home 3. The game device for use at home 3 executes predetermined programs in compliance with programs for games stored in a CD-ROM 7 functioning as a memory medium, and its basic constitution is same as the game executor 50 of the game device for business 2. That is, the game device 3 comprises a CPU 101 mainly comprising a microprocessor, a ROM 102 and a RAM 103 as memory devices for the CPU 101, a graphics processing unit (GPU) 104 and a sound processing unit (SPU) 106 for executing processing needed to output visual images and sound, buffers 105 and 107 for the above units, and a CD-ROM reader 108. Since the GPU 104, the SPU 106, and the CD-ROM reader 108 are identical to the GPU 54, the SPU 56, and the CD-ROM reader 60 of FIG. 3, further explanation thereof is omitted. Generally, a television receiver for use at home is used as the monitor 109, and a loudspeaker provided in the television receiver is used as the loudspeaker 110.

Moreover, a communications control device 111 is connected via a bus 100 to the CPU 101, and the abovementioned memory card 4 and the PDA 5 are connected to the CPU 101 via the device 111. Furthermore, a controller 112 functions as an input device and is connected to the communications control device 111. The controller 112 comprises operation members which are controlled by the player. For example, the operation members may comprise a cross key 112*a* for inputting the directions upwards, downward, left, and right, and push switches 112*b* . . . The communications control device 111 scans the state of the operation members 112*a*, 112*b*, and the like of the controller 112 in a fixed cycle (e.g. 1/60 second), and outputs a signal to the CPU 101 in correspondence with the scanning result. Based on that signal, the CPU 101 judges the control state of the controller 112. A conventional controller may be used as the controller 112, or alternatively, a special controller comprising four foot switches similar to those of the stage 30 and the play portions 31 of the game device for business 2 may be used.

In addition to a program needed for executing a dancing game identical to the dancing game executed in the game device for business 2 described above in the game device for use at home 3, the CD-ROM 7 also stores music data for playing music used in the game, and timing data which defines the control sequence of the controller 112 in correspondence with the music. The music data comprises multiple tunes, at least some of which are the same as the tunes of the music data stored in the CD-ROM 6. As in the CD-ROM 6, the music data is for example stored in CD-DA or CD-ROM XA format. The CD-ROM reader 108 is capable of decoding predetermined music data stored in the CD-ROM 7 in compliance with a command from the CPU 101, and supplying the decoded data directly to the SPU 106 without sending it through the bus 100. These points are identical to the example of the CD-ROM 6 shown in FIG. 6. The programs and data in the CD-ROMs 6 and 7 differ in accordance with differences in the constitutions of the game devices 2 and 3, but in the explanation that follows they will be treated as identical so as to avoid repetition.

Figure 7:
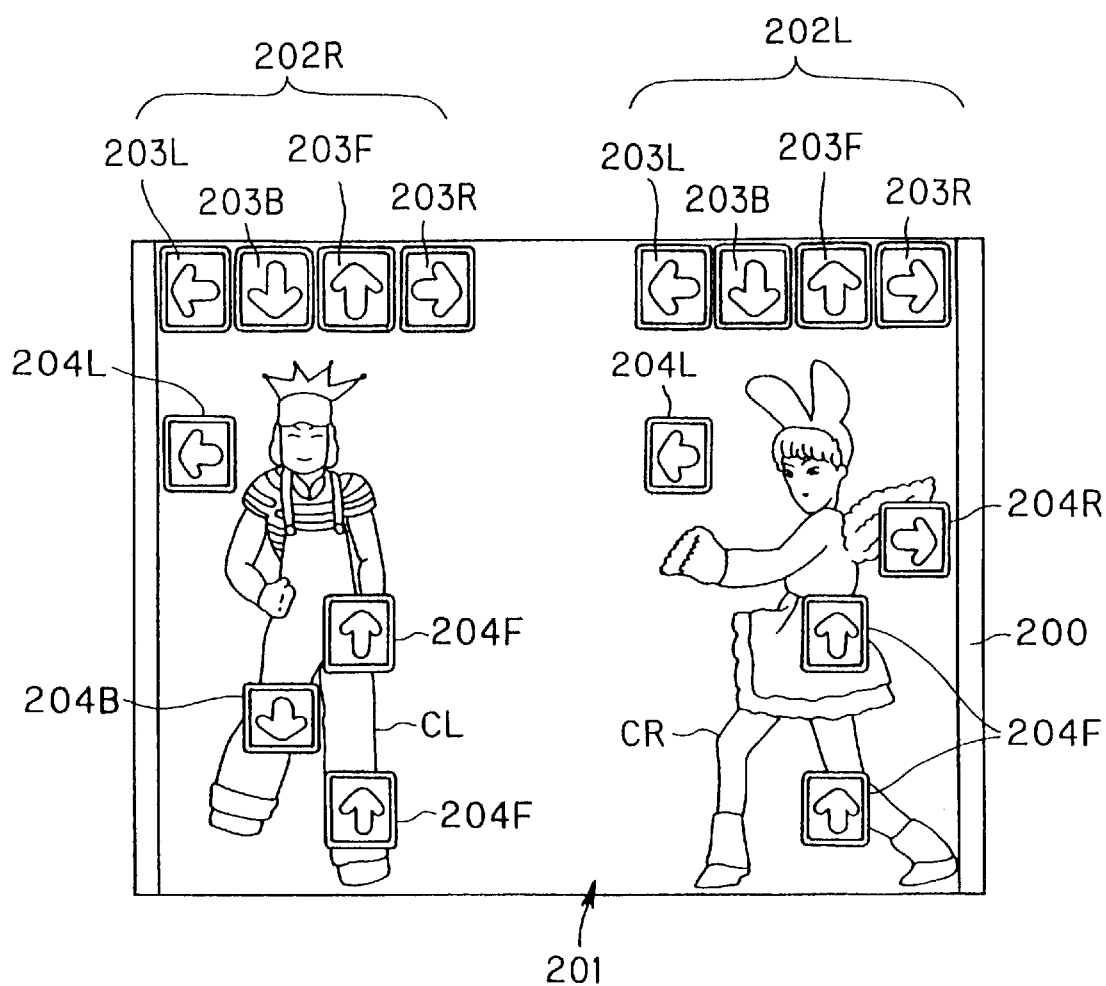
FIG. 7 is a diagram showing an example of a game screen in a dancing game executed by a game device for business.

FIG. 7 shows an example of a game screen displayed on the monitor 14 or 109 while a dancing game is being played in compliance with a program stored in the CD-ROMs 6 and 7. Although the game screens of the game device for business 2 and the game device for use at home 3 may be different when examined in detail, for the purposes of the present explanation they will be described as though identical.

As shown in FIG. 7, the game screen 200 comprises a background image 201, and gauges 202L and 202R (both may sometimes be represented by the reference code 202) displayed over both sides of the background image 201. The background image 201 is created based on the image data D3 of FIG. 6. For example, moving images of characters CL and CR dancing to the music are displayed in the background image 201. The gauges 202L and 202R are images to instruct the players how to operate the game in time with the music. Reference marks 203F, 203B, 203L, and 203R (hereinafter may be represented collectively by reference code 203) contain arrow symbols pointing up, down, left, and right within the screen 200, and are provided in a horizontal row at the tops of the gauges 202L and 202R. In the game device for business 2, the reference mark 203F corresponds to the foot switch 32F in front of the home position 31*a*, the reference mark 203B corresponds to the foot switch 32B behind the home position 31*a*, the reference mark 203L corresponds to the foot switch 32L on the left of the home position 31*a*, and the reference mark 203R corresponds to the foot switch 32R on the right of the home position 31*a*.

When a conventional controller 112 is used in the game device for use at home 3, the reference marks 203F, 203B, 203L, and 203R each correspond to separate operation members. By way of example, when the push switches 112*b* are provided in a cross-like formation on the controller 112, the relationship between the push switches 112*b* and the reference marks 203 can be set so that the top and bottom push switches correspond to the front and back foot switches 32F and 32B, and the left and right push switches correspond to the left and right foot switches 32L and 32R.

Timing marks 204F, 204B, 204L, and 204R (hereinafter sometimes represented collectively by reference code 204) are displayed below the reference marks 203F, 203B, 203L, and 203R. The display of the timing marks 204 is controlled in compliance with the timing data D2 of FIG. 6 in the following way. The explanation which follows refers to the game device for business 2, but it applies similarly to the game device for use at home 3. Image data for displaying the marks 203 and 204 are prepared in advance, and stored as part of the image data D3 in the CD-ROMs 6 and 7.

When music play-back commences, the CPU 51 sets a part of the timing data D2 (e.g. an equivalent to two bars of the tune) as the display range in the gauges 202, and detects the operation timings of the foot switches 32F, 32B, 32L, and 32R within that range. Then, the CPU 51 creates image data for the gauges 202 by replacing the detected timings with the timing marks 204. At this time, display positions of the timing marks 204 are calculated so that the corresponding timing marks 204F, 204B, 204L, and 204R are displayed in proper time sequence below their corresponding reference marks 203F, 203B, 203L, and 203R.

The created image data of the gauges 202 is sent to the GPU 54 together with the background image 201, created using the image data D3 of FIG. 6. The GPU 54 creates a game screen 200, combining the background image 201 and the images of the gauges 202, on the frame buffer 55, and outputs the created screen 200 at a predetermined timing to be displayed on the monitor 14.

The above processing is performed repeatedly in a predetermined cycle. The head of the display range is set so as to correspond with the performance position of the tune at the moment of processing, and the display range is shifted by a predetermined amount from the head of the tune toward its end by each time the processing is performed. As a consequence, the timing marks 204 gradually move upwards on the gauges 202 as the music progresses. Then, when the timing marks 204 coincide with the reference marks 203, the operation timings of the foot switches 32 set in correspondence with the reference marks 203 come. The timing marks 204 corresponding to operation timings about to be introduced are listed in the proper time sequence below the reference marks 203, thereby enabling the players to easily ascertain future control operations.

In the game devices 2 and 3, any of the following modes can be selected: 1P mode, in which one player plays the game in compliance with instructions of one of the gauges 202L and 202R; 2P mode, in which two players play in compliance with instructions from the two gauges 202L and 202R; and Double mode, in which one player plays in compliance with instructions from both of the gauges 202L and 202R. The timing data D2 is prepared separately for each of the three modes 1P, 2P, and Double, and the displays on the gauges 202 are controlled based on the timing data D2 corresponding to the mode selected by the player(s). When the 1P mode has been selected, only one of the gauges 202L and 202R is displayed, and the other is not displayed. For example, in the game device for business 2, when the player has selected the 1P mode in the play portion 31 on the left side, the gauge 202R on the right side of the screen is not displayed.

Figure 8:
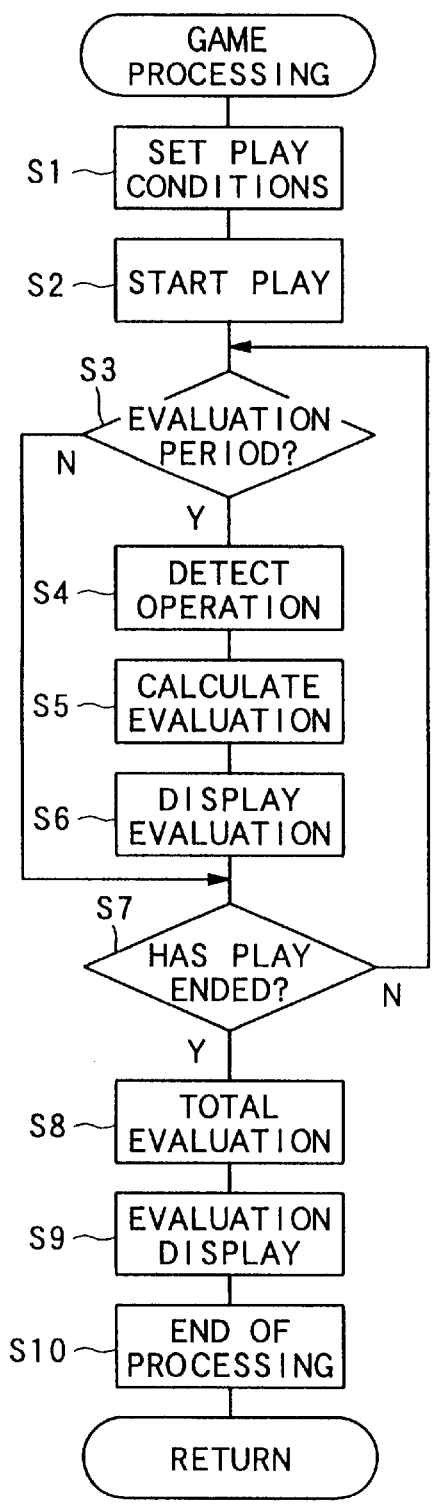
FIG. 8 is a flowchart showing a basic processing sequence of a CPU for executing a dancing game on a game device for business.

FIG. 8 is a flowchart showing a summary of the game processing executed in the game device for business 2. When the player inserts a coin of a predetermined value into the coin insertion portion 13, the coin distinguishing device 66 sends a game start signal to the CPU 51, which then commences the processing shown in FIG. 8. In the case of the game device for use at home 3, a signal corresponding to a predetermined start control to the controller 112 is treated as the start signal.

In the processing of FIG. 8, firstly, play conditions are set in compliance with a command from the player (Step S1). The play conditions are set by, for example, selecting one mode from the 1P mode, the 2P mode, and the Double mode, selecting the level of difficulty, and selecting a music. When the play conditions have been set, each portion of the game device for business 2 receives a command to start play (Step S2). Consequently, the CD-ROM reader 60 sends selected music data to the SPU 56, and the music starts to play. In addition, the CPU 51 starts creating of the game screen 200, that is, the background image 201 and the gauges 202. This process is repeated until the end of the game. A time gap may be provided to the play start commands sent to each portion of the game device 2 in order to synchronize the screen display and the audio reproduction.

After play has started, the CPU 51 judges from the present performance position and the timing data D2 whether the present point is within the evaluation period (Step S3). The evaluation period is set to a predetermined width before and after the operation timing stipulated by the timing data D2. For instance, when the length of one beat of a tune being performed is X, the evaluation period is set to a range of X/2 before and after the operation timing. For example, when the timing data D2 stipulates that the third beat of the Nth bar of a tune being performed is the operation timing of the foot switches 32F, a period having a width of ½ beats before and after the third beat is set as the evaluation period of the foot switches 32F.

When the present point is judged to be within the evaluation period in the Step S3, the control of the foot switch 32 in the evaluation period is detected (Step S4). Then, an evaluation calculation is carried out to evaluate the detected control (Step S5). The operation of the foot switch 32 which is identical to that of the foot switch 32 judged to be within the evaluation period in the Step S3 is detected, and the smaller the amount of deviation between the actual timing at which the foot switch 32 was actually operated and the operation timing defined by the timing data D2, the higher the control is evaluated. A score is calculated in correspondence with the amount of deviation, e.g. a score of 100 points when deviation is zero, and a score of zero when the amount of deviation is equivalent to half of the width of the evaluation period. When no control of the foot switch 32 is detected within the evaluation period, or when only control of different foot switches 32 is detected, an evaluation of the lowest rank is awarded. When the evaluation period is the same for multiple foot switches 32, the evaluations are conducted for each foot switches in tandem. The calculated evaluations are stored in the RAM 53. Furthermore, the total result from the start of the performance of the tune is also calculated during the evaluation calculation. The total result is for example calculated based on the sum of the scores recorded from the start of the tune to the present moment. When a calculated score is less than a fixed standard, an equivalent score amount may be subtracted from the total result up to that moment.

When the evaluation calculation ends, information corresponding to the result of the calculation is displayed to the player (Step S6). In this case, the score may be displayed directly on the screen 200, or it may be classified into an appropriate number of ranks from 100 points to zero points, and the rank to which the calculated score belongs can be substituted by a word such as "GREAT" or "POOR", and displayed on the screen 200. Note that the evaluations and displays thereof are not limited to each operation timing, and may be carried out at any given interval (e.g. one bar).

When the evaluation has been displayed, the CPU 51 judges whether or not play has ended (Step S7). For example, play is deemed to have ended in a case where one tune has ended or the total result has fallen below the fixed standard, and the like. The Step S7 is carried out even when it has been judged in the Step S3 that the present point was not within the evaluation period. When it has been judged that play has not ended, the processing returns to the Step S3. On the other hand, when it has been judged that play has ended, the overall play is evaluated based on the evaluation result stored in the RAM 53 (Step S8), and information corresponding to the evaluation result is displayed to the player (Step S9). The total sum of the scores calculated in the Step S5 for each control or the like can, for example, be used as the overall evaluation. The overall evaluation may be altered after considering the evaluations of the highest and lowest ranks. When the evaluation has been displayed, a predetermined end processing is carried out (Step S10) and the game processing of one tune ends. If the abovementioned total result maintains the fixed standard until the end of the tune, that tune is cleared, and the game proceeds to the next tune.

Next, the link-up between the game devices 2 and 3 will be explained in detail. In the game system 1 of the present embodiment, the following types of the link-up are provided.

(1) When a specific condition is satisfied in one of the game devices, a hidden element (hidden tune or hidden mode) is generated in the other game device.

(2) An edit mode, in which a player can use the game device for use at home 3 to edit timing data, is provided as a hidden mode, and timing data created in the edit mode can be loaded into the game device for business 2 and played thereon.

(3) Game results (e.g. high scores and the like) of the game device for business 2 can be saved on the memory card 4, and displayed on the monitor 109 of the game device for use at home 3.

(4) When a new tune has been added to the game device for business 2, information relating to the new tune can be saved on the memory card 4, and displayed on the monitor 109 of the game device for use at home 3.

(5) A given message created in the game device for business 2 can be saved on the memory card 4, and displayed on the monitor 109 of the game device for use at home 3.

Next, data and processing and the like for realizing the above link-ups will be explained.

Figure 9:
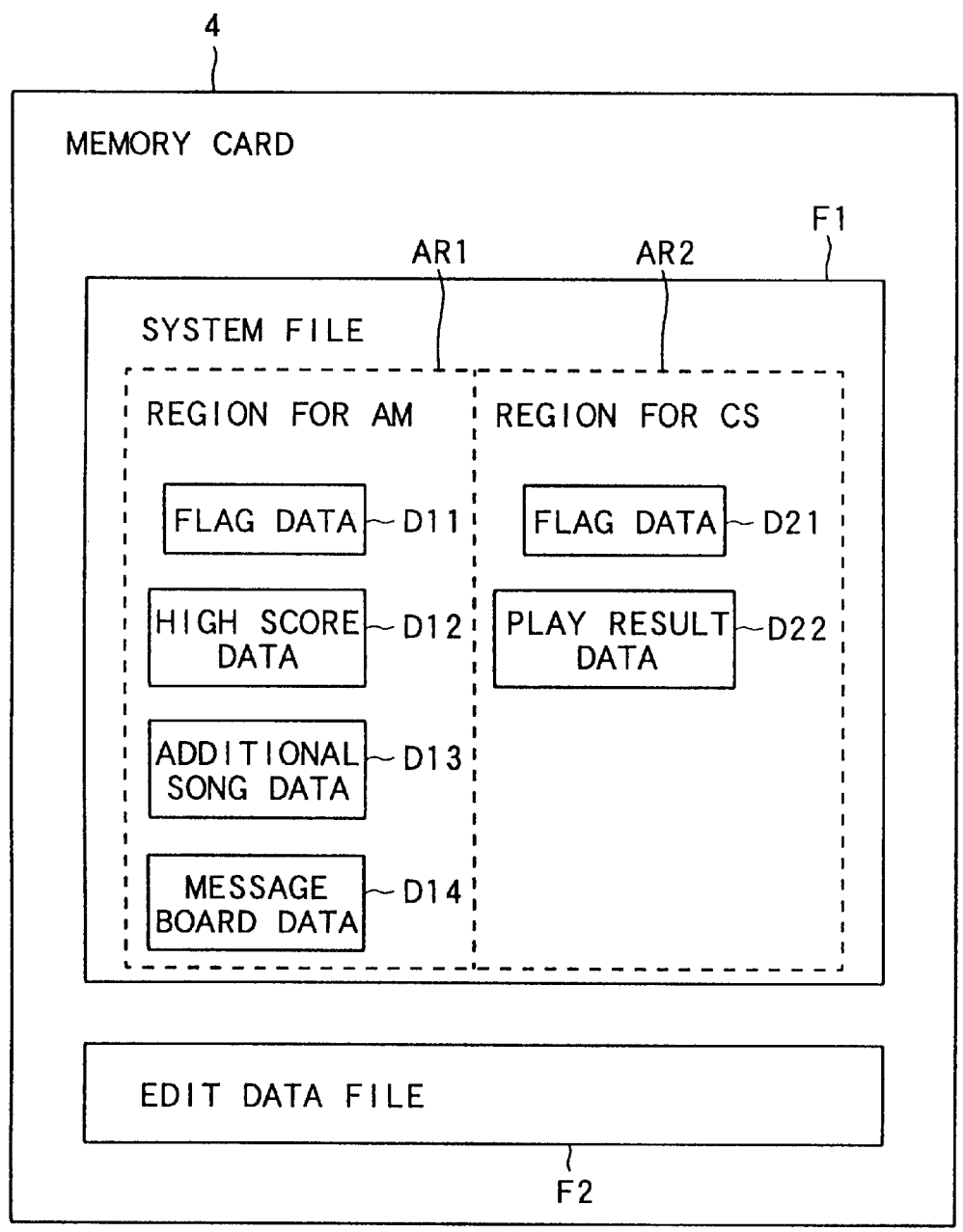
FIG. 9 is a schematic diagram showing data stored on a memory card included in the game system of FIG. 1.

FIG. 9 shows a file from those stored on the memory card 4 which relates to the link-ups between the game devices 2 and 3. As is clear from FIG. 9, a system file F1 and an edit data file F2 are stored on the memory card 4. The files F1 and F2 each take up one block in the memory region of the memory card 4. The system file F1 is divided into a region for AM AR1 used as a region for writing by the game device for business 2, and a region for CS AR2 used as a region for writing by the game device for business 3. The game device for business 2 cannot write data into the region for CS AR2, and the game device for use at home 3 cannot write data into the region for AM AR1. However, there are no such restrictions on the reading of data, and the game devices 2 and 3 are able to refer to the data in each other's write regions.

Flag data D11, high score data D12, additional tune data D13, and message board data D14 are stored in the region for AM AR1, and flag data D21 and play result data D22 are stored in the region for CS AR2. As shown in FIG. 10, the flag data D11 comprises flags relating to the hidden tunes X, Y, and Z, an edit mode flag, a high score flag, a message flag, and a specification update flag. When predetermined conditions set in correspondence with the flags for the hidden tunes X, Y, Z, and the edit mode have been satisfied in the game device for business 2, the flags are set to "1". The high score flag is set to "1" when the high score data D12 is written in, and the message flag is set to "1" when the message board data D14 is written in. The specification update flag is provided so that, when the specifications of the game device for business 2 have not been judged even though the software development of the game device for use at home 3 has ended, the specifications of the game device for business 2 can be updated in correspondence with the software of the game device for use at home 3. For example, when the software development of the game device for use at home 3 has ended, but it has still not been decided whether to include a specific mode in the game device for business 2, the game device for use at home 3 can be set so that it is compatible whether the mode is present or not. Then, when the memory card 4 has been attached to the game device for business 2, the specification update flag is updated in accordance with whether or not the specific mode has been utilized. Then, in accordance with the flag, the game device for use at home 3 switches its operation so as to be compatible.

The high score data D12 is provided in order to enable the game device for use at home 3 to refer to high scores stored in the game device for business 2, and, as shown in FIG. 11, comprises information relating to the total high score, and high scores for each tune, achieved by a player on the game device for business 2. The total high score is, for example, calculated based on the total result when multiple tunes are performed in a continuous sequence. The additional tune data D13 is to accommodate new tunes being added to the game device for business 2 after the software development of the game device for use at home 3 has been finished, and, as shown in FIG. 12, comprises information relating to the number of additional tunes and the title thereof. Information relating to the number of additional tunes also serves as flag information for judging whether or not there is an additional tune, the number of "0" shows that there are no additional tunes, and any number other than "0" shows that there is a tune to be added.

The message board data D14 comprises a row of text codes corresponding to textual information prepared in advance in the game device for business 2, and textual information input by an operator or the like of the game device for business 2 using a text input function of the game device for business 2. The text codes used here conform to text code settings used by the game device for use at home 3. Therefore, the game device for use at home 3 is able to display a row of text codes written on the memory card 4 by the game device for business 2 on the monitor 109, by reading out a row of text codes written in the message board data D14. Consequently, it is possible to display advertisements for shops and announcements and the like of events such as game competitions to the player of the game device for use at home 3, making them outstanding among other shops and improving customer service. The tune titles of the additional tune data D13 are also created using text codes conforming to text code setting used in the game device for use at home 3.

Figure 13A:
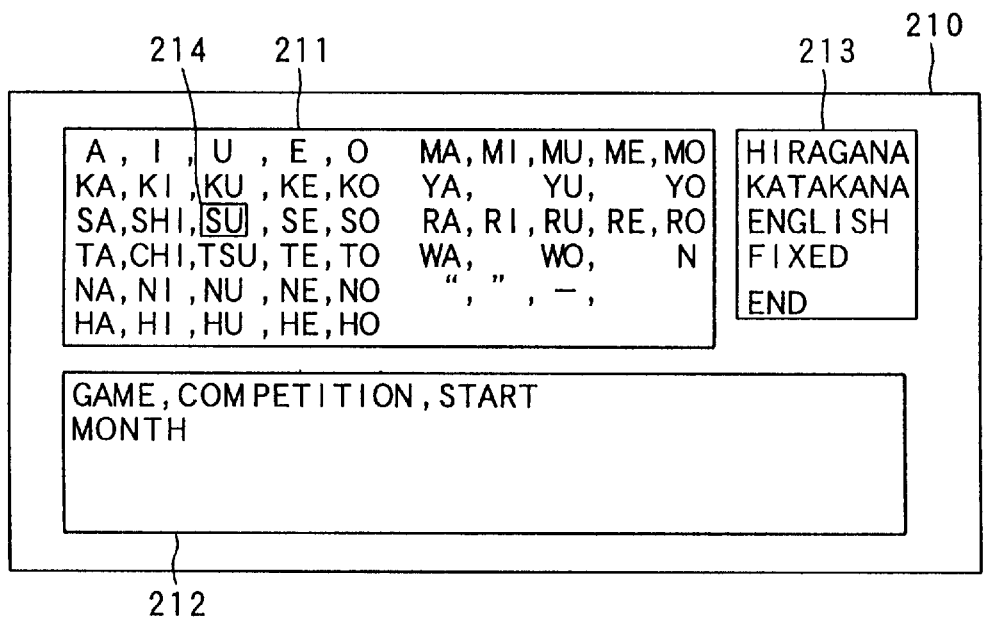
FIGS. 13A and 13B are diagrams showing examples of a screen displayed on a monitor when creating noticeboard data stored in the region for AM of FIG. 9.

The game device for business 2 inputs a text by, for example, the following method. Firstly, a message input screen 210 such as that shown in FIG. 13(a) is displayed in response to a predetermined input start control to an input device 68. The message input screen 210 comprises a text selection window 211, a message input window 212, and a menu selection window 213, and the window into which data is input is switched between these three windows 211, 212, and 213 in accordance with the control of the input device 68 and the foot switch 32. Using the menu selection window 213, it is possible to select one of hiragana, katakana, the Roman alphabet, numerals and Fixed Style, to be displayed in the text selection window 211. In addition, it is possible to select the end of text input itself. The type of text selected in the menu selection window 213 is displayed in the text selection window 211. In the example of FIG. 13(a), hiragana has been selected.

Figure 13B:
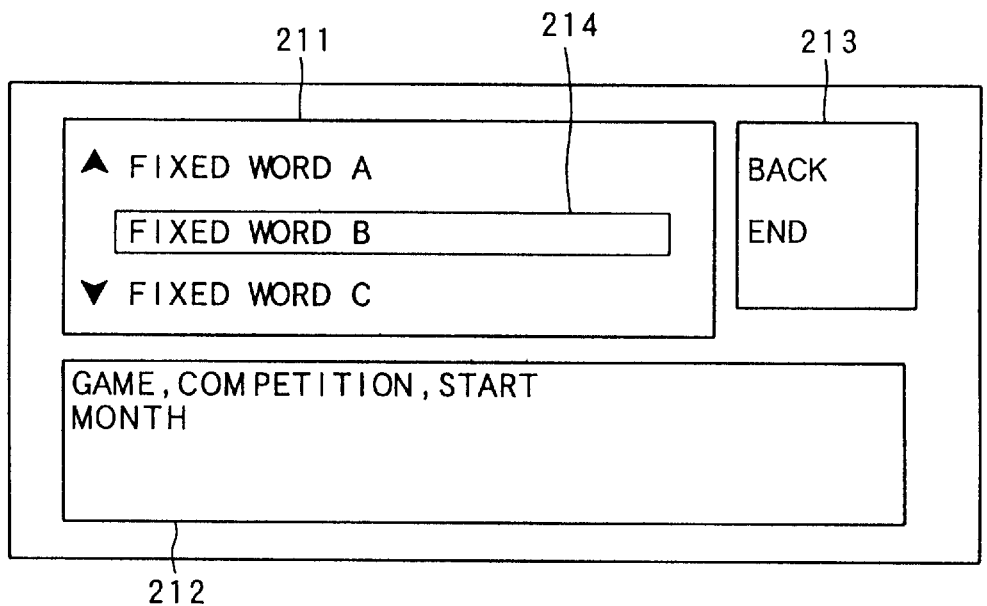

When the text selection window 211 has been selected for input, a cursor 214 is displayed within thereof. The cursor 214 is moved between the texts in accordance with the controls of the input device 68 and the foot switch 32. When a predetermined operation for the input device 68 or the like has been carried out, the text surrounded by the cursor 214 at that point is deemed to have been selected, and is displayed at a position indicated by a cursor 215 of the message input window 212. By repeating these operations, a desired message can be created. When Fixed Style is selected in the menu selection window 213, multiple predetermined fixed words are displayed in the text selection window 211 as shown in FIG. 13(b). Text rows which are likely to be frequently input by the operator of the game device for business 2, such as "GAME", "EVENT", "COMPETITION", and "HOLD", are prepared in advance as the fixed words. It is possible to scroll up and down the fixed words in the text selection window 211 by using the input device 68 or the foot switch 32. When a definite operation is carried out, the fixed word inside the cursor 214 is displayed in the message input window 212. Preparing the fixed words in this way eliminates the bother of inputting the individual words each time, and reduces the work needed to create a message.

The message input screen 210 and input method described above are merely examples. Various changes can be made to the text input method. For example, it is possible to use the infrared communications unit 21 to exchange communications with a text row input device, typically a personal computer, then store text rows created on the personal computer in the RAM 53 of the game device for business 2, convert them to data conforming to the textual code of the game device for use at home 3, and write the converted data onto the memory card 4.

The high score data D12, the additional music data D13, and the message board data D14 described above created in the game device for business 2 are stored in predetermined regions of the RAM 53. When these data are written into the memory card 4, permission to write is first confirmed to the player, and the data are written only when permission is granted. A specific example of the writing process will be explained later.

The flag data D21 in the region for CS AR2 shown in FIG. 9 comprises a collection of flags for judging whether or not permission has been granted to activate the hidden tunes X, Y, and Z, and the hidden mode in the same manner as the flag data D11. Furthermore, the play result data D22 comprises information relating to play results of the game device for use at home 3, for example, high scores and play conditions when the high scores were achieved, number of plays, and the like.

Next, the edit data file F2 will be explained in detail with reference to FIGS. 14 to 16. The edit data file F2 is created in the edit mode, which is provided as one of the hidden elements in the game device for use at home 3. When the edit data file F2 is loaded into the game devices 2 and 3, the same gauges 202 can be displayed on the monitors 14 and 109 during the playing of the same tune in the devices 2 and 3, and consequently, practically the same play environment can be achieved on both game devices 2 and 3.

Figure 14:
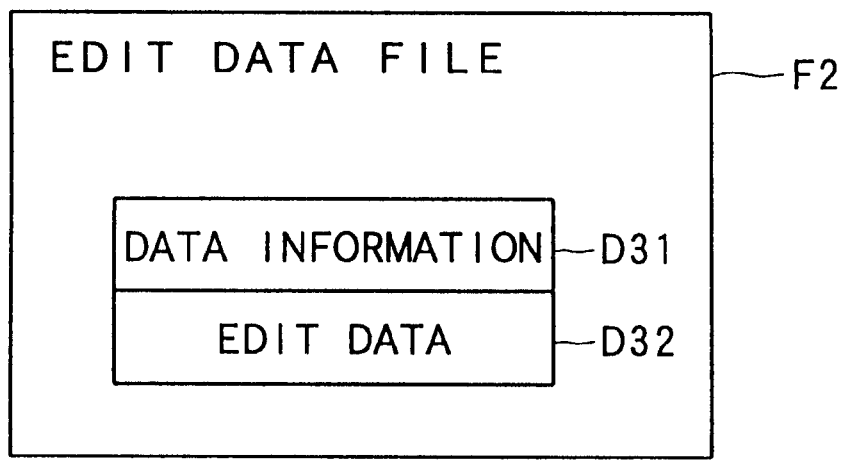
FIG. 14 is a diagram showing contents of an edit data file stored in the region for AM of FIG. 9.

FIG. 14 shows the constitution of the edit data file F2. As is clear from the diagram, the edit data file F2 comprises a group of data information D31 and edit data D32. The data information D31 comprises information for specifying tunes and play modes (one of 1P, 2P, and Double Mode) corresponding to the edit data D32.

Figure 15:
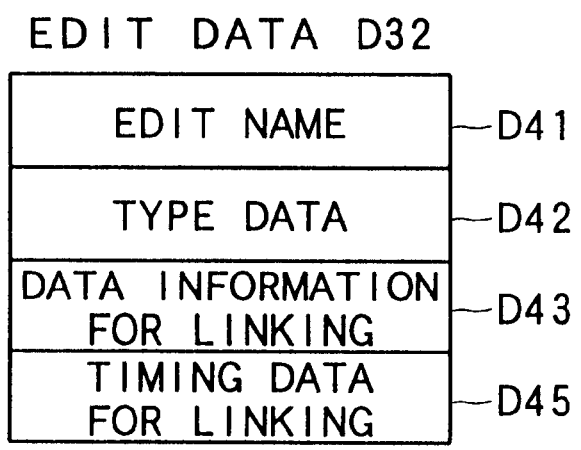
FIG. 15 is a diagram showing contents of the edit data file of FIG. 14.

FIG. 15 shows the edit data D32 in detail. As is clear from the diagram, the edit data D32 comprises an edit name D41, type data D42, data information for linking D43, and timing data for linking D45. The edit name D41 comprises data corresponding to the text row input as a file name by the player who created the edit data D32, and has a size of, for example, eight bites in ASCII code.

The type data D42 comprises information relating to the resolution of the timing data for linking D45, and information for judging whether or not there is a portion set so as to simultaneously operate three or more operation members. The resolution of the timing data D45 is a value showing whether one beat in the timing data D45 corresponds is equivalent to the length of a given fraction of one bar of a musical piece in correspondence with the data D45. The resolution of the edit data D32 is fixed at sixteen beats for bar. That is, the minimum unit of the timing data D45 is equivalent to a sixteenth note of the musical piece.

Figure 16A:
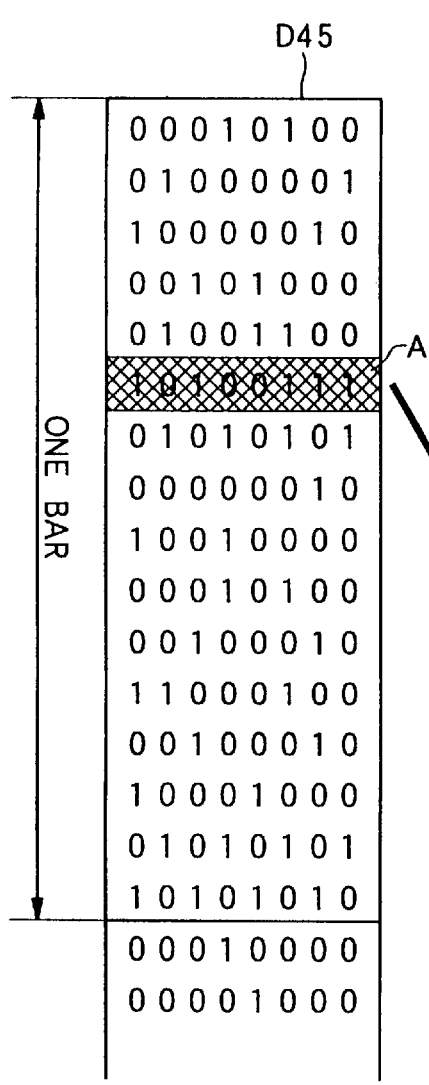

FIG. 16A shows an example of the timing data D45. The timing data D45 is binary data in which one beat has a size of one byte. As described above, the resolution of the timing data D45 is sixteen beats per bar, and consequently, a group of sixteen consecutive bytes forms a data block equivalent to one bar. The bits of one byte of data each correspond to one of the reference marks 203F, 203B, 203L, and 203R of the gauges 202L and 202R. Bits of data "0" denote that the operation timing has not come, and bits of data "1" denote that the operation timing has come. In the edit mode, the values of the bits of the timing data D45 are set in accordance with a command from the player. The edit mode will be explained in detail later.

Here, it is assumed that the lower four bits of FIG. 16A correspond to the gauge 202R on the right side of the game screen 200, and the upper four bits of FIG. 16A correspond to the gauge 202L on the left side of the game screen 200, and that the first and fifth bits correspond to the reference mark 203R, the second and sixth bits correspond to the reference mark 203F, the third and seventh bits correspond to the reference mark 203B, and the fourth and eighth bits correspond to the reference mark 203L. Then, the data on the top line of FIG. 16A forms the head, and when all the data "1" in a fixed range therebelow are replaced by the timing marks 204 and plotted on the gauges 202L and 202R, the arrangement shown in FIG. 16B is obtained.

The resolution of the timing data D45 is set to sixteen beats per bar, as explained above, but when used in the game devices 2 and 3, it is not limited to sixteen beats, but data of eight beats or four beats can be used instead. For example, when the data of FIG. 16A are read out with intervals of one bite therebetween, the timing data D45 can be treated as data of eight beats per bar. The number of beats of the data of the timing data D45 is specified in the edit mode explained later, and information for recognizing this specification is stored in the data information for linking D43 of FIG. 15. By referring to this information, the game devices 2 and 3 are able to correctly judge what number of beats of data the timing data D45 should be treated as.

Figure 16B:
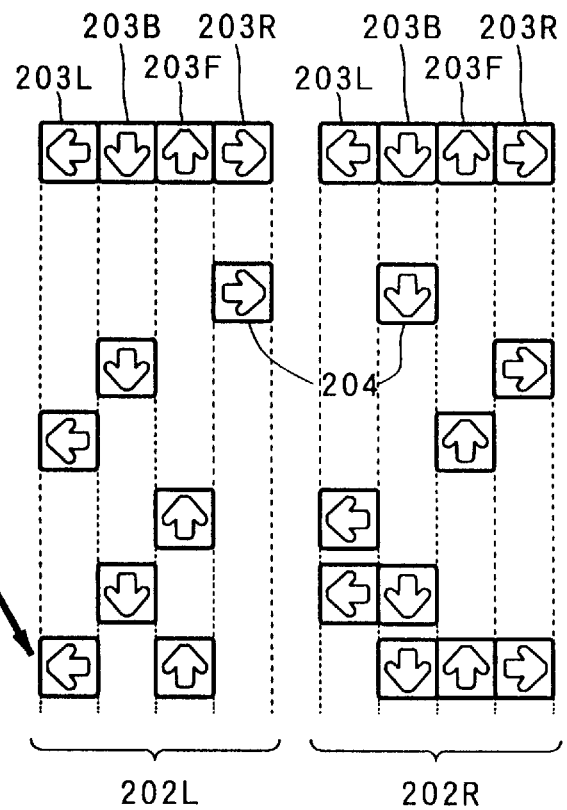

In the data of FIG. 16A, the bottom four bits of the data of the sixth beat from the top (part A in the diagram) include three data of "1", and three timing marks 204 are aligned in the corresponding portion of the gauge 202R shown in FIG. 16B. It is difficult for the player to match places where three or more timing marks 204 are aligned in a row in this way, since he or she controls the foot switches 32 only with his or her feet. Accordingly, the type data D42 of FIG. 15 contains information for judging whether or not such places exist.

Figure 17:
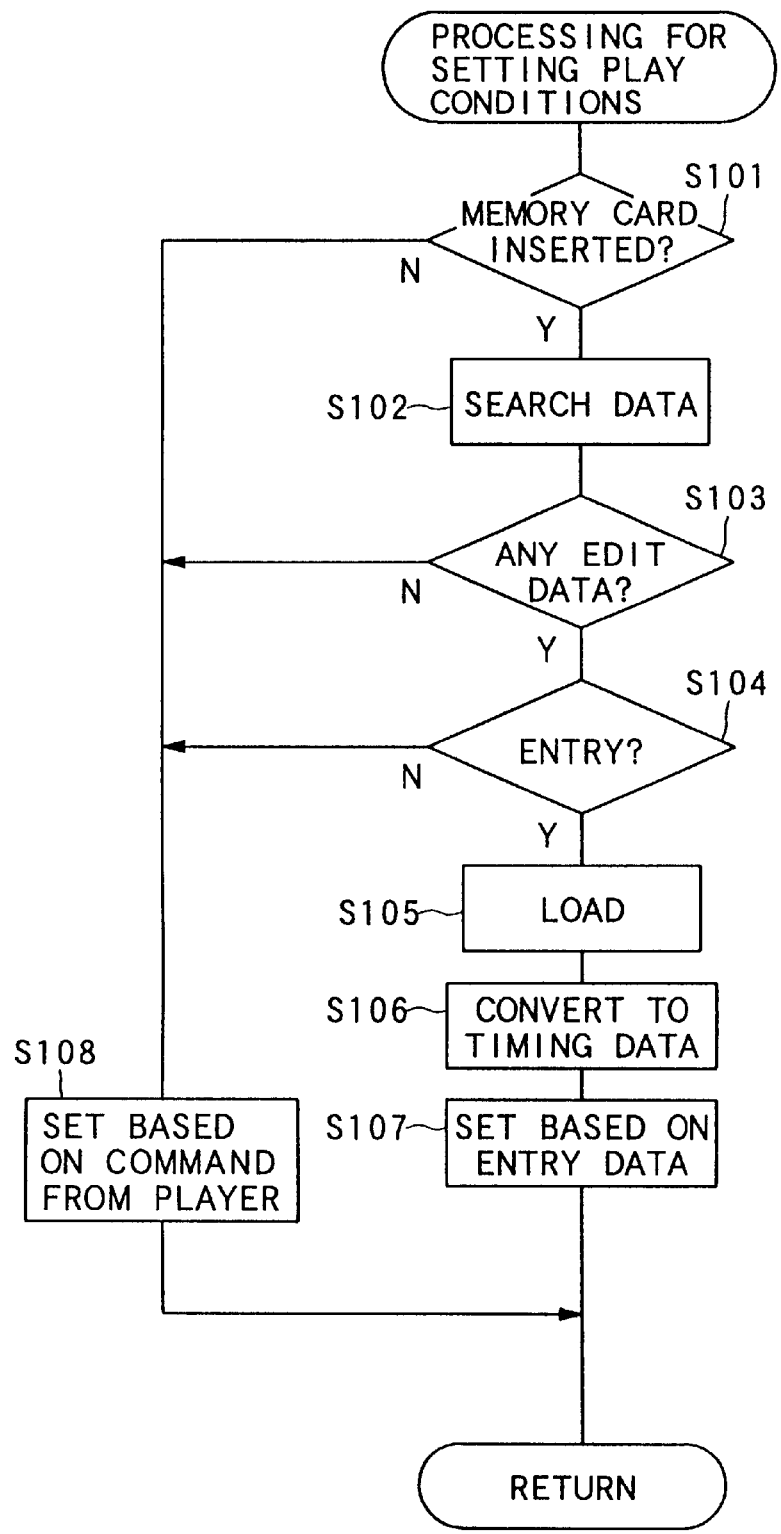
FIG. 17 is a flowchart showing a sequence of processing for setting play conditions executed by a CPU of a game device for business in order to realize play using the edit data file of FIG. 9.
Figure 18:
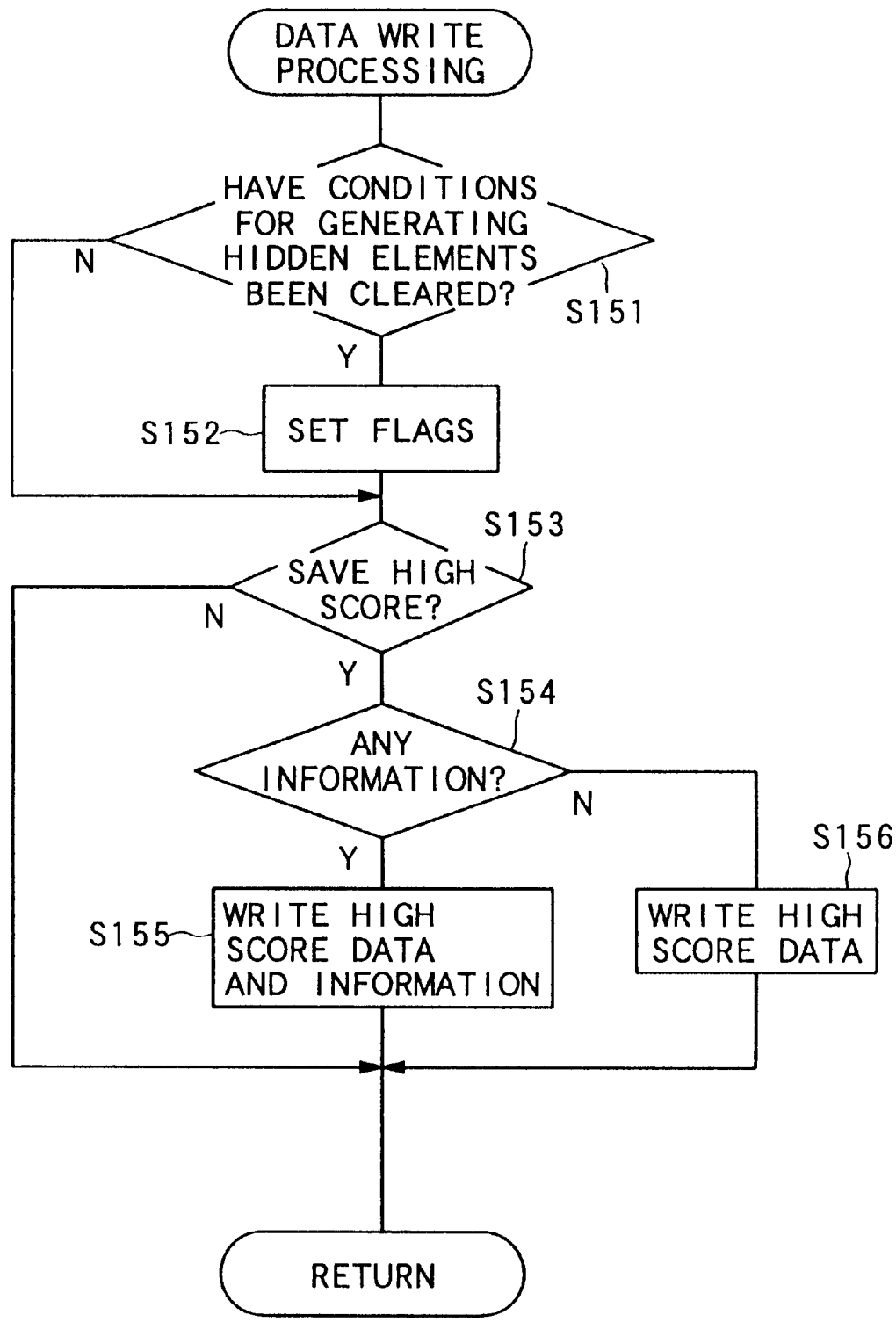
FIG. 18 is a flowchart showing a sequence of write data processing, executed by the CPU of a game device for business in order to write the flag data, high score data and the like of FIG. 9 in the region for AM.
Figure 19:
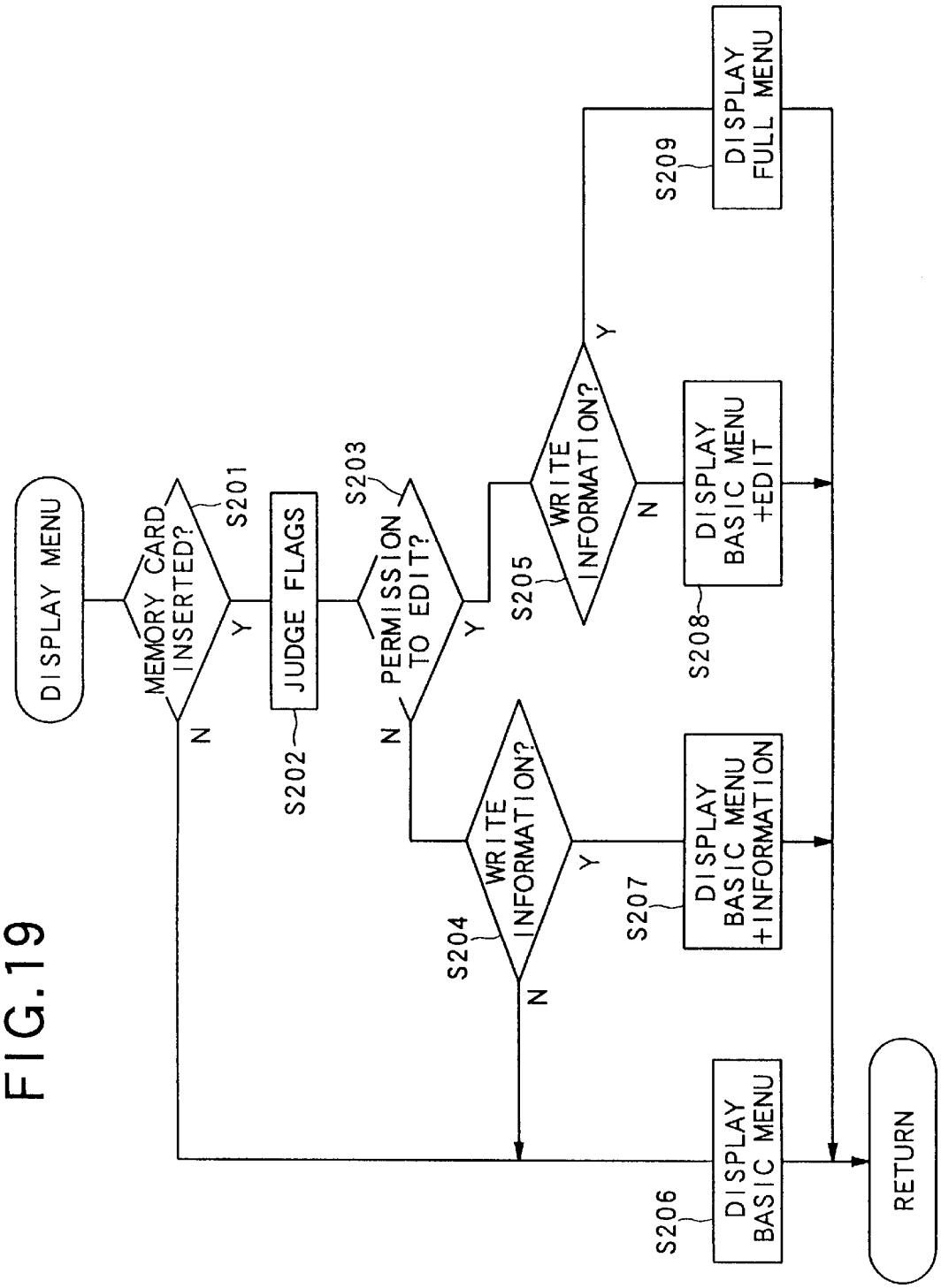
FIG. 19 is a flowchart showing a sequence of switching display contents of a menu, shown by way of example in FIG. 20, in correspondence with the flag data of FIG. 9, as executed by the CPU of a game device for use at home.

Next, link processing using the above data will be explained with reference to FIGS. 17 to 21. FIGS. 17 and 18 show processing in the game device for business 2, and FIGS. 19 and 21 show processing in the game device for use at home 3.

FIG. 17 shows an example of processing to load the timing data for linking D45 in the memory card 4 on the game device for business 2, and play the game thereon. This processing is carried out by for example the CPU 51 as a process of play conditions setting in the Step S1 of FIG. 8. Firstly, in the Step S101, it is judged whether or not the memory card 4 has been inserted into the card slot 20. When the memory card 4 has been inserted, the contents of its data are detected (Step S102), and it is judged whether or not there is an edit data file F2 (Step S103). When there is an edit data file F2 written in the data, confirmation is sought to the player as to whether or not he or she wishes to enter the file F2 into the game device 2 (Step S104). At this stage, the data entry item may be provided as one of multiple selectables displayed on the monitor 109, or the player may select on the monitor 109 whether to enter the data or use the existing data.

When the player gives permission for data entry, the edit data file F2 is loaded from the memory card 4 into a predetermined region of the RAM 53 (Step S105). Then, the loaded data is converted to the same format as the timing data D2 of FIG. 6 (Step S106). This completes the entry of the edit data file F2 from the memory card 4 to the game device for business 2. The processing of the step S106 is carried out since the format of the data on the memory card 4 is different from that of the timing data D2 handled by the game device for business 2, if the edit data file F2 can be used directly in the game device for business 2, the processing of the Step S106 can be omitted.

After data conversion, the processing proceeds to a Step S107, in which the play conditions are set based on the entered timing data D2. As a consequence, a tune provided in correspondence with the edit data D32 (FIG. 14) is automatically selected, and after the game has started, the gauge 202L provided in correspondence with the timing data D45 is displayed on the monitor 14. On the other hand, when it is judged in the Step S101 that the memory card 4 has not been inserted, or when it is judged in the Step S103 that there is no edit data file F2, or when it is judged in the Step S104 that data entry has been rejected, the processing proceeds to a Step S108. In this case, the player selects specific play conditions from among the predetermined play conditions of the game device for business 2. After the processing of the Steps S107 and S108, the processing proceeds to the Step S2.

FIG. 18 shows an example of writing data from the game device for business 2 to the memory card 4. This processing is only carried out when the memory card 4 has been inserted into the memory card slot 20, and is performed by the CPU 51 as part of the end processing of the Step S10 in FIG. 8. However, this processing is not carried out when permission has been given to proceed to the next tune in the Step S10, and the processing of FIG. 18 is performed only when the last music has ended, or when permission has not been given to proceed to the next tune, thereby completely ending the game.

In the first Step S151, the CPU 51 refers to the play results at the end of the game, and judges whether or not the conditions for generating the hidden elements have been satisfied. For example, the conditions for generating the hidden elements are deemed to have been satisfied when the recorded score is higher than a predetermined level, when an evaluation higher than a predetermined level has been given for a specific theme tune, when a predetermined number of tunes has been cleared, and the like. The conditions for generating the hidden elements may be changed.

When conditions for generating the hidden elements have been satisfied, the flag of the hidden elements in the flag data D11 corresponding to the satisfied conditions is set to "1" (Step S152). Then, the processing proceeds to a Step S153. When the conditions have not been satisfied, the Step S152 is omitted. In the Step S153, the player is asked to confirm whether or not the high score data D12 stored in the RAM 53 is to be saved on the memory card 4 (Step S153). The high score data D12 mentioned here relates to the high scores obtained by the player who has inserted a memory card 4 into the memory card slot 20 and played on the game device for business 2. When the player chooses not to save the high score data D12, the processing of FIG. 18 ends.

When the player wishes to save the high score data D12, it is judged whether or not the information to be written onto the memory card 4 as an additional tune data D13 or message board data D14 is already stored in the RAM 53 (Step S154). When the information already exists, the processing proceeds to a Step S155, and if not, to a Step S156. In the Steps S155 and S156, the high score data D12 is written onto the memory card 4, and in the Step S155 in particular, information corresponding to the additional tune data D13 and the message board data D14 is also written on the memory card 4. Furthermore, when the data D12 to D14 are written during the Steps S155 and S156, the flag corresponding to the data flag D11 therein is set to "1". When all the data has been written, the processing of FIG. 18 ends.

Figure 20:
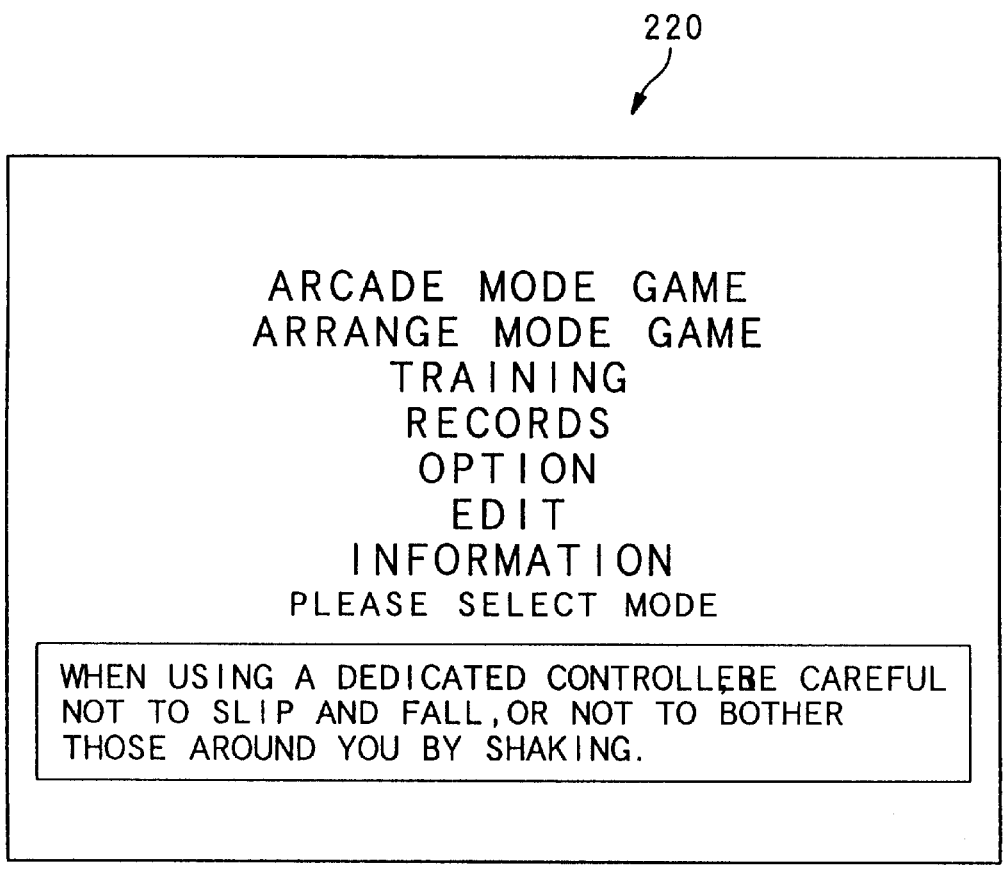
FIG. 20 is a diagram showing an example of a menu screen displayed by the processing of FIG. 19.
Figure 21:
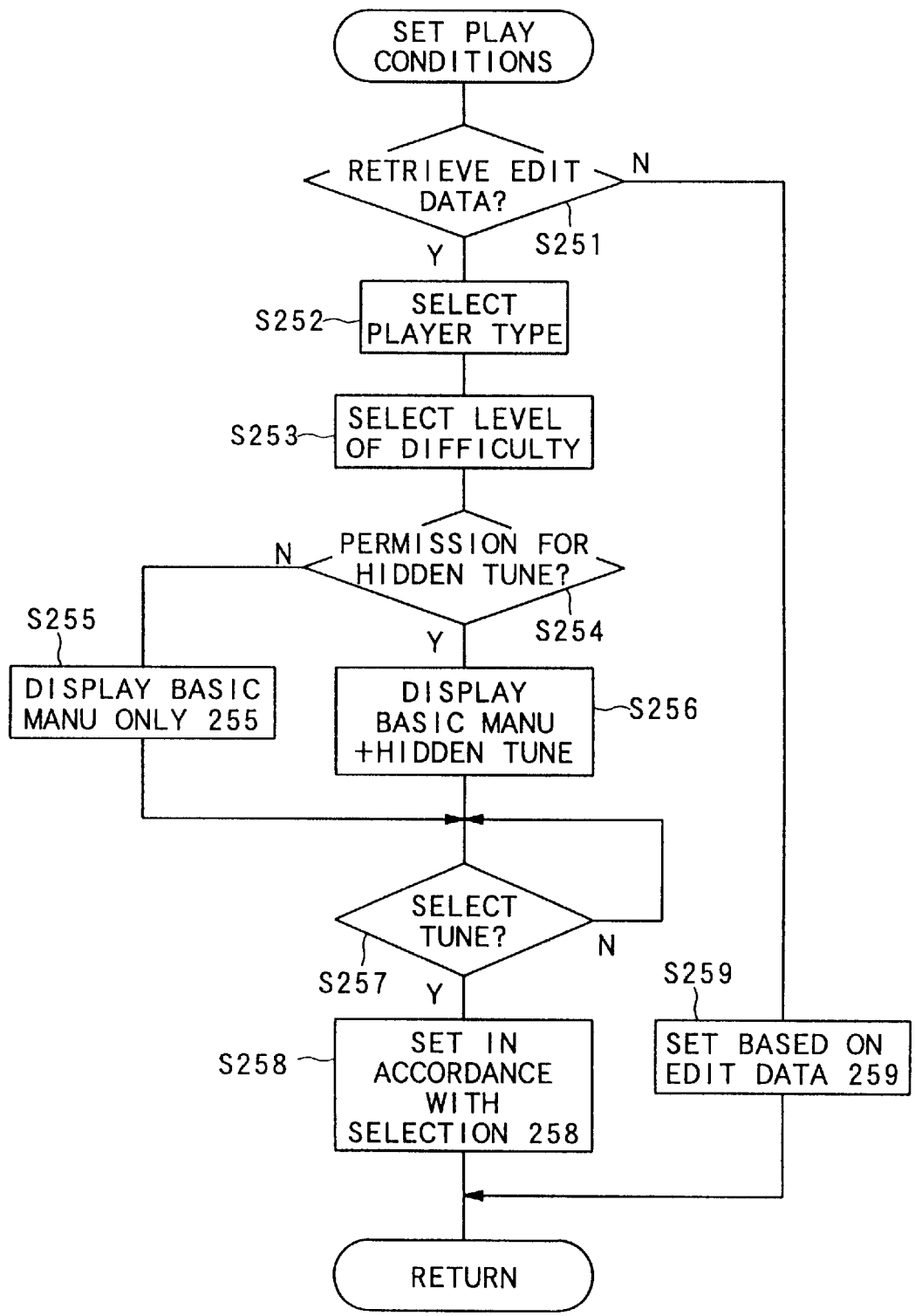
FIG. 21 is a flowchart showing a sequence of processing for setting conditions of play, executed by the CPU of a game device for use at home prior to starting a game.

FIG. 19 shows a display control sequence of a menu screen executed by the CPU 101 at the start of a game in the game device for use at home 3, and FIG. 20 shows an example of a menu screen displayed on the monitor 109 in compliance therewith.

Seven selectable modes are displayed in the menu screen 220 of FIG. 20: "ARCADE MODE GAME", "ARRANGE MODE GAME", "TRAINING", "RECORDS", "OPTION", "EDIT", and "INFORMATION". The player can use the controller 112 to select a optional mode from those displayed on the menu screen 220, and the CPU 101 of the game device for use at home 3 executes processing in compliance with the selected mode.

When "ARCADE MODE GAME" or "ARRANGE MODE GAME" are selected, the game commences in a sequence in compliance with the selected mode. When "TRAINING" is selected, the game commences in practise mode. When "RECORDS" has been selected, play results such as high scores showing previous high scores recorded by the player are displayed on the monitor 109. At this time, a CPU 110 judges whether or not the flag showing that there is high score data D12 in the flag data D11 on the memory card 4 has been set to "1", and if so, the high score data D12 is displayed on the monitor 109. Consequently, the player is able to refer not only to the high scores achieved on the game device for use at home 3, but also to high scores achieved on the game device for business 2. Furthermore, when the number of additional tunes in the additional tune data D13 is a number other than "0", information relating to the added tune (e.g. the title of the tune) can be displayed on the monitor 109 when "RECORDS" is selected.

When "OPTION" has been selected, the play environment of the key configuration and the like of the reference marks 203F, 203B, 203L, and 203R for the operation members of the controller 112 can be set in accordance with a command from the player. When "EDIT" is selected, the edit mode commences, and when "INFORMATION" is selected, the information written in the message board data D14 is displayed on the monitor 109. Information written as the additional tune data D13 may also be displayed here. "EDIT" and "INFORMATION" may or may not appear on the menu screen 220 depending on the state of the flag data D11 mentioned above. The object of the processing shown in FIG. 19 is to switch the display of "EDIT" and "INFORMATION" ON and OFF.

In the processing of FIG. 19, firstly, it is judged whether the memory card 4 has been inserted into the card slot (Step S201). When the memory card 4 has been inserted, the processing proceeds to a Step S206, in which a basic menu is displayed on the monitor 109. The basic menu includes all the modes in the menu screen 220 except "EDIT" and "INFORMATION". In this case, the player is not able to select the "EDIT" and "INFORMATION" modes.

When the memory card 4 has been inserted in the Step S201, the status of the flag data D11 is judged. Then, based on whether or not the edit flag is set to "1", it is judged whether permission has been given for the edit mode (Step S203). When permission has not been given, the processing proceeds to a Step S204, and when permission has been given, the processing proceeds to a Step S205. In the Steps S204 and S205, it is judged whether the message flags are set to "1" When it has been judged in the Steps S204 and S205 that the message flags are set to "0", the processing proceeds to a Step 206 and a Step S208 respectively. When it has been judged that the message flags are set to "1", the processing proceeds to a Step 207 and a Step S209 respectively. In the Step S207, a menu screen comprising "INFORMATION" added to the basic menu described above is displayed, and in the Step S208, a menu screen comprising "EDIT" added to the basic menu is displayed. Then, in the Step S209, the menu screen 220 comprising "EDIT" and "INFORMATION" added to the basic menu is displayed. When one of the menu screens from the Steps S206 to S209 is displayed, processing corresponding to an item selected from the menu is carried out. Therefore, when the menu screen is displayed in the Step S207, the edit mode can not be selected, and when the menu is displayed in the Step S208, a message on the message board does not exist.

When "ARCADE MODE GAME", "ARRANGE MODE GAME", or "TRAINING" are selected from the above menu screen, play commences according to the procedure shown above in FIG. 8. In this case, the play conditions of the Step S1 are set in compliance with the procedure of FIG. 21. That is, this processing updates the selection in accordance with the hidden music flag and the edit data file F2 in the flag data D11 of FIG. 9.

In the processing of FIG. 21, firstly, in a Step S251, it is judged whether the player has used the controller 112 to retrieve the edit data file F2. When the player has retrieved the edit data file F2, play conditions are set so that the game is played in accordance with the timing data D45 in the edit data file F2 (Step S259). In this case, the player plays the game based on timing data he or she has created himself or herself.

When the edit data file F2 has not been retrieved in the Step S251, a player type (one of 1P, 2P, Double Mode) is selected by operating the controller 112 (Step S252), and thereafter, a level of difficulty is selected by operating the controller 112 (Step S253). When the level of difficulty is selected, it is judged whether the flags of the hidden tunes X, Y, and Z in the flag data D11 of the memory card 4 are set to "1". If all the flags are at "0", only the basic tunes not including the hidden tunes are displayed on the monitor 109 for selection (Step S255). On the other hand, when one of the flags of the hidden tunes is set to "1", the hidden tune corresponding to the flag is displayed for selection on the monitor 109 together with the above basic tunes (Step S256).

In the next step S257, it is judged whether the player has selected a tune from the selectable tunes displayed in the Steps S255 and S256. When a tune is selected, play conditions are set in accordance with the player type, the level of difficulty, and the tune selection result (Step S258). When the play conditions are set in the Step S258 and the Step S259, the processing proceeds to the Step S2 of FIG. 8.

According to the above processing, when a flag of a hidden tune is set to "1" by the game device for business 2, the number of selectable tunes in the game device for use at home 3 increases.

The decision of whether or not to show the hidden tunes and hidden modes does not necessarily depend only on the flag data D11 in the region for AM AR1 of the memory card 4. It is acceptable to set flags relating to the appearance of hidden tunes and hidden modes in the flag data D21 stored in the region for CS AR2 of the memory card 4, to rewrite these flags when the play result in the game device for use at home 3 has satisfied a predetermined condition, and thereafter to permit the hidden elements to appear even when the flag data D11 in the region for AM AR1 is set to "0". For example, the edit mode may be set to appear when the number of games played on the game device for use at home 3 has exceeded a predetermined number. Other hidden elements may be introduced when a state of the flag data D11 and D21 forms a specific combination. Thus the conditions under which the hidden elements appear can be set freely in the game device for use at home 3. In the game device for business 2, the flags are merely set in a predetermined manner, and, based on the flags, it is not necessary for the software of the game device for business 2 to know how the hidden elements are to be switched in the game device for use at home 3. Therefore, even when there is some deviation between the software development of the game devices 2 and 3, the consequent limitations on data link-up are negligible.

In the processing of FIG. 21, games can be played on the game device for use at home 3 based on the edit data file F2, but alternatively, play using the edit data file F2 can be restricted only to the game device for business 2. The game device for use at home 3 may be set so that the edit data file F2 can only be used in the "TRAINING" mode.

Figure 22:
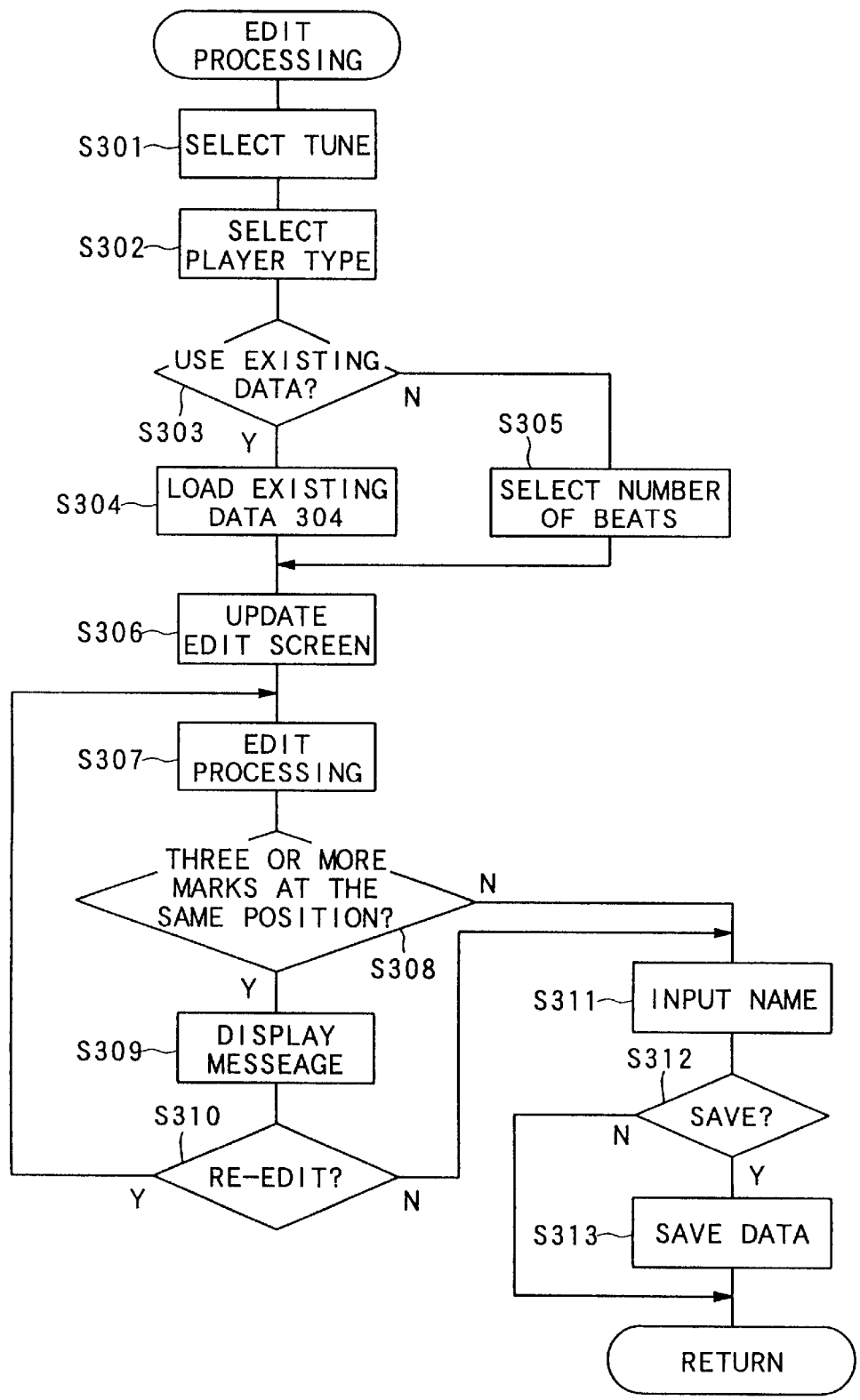
FIG. 22 is a flowchart showing a processing sequence in edit mode, executed in a game device for use at home.
Figure 24:
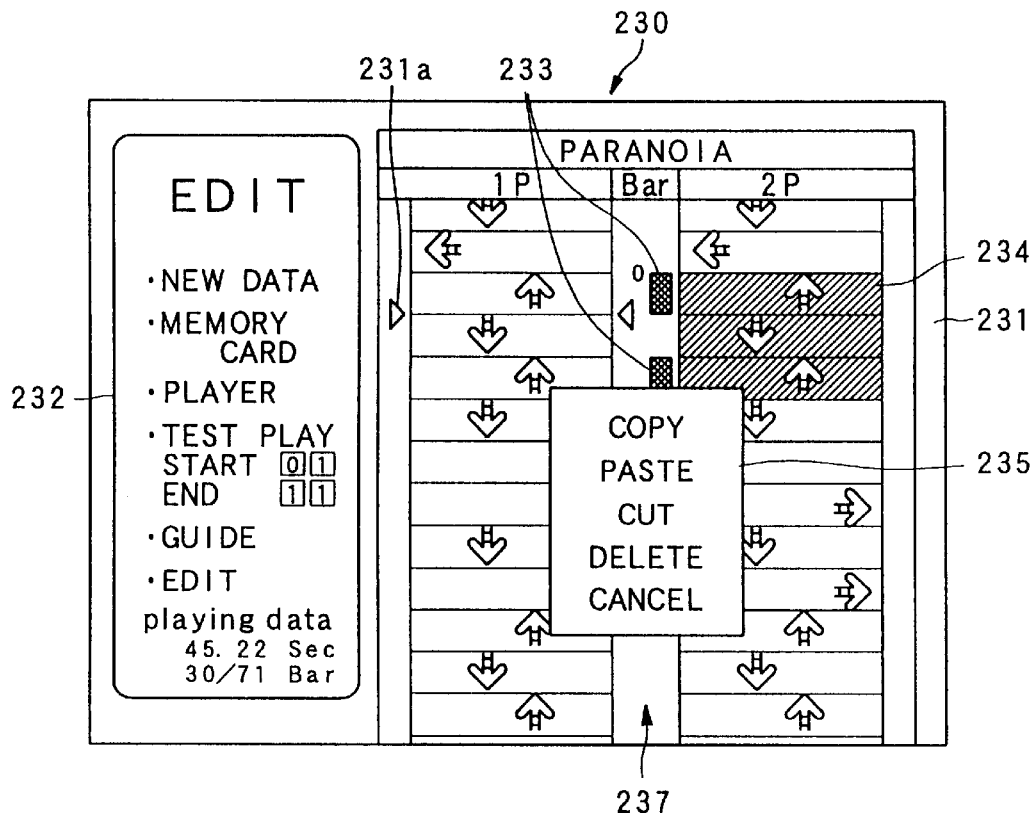
FIG. 24 is a diagram showing an example of an edit screen during editing.
Figure 25:
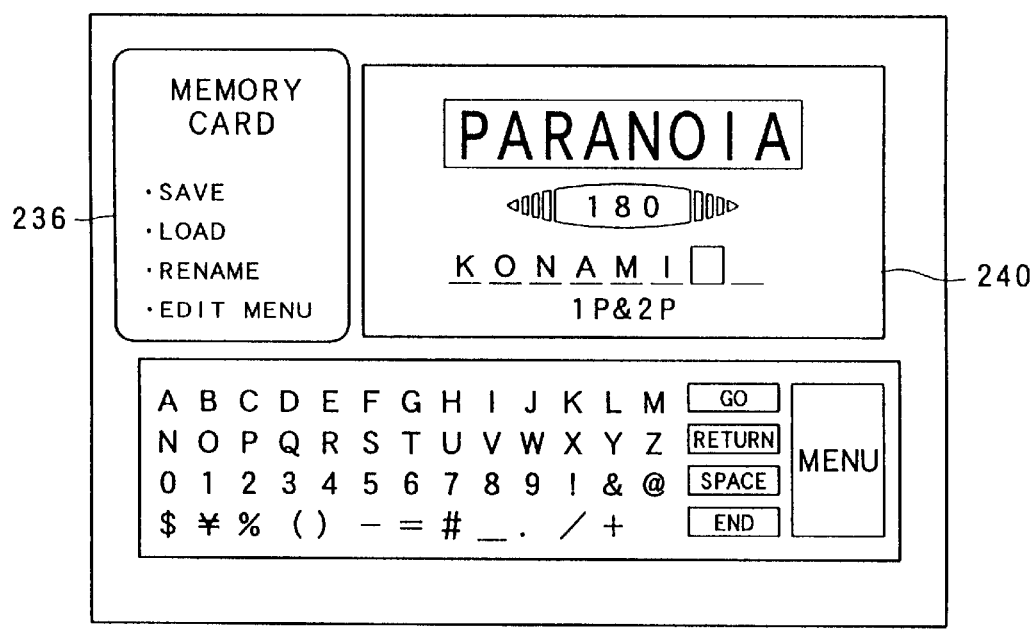
FIG. 25 is a diagram showing a screen for inputting edit names in the edit mode.

Next, the edit mode will be explained. FIG. 22 is a flowchart showing an edit processing procedure performed by the CPU 101 when the edit mode has been selected on the game device for use at home 3, and FIGS. 23 to 25 are examples of screens displayed on the monitor 109 during editing.

Figure 23:
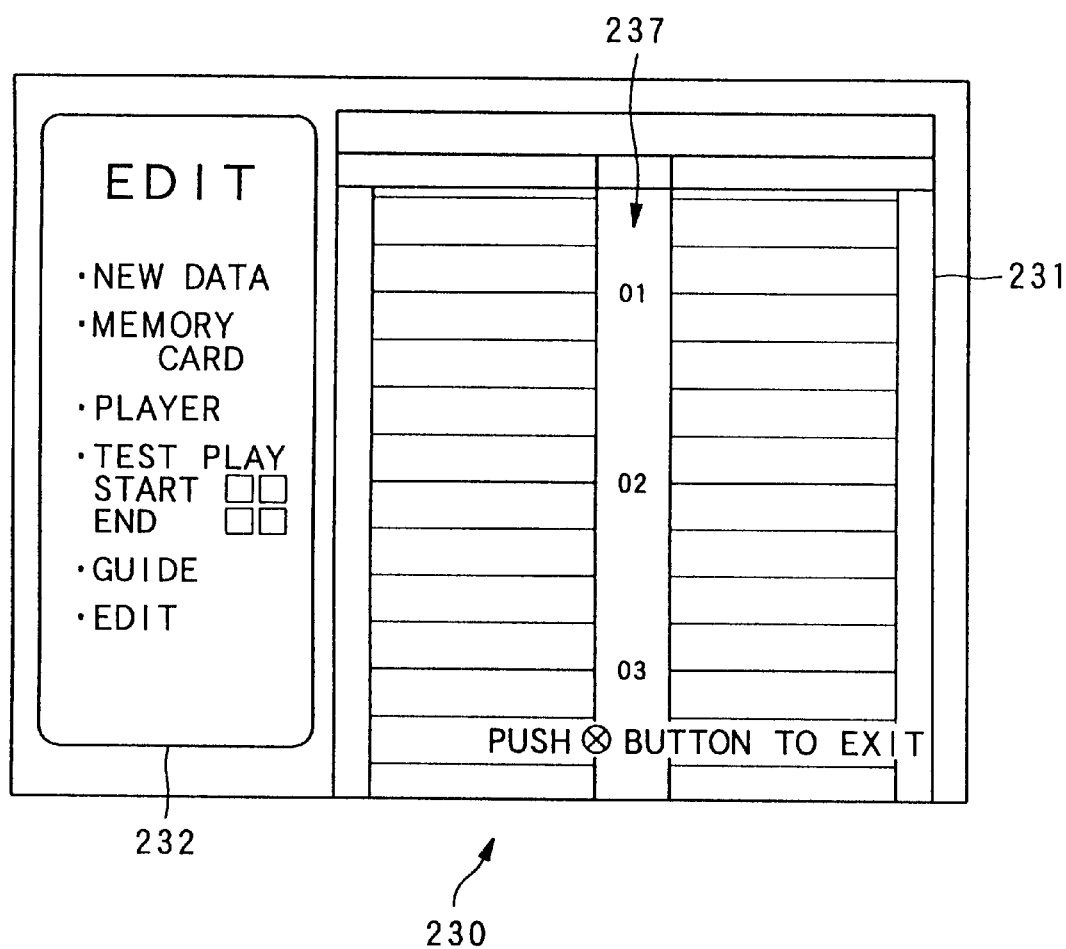
FIG. 23 is a diagram showing an initial state of an edit screen displayed in compliance with the processing of FIG. 21.

When "EDIT" is selected from the menu screen 220 of FIG. 20, the edit screen 230 shown in FIG. 23 is displayed on the monitor 109. The edit screen 230 comprises an edit window 231, and a command select window 232. The window 231 and 232 are alternatively selected as input targets by an operation of the controller 112.

"NEW DATA", "MEMORY CARD", "PLAYER", "TEST PLAY", "GUIDE", and "EXIT" are provided as selectable commands in the command select window 232, and are alternatively selected by a predetermined operation of the controller 112. "NEW DATA" corresponds to the start of new data editing, "MEMORY CARDS" corresponds to operations relating to the memory card 4, "PLAYER" corresponds to the selection of player type, "TEST PLAY" corresponds to playing edit data during editing, "GUIDE" corresponds to retrieving a guide of edit operations, and "EXIT" corresponds to ending edit operations.

When "NEW DATA" is selected in the command select window 232, the edit processing shown in FIG. 22 commences. In this processing, firstly, the tune for which an edit data file F2 is to be created is selected (Step S301). At this time, a menu for selecting the tune is displayed instead of, or together with, the edit screen 230. When the tunes are switched in accordance with a command from the player issued via the controller 112, and a predetermined operation is performed, the tune selected at that moment is set.

In the next Step S302, a player type is selected in accordance with a command from the player. When the tune and player type have been selected, the player confirms whether he or she wishes to load timing data D2 already stored in the CD-ROM 7 which relates to the selected music and player type into a RAM 103 (Step S303). When the player wishes to use this existing data, the data is loaded into the RAM 103 in a Step S304. Then, as shown in FIG. 24, the timing marks 204 in correspondence with operation timings contained in a predetermined region of the loaded data are displayed in the edit window 231 (Step S306). In this case, operation timings stipulated by the existing timing data D2 are edited in accordance with the player's taste. The selected tune is displayed at the top of the edit window 231.

When the player does not indicate in the Step S303 that the existing data should be loaded, the processing proceeds to a Step S305, in which the player sets the number of beats per bar. The number of beats set here specifies how many beats of data should be created for one bar. As described above, the resolution of the timing data D45 is set to sixteen beats per bar, but it may alternatively be set to eight beats or four beats depending on how it is to be used. This point has already been explained above. After the Step S305, the processing proceeds to the Step S306. In this case, since no operation timings have yet been stipulated, there are still no timing marks 204 in the edit window 231, as shown in FIG. 23.

In the next Step S307, the player operates the controller 112 to edit the timing data D45 of FIG. 16A. To do this, the player uses the controller 112 to scroll up and down the images in the edit window 231, changing the edit position specified by the cursor 231a of the edit window 231, and when the cursor 231a has reached a position desired by the player, the player commands to add or delete the timing marks 204 in the edit position by operating one of the operation members corresponding to the timing marks 204F, 204B, 204L, and 204R on the controller 112. When the player has chosen to add a timing mark 204, "1" is written in the bit corresponding to the add position of the timing data D45, and when the player has chosen to delete a timing mark 204, "0" is written in the bit corresponding to the add position of the timing data D45. The timing data 204 at this time is stored in a predetermined work region of a RAM 103. The relationship between the scroll direction through the images of the timing marks in the edit window 231 and the progress of the tune is such that, the farther upward the image is scrolled, the father the edit position on the cursor 231a shifts toward the end of the tune. This point matches the operation of the timing marks 204 in the gauges 202.

As described above, the edit position specified by the cursor 231a changes according to a predetermined scrolling operation by the controller 112, the minimum shift unit at this time differs in correspondence with the number of beats specified by the data loaded in the Step S304, or with the number of beats specified in the Step S305. That is, when sixteen beats have been specified, the position indicated by the cursor 231a shifts at units of one-sixteenth of a bar. When eight beats have been specified, the position indicated by the cursor 231a shifts at units of one-eighth of a bar, and when four beats have been specified, the position indicated by the cursor 231a shifts at units of one-quarter of a bar. As a consequence, when sixteen beats have been specified, all the bits of the timing data D45 can be edited, but when eight beats have been specified, the timing data D45 comprises alternating editable and non-editable regions, there being one of each in each bite of data. Moreover, when four beats have been specified, there is one editable region and three non-editable regions in each bite of the data. The number of beats specified is visually apparent. For example, when the screen shown in FIG. 24 is actually a color screen, the display color of the cursor 231a is altered in accordance with the specified number of beats.

In the editing operation, it is also possible to execute a jump, whereby the display region of data in the edit window 231 is updated by integral multiples of minimum shift units (e.g. one bar). When editing of data for the 2P mode or the Double Mode has been selected, the timing marks 204 are displayed in the 1P side (left side) and the 2P side (right side) of the edit window 231 as shown in FIG. 24, and in this case, one of the 1P side and the 2P side is alternatively selected to be edited.

In order to facilitate editing, area operations can also be performed in the edit mode. Area operations make it possible to instantly select, delete, copy, and shift, all timing marks 204 in a predetermined range. An area operation is for example performed in the following way.

Firstly, when the player uses the controller 112 to perform a predetermined area selection operation, an area selection mark 233 is displayed in correspondence therewith at the edit position in the edit window 231. Next, when the player changes the edit position and repeats the area selection operation, a second area selection mark 233 is displayed at the edit position. The portion between the two area selection marks 233 is selected as the range 234 in which the area operation is to be carried out, and is differentiated from the other portions by a change of color or the like. In this state, when the player uses the controller 112 to perform a predetermined menu retrieval operation, an area selection menu 235 is displayed in the edit window 231. "COPY", "PASTE", "CUT", and "DELETE" can be selected as area processing, and are displayed in the edit window 231. When "CANCEL" has been selected, the area processing is cancelled. The area selection menu 235 closes when area operations end or are cancelled.

When the player uses the controller 112 to select "COPY" or "CUT" from the menu 235, data in correspondence with the arrangement of the timing marks 204 in the target range 234 is stored in a predetermined cut buffer provided in the RAM 103. When "CUT" or "DELETE" are selected, all the timing marks 204 displayed in the target range 234 are instantly deleted. When "PASTE" has been selected, the timing marks 204 corresponding to the data currently stored in the cut buffer are pasted on the region above the edit position on the cursor 231a. This operation is equivalent to copying or shifting timing marks 204 in a target range 234 which has just been selected using "COPY" or "CUT" to the edit position.

When editing ends, the processing proceeds to a Step S308. In the Step S308, it is judged whether there is a portion specified so that three or more timing marks 204 are aligned in the same position in the same gauge 202, that is, a portion stipulated to operate three or more operation members simultaneously (see portion A in FIG. 16A), among the created timing data D45. When such a portion exists, a predetermined message is displayed on the monitor 109 (Step S309), and it is judged whether the player has selected re-editing (Step S310). When re-editing has been selected, the processing proceeds to a Step S307.

On the other hand, when re-editing is not selected, the processing proceeds to a Step S311. The processing also proceeds to the Step S311 when a negative result has been judged in the Step S308. In the Step S311, a predetermined name input screen 240 (see FIG. 25) is displayed on the monitor 109, and the processing is carried out to make the player input an edit name. The name can be input by a conventional text row input method, and further explanation thereof is omitted.

When the name has been input, the player confirms whether to save the created data on the memory card 4 (Step S312), and if so, the data is saved on the memory card 4 (Step S313). When saving data following an affirmative result in the Step S308, the fact of this affirmative result is written in the data information for linking D43 of FIG. 15. Furthermore, information for judging the tune title selected in the Step S301 and the player type selected in the Step S302 is also stored on the memory card 4 as the data information D31 of FIG. 14. When data save is complete, the edit processing ends. When save is not selected in the Step S312, the edit processing ends without saving the data on the memory card 4.

The data can be saved on the memory card 4 during editing. When the player selects "MEMORY CARD" in the command select window 232 of FIG. 24, "SAVE", "LOAD", "RENAME" and "EDIT MENU" are displayed, as in the window 236 of FIG. 25. When "SAVE" has been selected, the data can be saved even during editing. When "Load" has been selected, the player can selectively reload the existing edit data and perform re-editing.

When "TEST PLAY" mode is selected from the command select window 232 of FIG. 24, the player can scroll up the timing marks 204 displayed in the edit window 231 based on the edit data during edit, as described above, and can visually confirm the arrangement of the marks 204 based on the data during editing. If the timing marks 204 can be added and deleted in compliance with the operation of the controller 112 while scrolling, editing workability is improved.

Figure 26A:
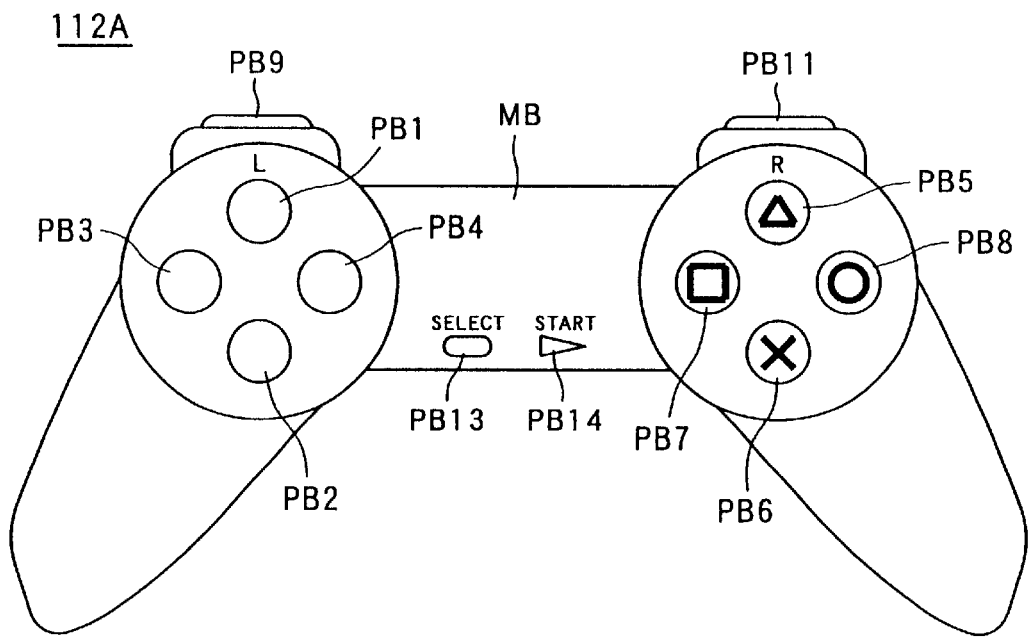
FIGS. 26A and 26B are diagrams showing an example of a controller used in a game device for use at home.
Figure 26B:
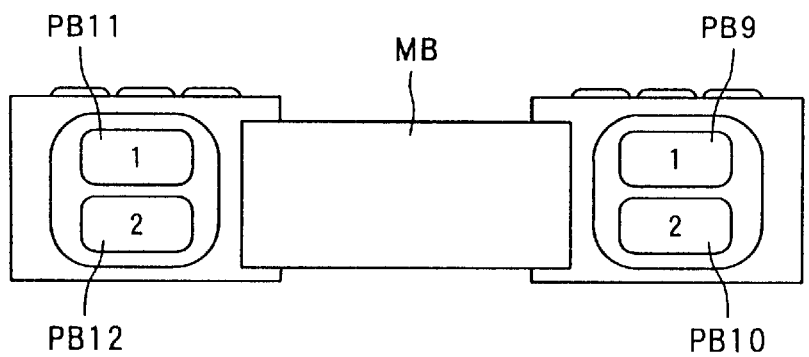

Next, a specific example of edit processing will be explained with reference to FIGS. 26 to 28. FIG. 26A is a plan view of a widely used controller used in the game device for use at home 3, and FIG. 26B is a front view of the same controller. The controller 112A comprises a main body MB which can be held in the hand, and push switches PB1 to PB8, four each of which are provided on the left and right sides of the top of the main body MB. The push switches PB1 to PB4 on the left side function as what are termed direction specification keys for specifying directions up, down, left, and right. In FIG. 26A, the push switches PB1 to PB4 are independent of each other, but alternatively, a single control switch which can be operated in a given direction is sometimes used. A pair of two push switches PB9 to PB12 are provided respectively on the left and right of the front face of the main body MB.

Appropriate signs are provided on or around the push switches PB5 to PB12 so that they can be visually distinguished. In the example shown here, symbols ○, Δ, □, and X are indicated on the push switches PB5 to PB8 respectively. Numeral 1 is displayed on each of the push switches PB9 and PB11, numeral 2 is indicated on each of the push switches PB10 to PB12, a letter L is indicated above the push switch PB9, and a letter R is displayed above the push switch PB11. Consequently, the switch PB5 is abbreviated as the Δ button, the switch PB6 is abbreviated as the X button, the switch PB7 is abbreviated as the □ button, the switch PB8 is abbreviated as the ○ button, the switch PB9 is abbreviated as the L1 button, the switch PB10 is abbreviated as the L2 button, the switch PB11 is abbreviated as the R1 button, and the switch PB12 is abbreviated as the R2 button. Moreover, push switches PB13 and PB14 are provided in the center of the top face of the main body MB. The push switch PB13 functions as a select button, and the push switch PB14 functions as a start button.

FIG. 27 shows the corresponding relationship between push switches PB1 to PB12, and the respective operations allocated thereto in the case where the edit processing is carried out by using controller 112A. Furthermore, FIG. 28 shows the precedure of an editing operation using the controller 112A. The processing of FIG. 28 is carried out after "NEW DATA" has been selected from the items in the command select window 232, a tune for which edit data D45 is to be created has been selected, and the number of beats (resolution) has been selected (the Steps S301 to S306 in FIG. 22), or after commands in the sequence "MEMORY CARD"—"LOAD" have been selected, and data for creating the edit data D45 has been loaded in a predetermined operation region of the RAM 103. More specifically, it is carried out when either of the regions for 1P or 2P of the edit window 231 has been selected for editing.

Figure 28:
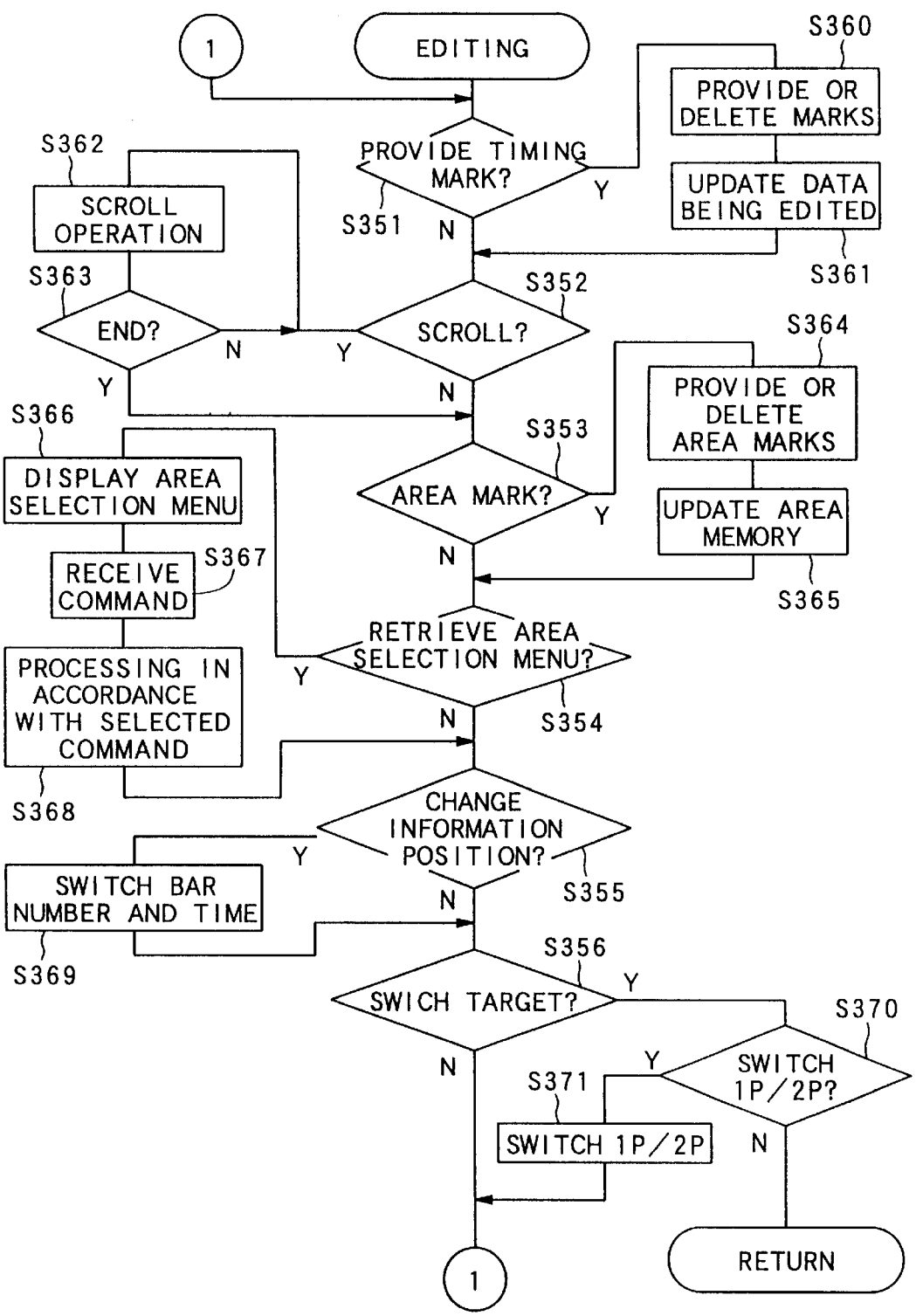
FIG. 28 is a flowchart showing a processing sequence of a CPU during editing.

The processing of FIG. 28 broadly comprises sequentially judging whether the player has operated for arrangement of the timing marks 204, scroll, arrangement of the area marks 233, retrieval of the area selection menu 235, update the position information, and switching of the processing target (Steps S351 to S356)to the controller 112A, and when any of these operations has been carried out, processing is effected in correspondence therewith (Steps S360 to S371). As clearly shown in FIG. 27, the operations of arranging the timing marks 204 corresponds to the operations of the Δ button PB5, the X button PB6, the □ button PB7, and the ○ button PB8; the scrolling corresponds to the operations of the up-direction key PB1 and the down-direction key PB2 (comprising an operation simultaneous to the R1 button PB11); arranging the area marks 233 corresponds to the operation of the L2 button PB10; retrieving the area selection menu 235 corresponds to the operation of the start button PB14; updating the position information corresponds to the operation of the select button PB13; and switching the target corresponds to the operations of the multidirectional keys PB3 and PB4. The processing for each operation is as follows.

When it is judged in the Step S351 that the arrangement operation for the timing marks is carried out, a timing mark 204 corresponding to whichever of the push switches PB5 to PB8 has been pressed is provided at a position specified by the cursor 231a of the edit window 231 (Step S360). However, if the same mark 204 is already provided at the position specified by the cursor 231a, the mark 204 is deleted. For example, when the Δ button PB5 has been pressed after the 1P side of the edit window 231 has been selected for editing, the upwardly pointing arrow-like mark 204F (see FIG. 7) is displayed at a position specified by the cursor 231a. If the mark 204F is already displayed at that position, the mark 204F is cancelled (deleted). The cursor 231a is displayed at the left edge of the one side of 1P region or 2P region of the edit window 231.

When the mark 204 is displayed or deleted, the value of the corresponding bit in the timing data D45 in correspondence therewith is updated (Step S361). Thereafter, the processing proceeds to a Step S352.

In the Step S352, when it is judged that scrolling has been carried out, the processing proceeds to a Step S362, and the screen displayed in the edit window 231 is scrolled up or down, depending on which of the up/down keys PB1 and PB2 is pressed. When the up key PB1 has been pressed, the cursor 231a moves toward the head of the tune, and when the down key PB2 has been pressed, the cursor 231a moves toward the end of the tune. In order to make the movement of the cursor 231a visually perceptible, the screen is scrolled downwards with respect to the operation of the up key PB1, and upwards with respect to the operation of the down key PB2. Furthermore, the scroll unit at this time changes in accordance with the number of beats per bar set for the timing data D45 during editing. That is, when sixteen beats have been selected, the screen is scrolled at units of one-sixteenth of a bar, when eight beats have been selected, the screen is scrolled at units of one-eighth of a bar, and when four beats have been selected, the screen is scrolled at units of one-quarter of a bar. When the up key PB1 or the down key PB2 is operated simultaneous to the R1 button PB11, the scroll unit increases. For example, the screen is scrolled at units of one bar.

In the following Step S363, it is judged whether the scrolling has ended, and if not, the processing returns to the Step S362 and scrolling continues. When the scrolling has ended, the scrolling stops, and the processing proceeds to a Step S353.

When it is judged in the Step S353 that the area mark arrangement operation has been selected, the processing proceeds to a Step S364, and the area mark 233 at that point is displayed at the position specified by the cursor 231a. When the area mark 233 is already being displayed, it is cancelled (deleted). Then, the position of the area mark 233 is set in correspondence with the position of the tune (for example, a certain beat in a certain bar), and stored in the RAM 103 (Step S365), and thereafter, the processing proceeds to a Step S354.

When it is judged in the Step S354 that retrieval of the area selection menu 235 has been selected, the processing proceeds to a Step S366 in which the area selection menu 235 shown in FIG. 24 is displayed. There follows processing for receiving a command selected from those displayed in the area selection menu 235, and processing for executing the selected command (Steps S367 and S368). The contents of processing for each of the commands which can be selected from the area selection menu 235 have already been explained. Unless the area mark 233 is set at two places, it is not possible to specify a range for the "COPY", "CUT", and "DELETE" operations. In such a case, the commands "COPY", "CUT", and "DELETE" cannot be selected, and are therefore displayed in a thinner color thean the other commands, or are not displayed at all. When the Step S368 ends, the processing proceeds to the Step S355.

When it is judged in the Step S355 that position information replacement has been selected, the bar number or time displayed in the edit window 231 are switched (Step S369). That is, as shown in FIG. 23 and FIG. 24, an information display portion 237 is provided between regions corresponding to the 1P side and the 2P side in the edit window 231, and bar numbers "01", "02", "03", . . . are displayed in this portion. When the player operates the select button PB13, the bar number is replaced by the period of time which has elapsed since the head of the tune. Conversely, when the player operates the select button PB13 while the time is being displayed in the information display portion 237, the time is replaced by the bar number. Consequently, the player is able to catch the position in the tune by using the bar number or the time, according to his or her taste. When the processing of the Step S369 ends, the processing proceeds to a Step S356.

When it is judged in the Step S356 that target switch has been selected, the processing proceeds to a Step S370. In the Step S370, it is judged whether the player has specified a command to switch the target of the operation from the 1P side of the edit window 231 to the 2P side, or from the 2P side to the 1P side. When the player has pressed the right key PB4 once while the 1P side is currently selected as the target for editing, it is judged that the player has specified that the target be switched to the 2P side. Conversely, when the player has pressed the left key PB3 once while the 2P side is currently selected as the target for editing, it is judged that the player has specified that the target be switched from the edit window 231 to the command select window 232.

Then, when it has been judged to switch from the 1P side to the 2P side, or from the 2P side to the 1P side, the target region is switched from the 1P side to the 2P side, or from the 2P side to the 1P side (Step S371), and thereafter, the processing returns to the Step S351. On the other hand, when it has been judged not to switch in the Step S370, it is judged to switch the target from the edit window 231 to the command select window 232, the processing of FIG. 28 is cancelled, and processing linked to the selectable items of the command select window 232 is performed, e.g. the edit data D45 in the RAM 103 is saved on the memory card 4. When the target is changed again from the command select window 232 to the edit window 231, the processing of FIG. 28 restarts.

Figure 29:
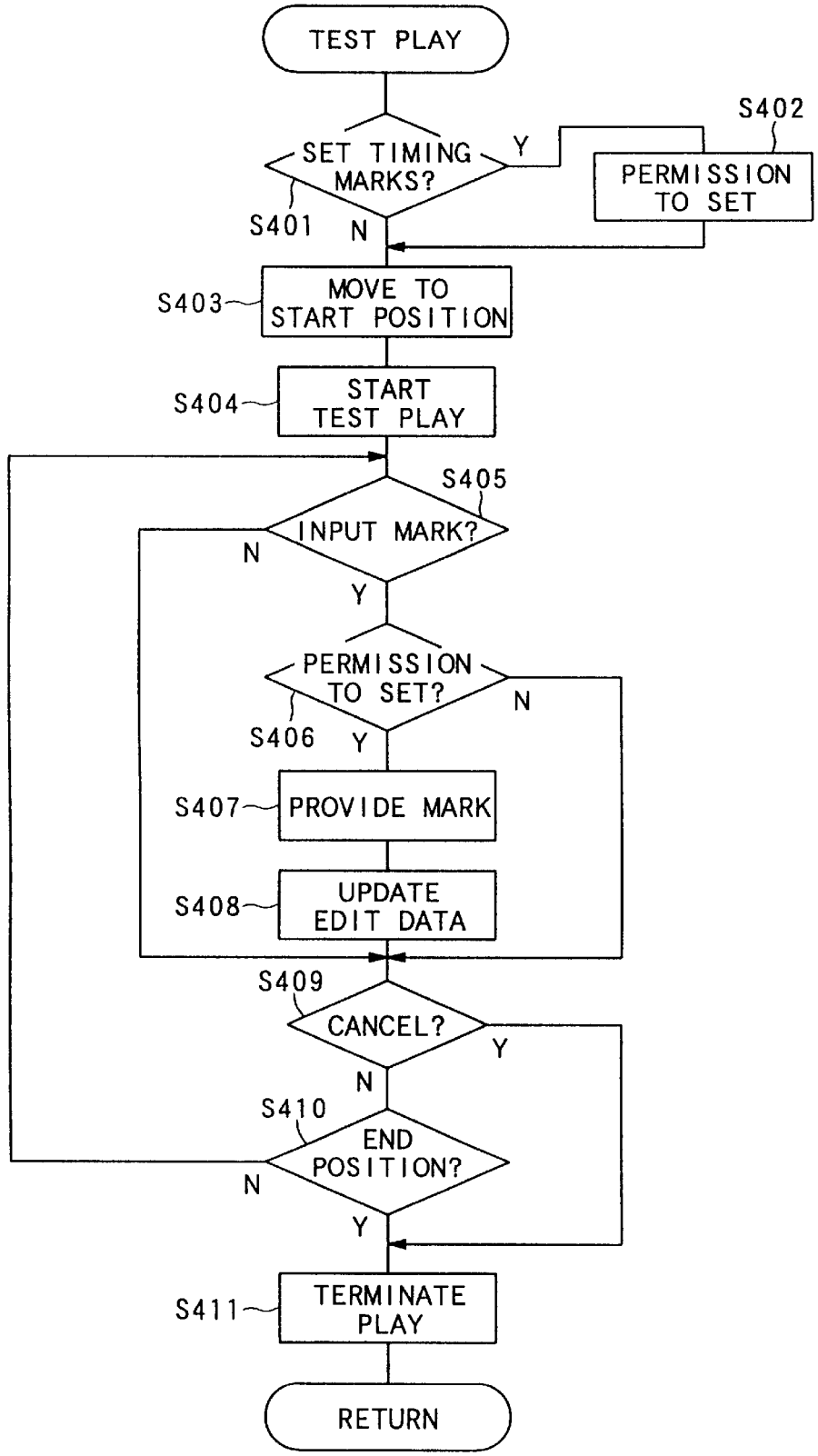
FIG. 29 is a flowchart showing a processing sequence of a CPU during test play.

FIG. 29 shows the procedure of test play processing executed by the CPU 101 when "TEST PLAY" has been selected in the command select window 232. This processing can only be executed when the timing marks 204 are displayed in the edit window 231, that is, when there is timing data D45 in the operation region of the RAM 103 in editing.

Figure 30:
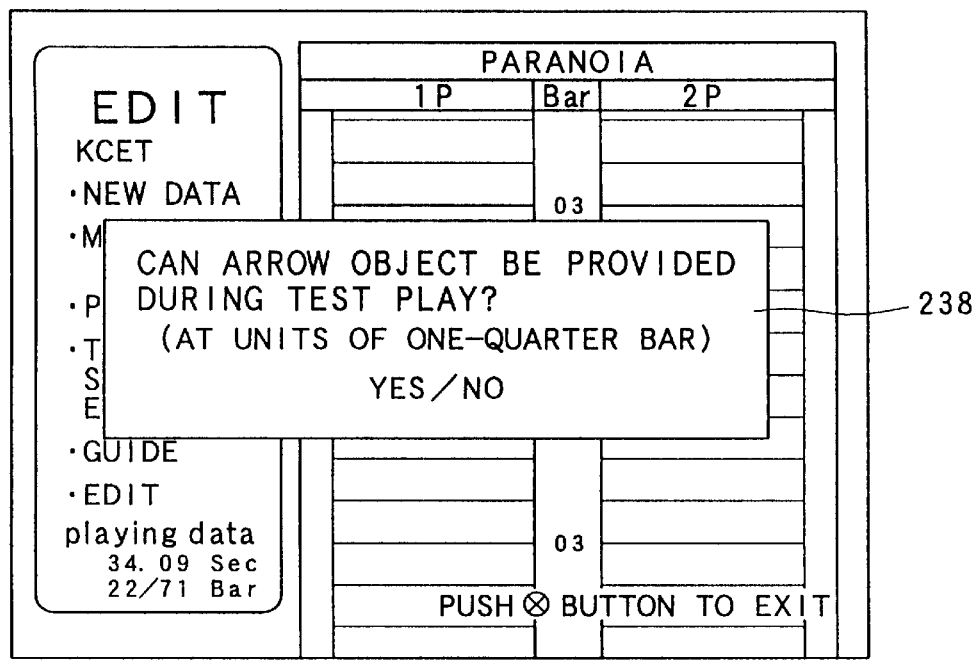
FIG. 30 is a diagram showing an example of a screen displayed during test play.
Figure 31:
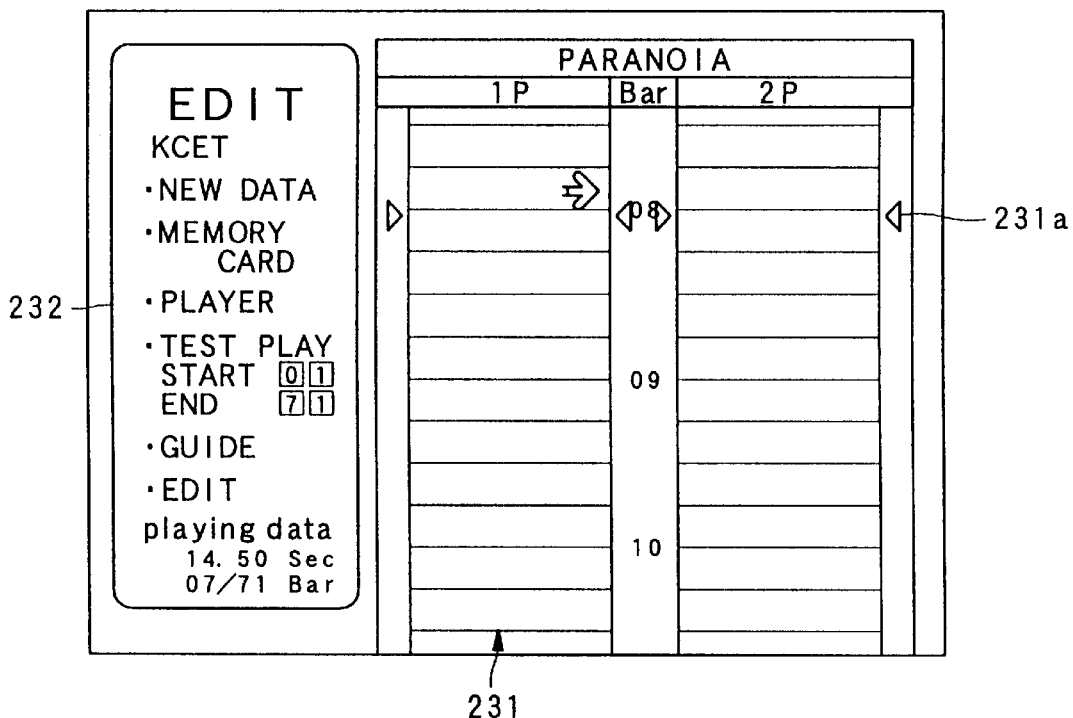
FIG. 31 is a diagram showing another example of a screen displayed during test play.

In the processing of FIG. 29, firstly, confirmation is requested to the player as to whether or not to set the timing marks 204 during play, by for example via a message window 238 as shown in FIG. 30 (Step S401). Here, "Arrow Object" signifies the timing marks 204. Then, when the player requests to set the timing marks 204, information showing permission to set (e.g. a 1-bit flag) is written to the RAM 103 in a Step S402. Then, in a Step S403, the display of the marks 204 in the edit window 231 is updated so that the current performance position shown by the cursor 231a (see FIG. 31) matches the test play start position. The start position corresponds to the bar number ("01" in FIG. 24) displayed in the "START" portion of "Test Play" in the command select window 232. Furthermore, the bar number ("11" in FIG. 24) displayed in the "End" portion corresponds to the end position of the test play. The player can freely change the start position and end position by using the controller 112A as appropriate. These can be made changeable at any time prior to the processing of FIG. 29, or steps for setting the start position and the end position may be provided in the processing of FIG. 29.

Next, test play starts in a Step S404. That is, the scroll starts to shift toward the end position of the screen displayed in the edit window 231, and the tune is reproduced from a position corresponding to the start position in synchronism with the start of the scrolling. The scroll speed may be set slower or faster than the tune tempo. In this case, since the tune does not proceed in synchronism with the scroll, the tune reproduction is omitted.

After the test play has started, the processing proceeds to a Step S405, and it is judged whether the timing mark arrangement operation in the processing of FIG. 28 described above has been carried out. When it is judged that this processing has been carried out, it is judged whether the player has given permission for the timing mark 204 to be set (Step S406). Then, when permission has been given, the timing marks 204 in correspondence with the operation are arranged in the edit window 231 (Step S407), and the edit data D45 is updated in correspondence with the arrangement of the timing marks 204 (Step S408). The timing marks 204 on the 1P side of the edit window 231 can only be set only by the controller 112A connected to the CPU 101 to be used for the 1P, and the timing marks 204 on the 2P side of the edit window 231 can be set only by the controller 112A connected to the CPU 101 to be used for the 2P. For example, when the player has pressed the Δ button PB5 of the controller 112A connected for 1P, the timing mark 204F showing an up arrow is added at a position corresponding to the operation period on the 1P side of the edit window 231, and the bit of the timing data D45 corresponding to the added timing mark 204F is changed to "1". Unlike the processing of FIG. 28, when the arrangement operation has been carried out at a position where a timing mark 204 is already arranged, the timing mark 204 is not deleted.

When the processing of FIG. 28 has ended, or when a negative result has been judged in the Step S405 and the Step S406, the processing proceeds to a Step S409. In the Step S409, it is judged whether test play has been cancelled. Cancellation corresponds, for example, to pressing the start button PB14. When the test play has not been cancelled, it is judged whether scrolling has been carried out until the end position of the test play matches a predetermined position in the edit window 231 (Step S410), and if not, the processing returns to the Step S405. If a positive judgement is given in the Steps S409 and S410, the processing proceeds to a Step S411, in which scrolling in the screen of the edit window 231 stops. The test play thus ends.

By making it possible to edit the timing data D45 during test play in this way, the player is able to add the marks 204 at positions of his or her choice while checking the data he or she has edited himself or herself, thereby improving the efficiency of the editing operation. In the example described above, a test mark 204 was permitted only to add during the test play, but it may also be deleted.

The following additions and modifications of the game system 1 of the above embodiment are possible.

When the play result of the game device for use at home 3 satisfies a predetermined condition, the flags of the hidden elements of the flag data D21 can be rewritten, and these flags can be judged in the game device for business 2 so as to display the hidden tunes and hidden modes. However, it is not appropriate to use the edit mode in the game device for business 2, since it is time-consuming. Accordingly, a mode which changes the normal contents of play, such as, for example, a mode for raising the level of difficulty to a special level, may be provided as a hidden mode in the game device for business 2. Of course, these hidden elements can be added to the game device for use at home 3.

A high score ranking contest is already in existence whereby, when the player has cleared the specific modes provided in the game device for business 2, a symbol "Password" is displayed on the screen, and the player can enter his or her high score on an special internet website by correctly inserting a "password". The password and high score may be written onto the memory card 4 as the message board data D14. As a result, it is not necessary for the player to make a note of the password displayed on the screen in his or her address book or the like.

Timing data entered by the one player may be saved in the RAM 53 so that it can be selected by other players. In this case, by storing the number of times the entered timing data is selected on the game device for business 2, a ranking list of the most popular timing data can be created and publicly displayed.

When using the edit mode on the game device for use at home 3, information about the player (e.g. his or her name and initials) may also be input, and read out in the game device for business 2 when entering edit data thereto. After being read out, the information can be used to manage data such as the historical play record of each player. The data can also be released as information about its creator when another person is playing edit data. Each PDA 5 sometimes has its own identification number (ID). In that case, the personal ID of the PDA 5 can be read by the game device for business 2 and utilised to manage the data. Any data management method may be employed. For example, the game device for business 2 may read the ID of the PDA 5 and store the past records, and, when the same ID is read out many times by the same game device for business 2, that is, when the same player has played many times on the game device for business 2, the flag data D11 in the PDA 5 is rewritten, or a specific message is written in the message board data D14.

Furthermore, the PDA 5 is capable of transmitting and receiving data to and from another PDA 5, or another infrared receiver, using its own infrared communications function, and timing data created by the player may be itself transferred by transmitting and receiving the timing data to and from the other PDA 5. In addition, when timing data has been transmitted and received more than a predetermined number of times, the flag data D11 may be rewritten by a program in the PDA5.

When a game is executed on the game device for use at home 3, the additional tune data D13 and the message board data D14 written on the memory card 4 may be automatically displayed on the monitor 109 at a timing which does not interfere with the progress of the game. For example, when the necessary data is read out from the CD-ROM 7 as the player finishes one music and proceeds to the next tune, the time taken to read this data can be used to display a message corresponding to the message board data D14, and information corresponding to the additional tune data D13, on the monitor 109.

When the additional tune data D13 is stored, since the data required to play the data D13 is not in the CD-ROM 7 and the capacity of the memory card 4 is insufficient for storing the data D13, in the above embodiment, only the titles of additional tunes can be stored on the memory card 4 and viewed on the monitor 109. However, if a memory medium having sufficient memory capacity for general audio data, such as a photomagnetic memory medium or a miniturized hard disk memory device, can be used to exchange data between the game devices 2 and 3, the audio data and timing data of the additional tunes can be transferred to the memory medium by the game device for business 2 and set in the game device for use at home 3, thereby enabling the additional tunes to be played. Alternatively, when the audio data and timing data of the additional tunes are stored on a CD-ROM 7 sold separately, the player need only be informed by the additional tune data D13 or the message board data D14 that he or she can play the additional tunes by using the CD-ROM 7. When only the timing data D2 is transferred to the PDA 5 using the infrared communications unit 21, and the gauges 202 are displayed on the screen thereof, the game can be played without music.

In this case, the PDA 5 can be effectively utilized as a practice device in the game device for business 2 or the like.

The message board data D14 is not restricted to textual data, and may comprise image data. Information needs to only be stored in a memory medium (such as a CD-ROM) which is readable by the game device for use at home 3, and distributed to homes as a magazine extra or the like. The information can then be read from the memory medium and displayed on the monitor 109 when, for example, the "INFORMATION" mode of FIG. 20 is selected.

The functions realized by linking up the present invention are not limited to those of the embodiment described above. For example, the reference marks 203 and timing marks 204 displayed on the game screen 200 can be edited by the game device for use at home 3, stored on the memory card 4, read out by the game device for business 2, and displayed on the monitor 14. An embodiment relating to such a link-up is explained below.

Figure 32:
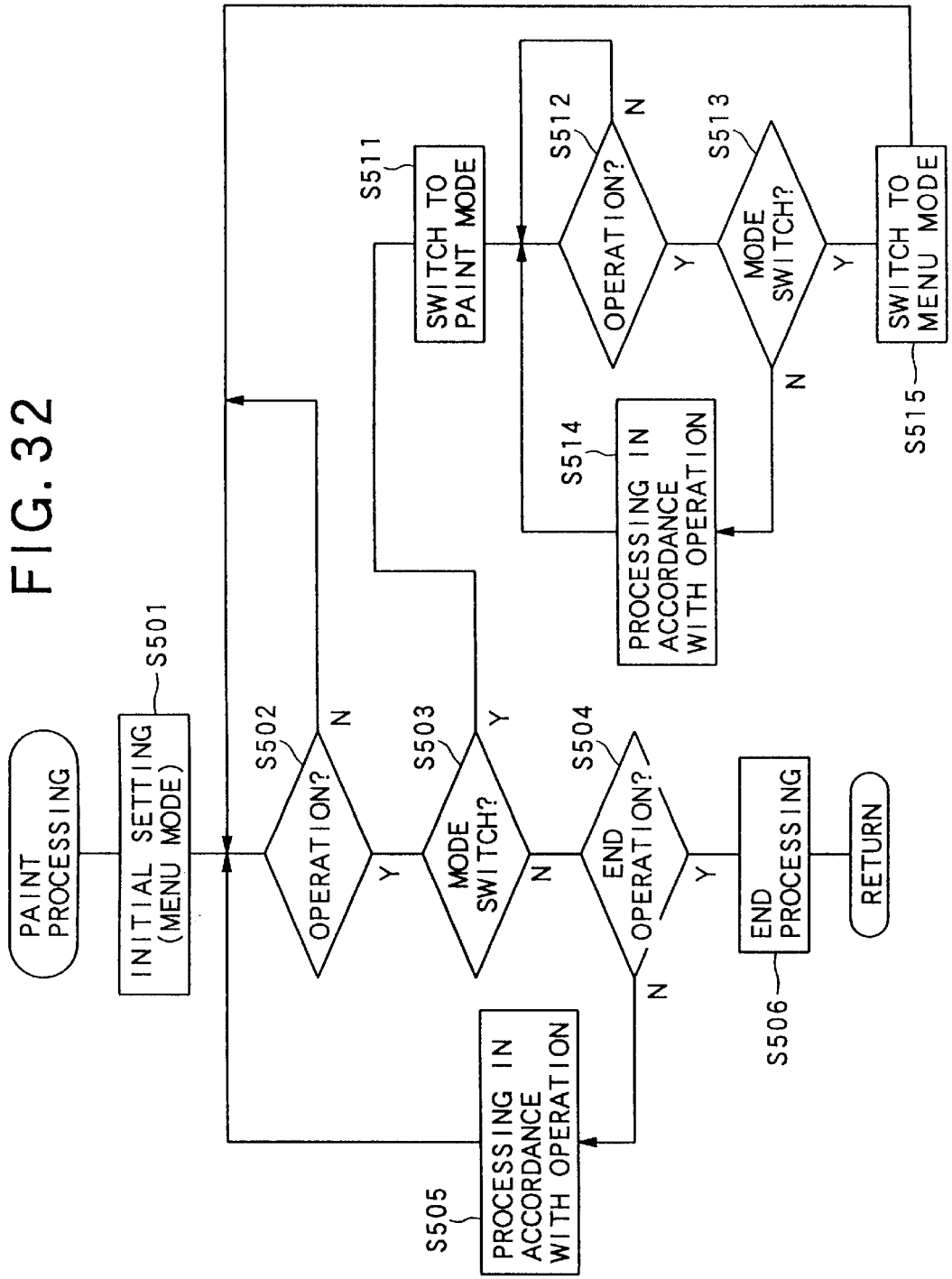
FIG. 32 is a flowchart showing a processing sequence to enable the player to create marks used in an operations guide.

FIG. 32 shows an embodiment of paint processing carried out by the CPU 101 of the game device for use at home 3 in order to edit (paint) the marks 203 and 204. "PAINT" is added to the menu screen 220 of FIG. 20 as a mode for displaying the marks 203 and 204, and paint processing is carried out when the player selects this item from the menu screen 220. The "PAINT" item may be set as a hidden element, similar to "EDIT" and the like, which appears when predetermined conditions are satisfied. The decision of whether or not to display "PAINT" as a hidden element can be judged by the same processing sequence as FIG. 19 using the flag data D11 and D21 of FIG. 9, for example. Alternatively, permission to display "PAINT" may be given when a specific command has been input using the controller 112 of the game device for use at home 3.

When the paint processing of FIG. 32 starts, initialization required to perform the paint processing is carried out (Step S501). For example, from the two modes comprising menu mode and paint mode prepared for paint processing, menu mode is selected as the initial setting. Next, it is judged whether or not the player has operated the controller 112 (Step S502), and if not, the judgement is repeated until the controller 112 is operated. When the controller 112 is operated, it is judged whether or not the operation is a command to switch the mode (Step S503). When the operation is not a mode switch, it is judged whether or not the operation is a command to end paint processing (Step S504). When it is not an end operation, processing corresponding to the operation detected in the Step S502 is carried out (Step S505), and thereafter, the processing returns to the Step S502. A specific example of the processing of the Step S505 will be explained later. When an end operation is judged to have been carried out in the Step S504, processing is performed to end the paint processing (Step S506), and the paint processing then ends.

When a mode switch operation is judged to have been carried out in the Step S503, the processing is switched to paint mode (Step S511). Next, it is judged whether or not the controller 112 has been operated (Step S512), and if not, the judgement is repeated until the controller 112 is operated. When the controller 112 is operated, it is judged whether or not the operation is a mode switch operation(Step S513). When it is not a mode switch operation, processing is carried out in accordance with the operation detected in the Step S512 (Step S514), and thereafter, the processing returns to the Step S512. A specific example of the processing carried out in the Step S514 will be explained later. When a mode switch operation has been judged to have been carried out in the Step S513, the processing is switched to menu mode (Step S515), and then returned to the Step S502.

Figure 34:
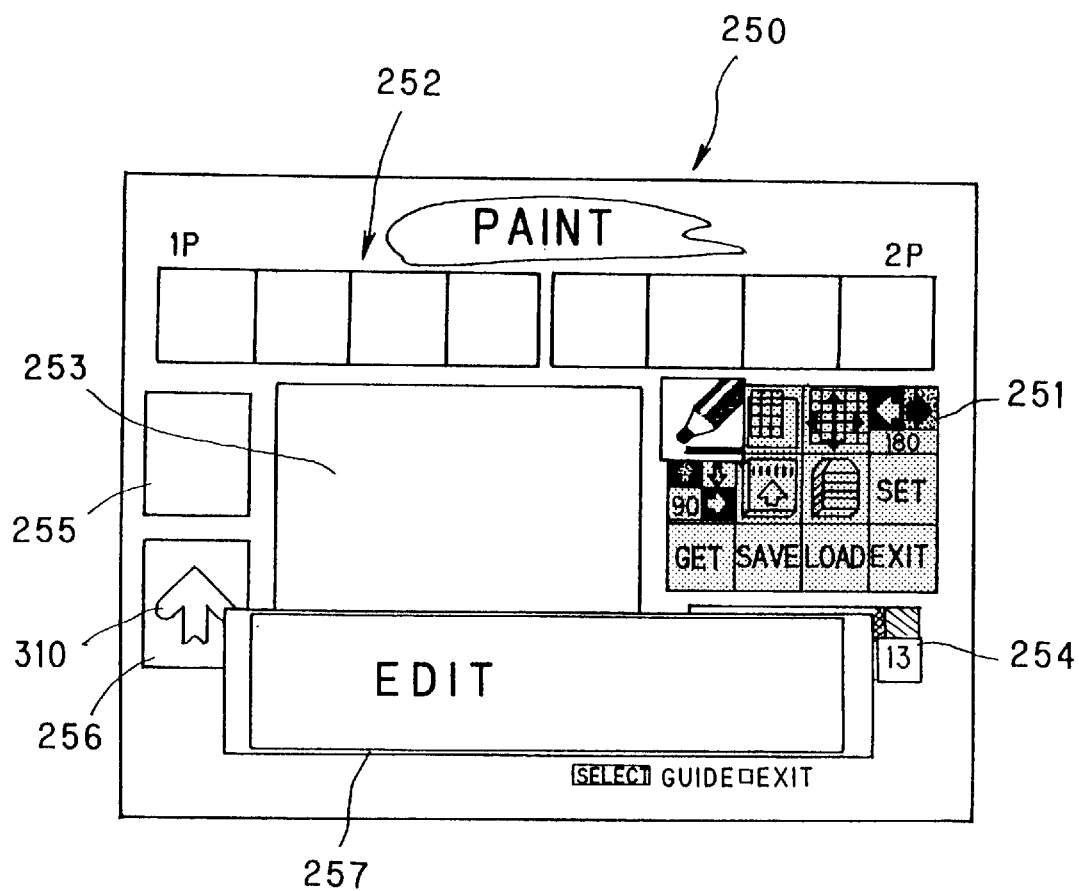
FIG. 34 is a diagram showing an edit screen when a menu mode has been selected in the paint processing of FIG. 32.
Figure 35:
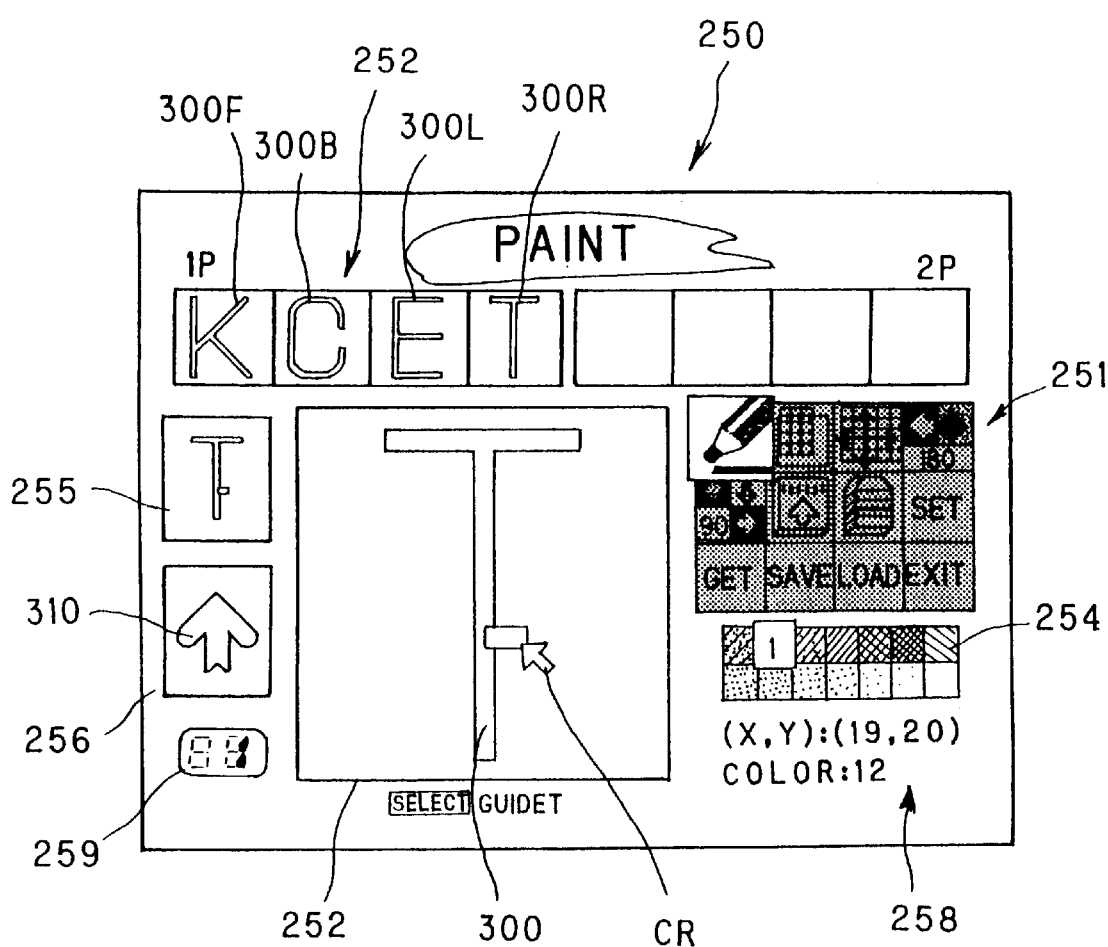
FIG. 35 is a diagram showing an edit screen when a paint mode has been selected in the paint processing of FIG. 32.

FIG. 33(a) shows the relationship between the operation of the controller 112 (FIG. 26) and the processing executed in the Step S505 in menu mode, and FIG. 33(b) shows the relationship between the operation of the controller 112 (FIG. 26) and the processing operated in the Step S514 in paint mode. Furthermore, FIG. 34 and FIG. 35 show examples of a paint screen 250 displayed on the monitor 109 during paint processing. FIG. 34 shows the screen during menu mode, and FIG. 35 shows the screen during paint mode.

As is clear from FIGS. 34 and 35, a menu 251, a mark panel 252, a canvas 253, a color palette 254, a confirmation panel 255, and a reference panel 256, are displayed on the paint screen 250. The menu 251 is divided into blocks of three lines and four columns. The commands which can be selected in the menu mode are allocated to each block, and icons representing the commands are displayed on the blocks.

The canvas 253 is set as a region for the player to paint images (termed "objects") displayed as the marks 203 and 204. The mark panel 252 is divided on the left and right into a 1P side and a 2P side, each comprising four blocks, and objects 300F, 300B, 300L, and 300R (hereinafter sometimes represented by a single reference code 300) corresponding to the foot switches 32F, 32B, 32L, and 32R, are displayed in the blocks (see FIG. 35). Possible colors to be selected for the objects 300 painted on the canvas 253 are displayed in a row in the color palette 254. In the paint mode, the block corresponding to the selected color is displayed in a larger size than the other colors, and a color number is displayed inside the block (a separate number is provided for each color).

The object 300 being painted on the canvas 253 is displayed on the confirmation panel 255 as is in the state being displayed actually in the gauges 202. An official mark 310 is displayed on the reference panel 256. The official marks 310 used here comprises arrow objects prepared beforehand for displaying the marks 203 and 204 in the gauges 202, and are stored as image data in the CD-ROM 7.

Moreover, as is clear from FIG. 34, during the menu mode, a message window 257 is displayed over the canvas 253 and the like. Furthermore, as shown in FIG. 35, during the paint mode, an arrow-like cursor CR is displayed on the canvas 253. Then, indicator representing the head of the cursor CR, and the number of the color allocated to those indicator, are displayed in an information display portion 258 below the color palette 254. A color number display portion 259 appears below the reference panel 256, and the number of the color currently selected from the color palette 254 is displayed therein.

Next, the relationship between the operations of the controller 112 in the menu mode and paint mode, and the processing carried out in correspondence therewith will be explained.

Firstly, processing in the menu mode will be explained. As is clear from FIG. 33(a), in the menu mode, when the direction keys PB1 to PB4 of the controller 112 are operated, one of the blocks in the menu 251 is selected, and when the ○ button PB8 is pressed, the command allocated to block selected at that point is executed. In FIG. 34, the block at the top left of the menu 251 has been selected, and the block being selected is displayed at a larger size than the other blocks in order to inform the player of this fact. The following commands are allocated to each blocks of the menu 251.

Switching to the paint mode, switching the grid display on the canvas 253 ON and OFF, moving the image (object 300) displayed on the canvas 253, and inverting the image left and right, are allocated to the top blocks in the menu 251 in sequence from left to right. The grid is displayed so as to cut across the canvas 253 in a lattice shape. The object 300 is moved by, for example, pressing the ○ button PB8 of the controller 112 while operating the direction keys PB1 to PB4 to specify the move direction.

Next, rotating the image displayed on the canvas 253 clockwise by 90 degrees, selecting a sample image displayed on the canvas 253, eliminating (deleting) the image displayed on the canvas 253, and setting the image at a specific position (a position specified by the cursor CR) in the canvas 253, are allocated to the middle blocks of the menu 251 in sequence from left to right. Several sample images are prepared beforehand in the CD-ROM 7, and a desired image is displayed on the canvas 253 by a predetermined operation of the controller 112.

Furthermore, acquiring an image at a specific position in the canvas 253, storing data (paint data) of the object 300 created by the paint processing on the memory card 4, reading the paint data from the memory card 4, and ending the paint processing, are allocated to the lower blocks of the menu 251 in sequence from left to right.

Of the above commands, when the top left block has been selected and a determination operation has been carried out, the Step S503 in the processing of FIG. 32 is judged to be affirmative, and the processing proceeds to a Step S511. Furthermore, when the bottom right block has been selected and a determination operation has been carried out, the Step S504 in the processing of FIG. 32 is judged to be affirmative, the processing proceeds to a Step S506. When one of the other operations is carried out, the Step S504 is judged to be negative, and the processing allocated to each blocks changes to the processing of the Step S505. As clearly shown in FIG. 33(a), when the start button PB14 has been pressed, the processing switches to the paint mode irrespective of the selection of the menu 251. In this case also, the Step S503 in the processing of FIG. 32 is judged to be affirmative, and the processing proceeds to the Step S511.

On the other hand, in the paint mode, the processing shown in FIG. 33(b) is carried out in accordance with an operation of the controller 112. Firstly, when the direction keys PB1 to PB4 are operated, the cursor CR moves in a direction corresponding to the direction of the operation. For example, when the up key PB1 has been operated, the cursor CR moves upwards for the duration of the pressing of the button PB1. When the Δ button PB5 has been operated, a predetermined range is displayed in color in a range selected from the color palette 254 based on the cursor position (the position specified by the head of the cursor CR). In the case, when Mc represents the minimum amount of movement in the up, down, left, and right directions of the cursor CR, the predetermined range is equivalent to Mc×Mc horizontally and vertically. Hereafter, this range will be termed the minimum paint range. When the X button PB6 has been operated, the minimum paint range based on the cursor position is changed to a color corresponding to the color number 0. The color number 0 is, for example, a background color of canvas 253, when the □ button PB7 has been operated, the color number of the cursor position is judged by the CPU 101, and the color selected from the color palette 254 is changed to the color corresponding to the number of the judged color. When the ○ button PB8 is operated, the minimum paint range based on the cursor position is changed to the color selected from the color palette 254.

When the L1 button PB9 has been operated, the color selected from the color palette 254 is changed to a color corresponding to the immediately preceding color number. Furthermore, when the R1 button PB11 has been operated, the color selected from the color palette 254 is changed to a color corresponding to the immediately subsequent color number. When the L2 button PB10 has been operated, the official mark 310 displayed in the reference panel 256 is displayed by animation in the same manner as it is actually displayed in the gauges 202. When the R2 button PB12 has been operated, the mark (object) being painted on the canvas 253 is displayed by animation in compliance with a predetermined procedure. For example, the color of the object 300 is switched gradually in compliance with a predetermined procedure.

Figure 36:
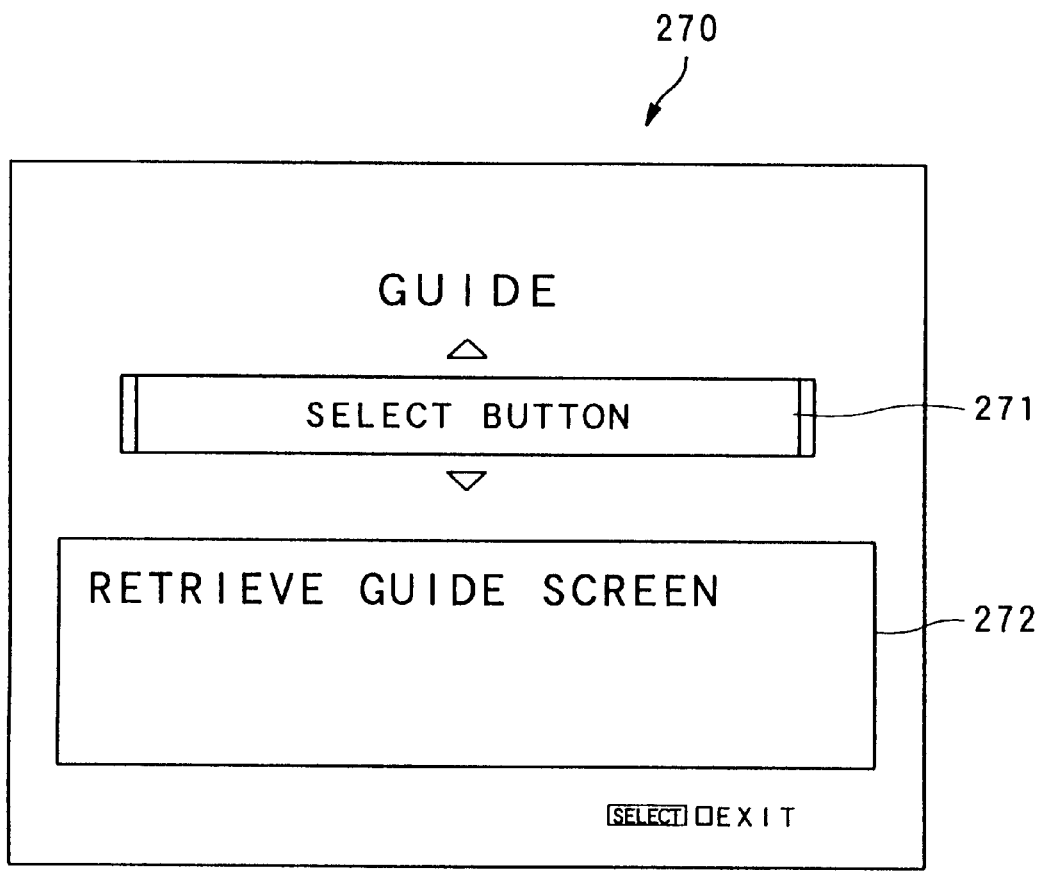
FIG. 36 is a diagram showing an example of a guide screen displayed in the paint processing of FIG. 32.

Moreover, when the select button PB13 has been operated, the guide screen 270 shown in FIG. 36 is displayed. The guide screen 270 comprises a top window 271 for displaying information (e.g. names of members) for identifying the operation members on the controller 112, and a bottom window 272 for displaying the commands allocated to the operation members displayed in the top window 271. The information displayed in the windows 271 changes in accordance with the operations of the controller 112. The player can understand the processing in the paint mode by referring to these windows. When, for example, the select button PB13 of the controller 112 is operated, the guide screen 270 closes and the paint screen 250 of FIG. 35 is displayed.

The above processing is executed as processing of the Step S514 of FIG. 32. On the other hand, when the start button PB14 of the controller 112 is operated in the paint mode, the mode switches to menu mode. In this case, the Step S513 of the processing of FIG. 32 is judged to be affirmative, and the processing returns to the Step S502.

In the paint processing described above, a desired object can be selected from the objects 300 displayed in the mark panel 252 in accordance with a predetermined operation for the controller 112, can be displayed on the canvas 253, and can be edited in the paint mode as the player's taste. Furthermore, images can be freely painted on a canvas 253 having no objects 300, and resistored in desired blocks in the mark panel 252. The image data created by the paint processing can be stored as paint data on the memory card 4 in the menu mode, as described above, by selecting the second block from the bottom left of the menu 251 and executing the command allocated thereto.

Figure 37:
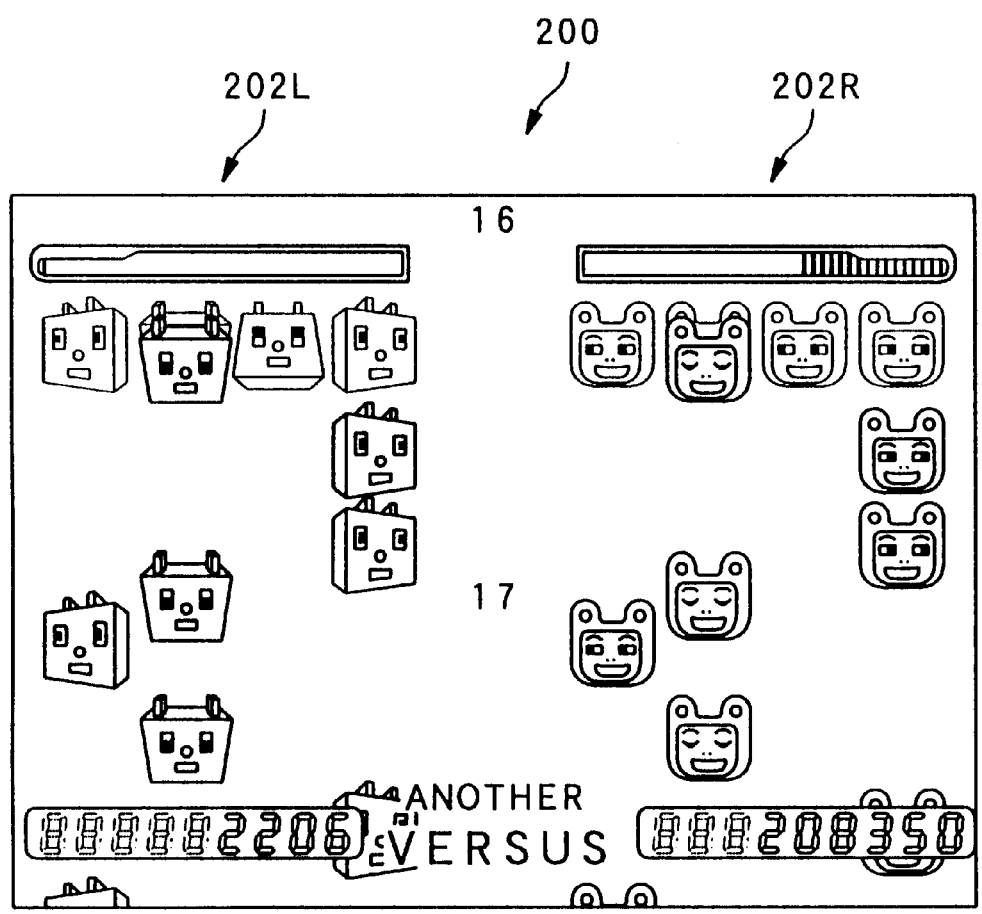
FIG. 37 is a diagram showing an example of a display of gauges using image data created in the paint processing of FIG. 32.

The paint data stored on the memory card 4 can be used in both the game device for business 2 and the game device for use at home 3. For example, in the game device for use at home 3, when "TRAINING" is selected from the menu screen 220 of FIG. 20, it is possible to search for paint data on the memory card 4 and, when paint data exists, ask the player whether he or she wishes to use it. When the player wishes to use the paint data, and the marks 203 and 204 can be displayed based on the objects identified by the paint data instead of those stored in the CD-ROM 7. The paint data can be similarly used in the game device for business 2 to display the marks 203 and 204 of the gauges 202. When using the paint data in the game device for business 2, the paint data need only be handled in the same way as the edit data in the processing of FIG. 17. FIG. 37 shows an example of the gauges 202 displayed using the paint data.

The present invention can be linked-up in other embodiments. For example, data edited by the game device for use at home and passed to the game device for business is not limited to timings for operating the operation members and marks displayed in the gauges, but various types of data used to guide the player's operations can be edited.

When the input device 30 and 112 are operated in compliance with commands from the gauges 202, performance effects such as punch sound and images may be generated. In this case, performance effect data for generating the performance effects is added to the data shown in FIG. 6, and may be edited by the player and used in the game device for business. Taking as an example case where punch sound is generated to the operation of the input device, sound source data for reproducing the punch sound, and punch sound allocation data for defining which operation defined by the timing data the effective sound is to be allocated to, are prepared, and the player is able to edit the effective sound allocation data so that the sounds desired by the player can be allocated.

Play history (such as the number of plays) in the game device for business 2 or the game device for use at home 3 can be stored on the memory card 4, and an image displayed on the game screen of the game device for business 2 or the game device for use at home 3 can be altered based on the stored records.

The present invention can also be applied to musical games other than dancing games, and to a game system for games other than musical games. That is, the concept to introduce hidden elements of another game in accordance with play results in one game can be applied to a game system for games in another genre. When executing games of different genres among multiple game devices linked together, link-ups relating to hidden elements can also be applied. The mediator for exchanging information between a pair of game devices need only be capable of being used in the game device for use at home 3, and may acceptably be replaced by a magnetic memory medium, a photomagnetic memory medium, or the like, as well as a semiconductor memory. A modem, a terminal adapter, and a dial-up router may be provided in both the game device for business 2 and the game device for use at home 3, enabling data to be exchanged between the game devices 2 and 3 via a specific server on the internet and intranet using a public telephone line.

The input devices are not limited to foot-operated devices, but manually-operated devices are acceptable. An input device imitating a variety of instruments, such as keyboards, guitars, drums, and the like, may be provided. An operation may be specified to the player by supplying a selection command relating to the selection of a target for an operation for specifying which of multiple operation members should be operated, and a command relating to the operation timing of the specified operation member. The operation members may be divided into those which are selectively operated, and those which are operated in compliance with specified timings. For example, when using a guitar-type input device, the player may be guided by commands relating to the selection of the guitar frets, and commands relating to timings of the picking operations executed in correspondence with the fret operations.

As explained above, according to the present invention, in a game executed on the first game device, the second game device judges only whether or not predetermined conditions have been satisfied and changes the contents of its game accordingly. This eases the restrictions on the development schedule of the games to be linked, and enables multiple game devices to be linked flexibly and easily. Consequently, data link-up between multiple game devices can be better realized. In particular, when software is transplanted between a game device for business and a game device for use at home, link-up can be achieved flexibly and easily, and the player can be provided with new ways of playing not possible in a single game, increasing his or her enjoyment of the game.

Furthermore, when applied to a musical game, new types of link-up not previously present can be realized by controlling the appearance of an edit mode for editing data representing specific tunes and operation commands by linking them up. Moreover, by transmitting information relating to edited timing data between the game devices, approximately the same play environment can be provided even when the hardware environments are different, as for example in the case of a game device for business and a game device for use at home, attracting the player's interest equally in either game device, and thereby increasing their relative values. Moreover, evaluations of game results, messages and the like can be sent from the game device for business to the game device for use at home, increasing the elements realized by link-up.

What is claimed is:

1. A game system comprising:

first and second game devices for executing games in compliance with predetermined programs, the first and second game devices being arranged to enable information to be exchanged between the first and second game devices, the first game device comprising an information output device for outputting judgement information for judging whether predetermined conditions have been satisfied in a game executed on the first game device; and the second game device comprising a game content controller for changing the content of the game executed on the second game device based on the judgement information output from the first game device, the game content controller comprising:

a judging device for judging whether permission has been given for a predetermined hidden element to appear in the game, based on the judgement information; and a hidden element controller for making a hidden element appear in the game when permission has been given, and prohibit the appearance of the hidden element when permission has not been given.

2. The game system according to claim 1, wherein the information output device in the first game device outputs after setting permission for the judgement information when the play result of the game is equal to or greater than a fixed standard, and setting no permission for the judgement information when the play result of the game is below the fixed standard; and the judging device in the second game device judges that an appearance of the hidden element has been permitted when the judgement information is permitted, and judges that an appearance of the hidden element has not been permitted when the judgement information is not permitted.

3. The game system according to claim 1, wherein the second game device further comprises:

an input device as devices for executing the game having at least one operation member for outputting a signal in correspondence with an operation state of the at least one operation member;

a memory device for the game for storing music data for reproducing a plurality of tunes and guide data for each of the tunes required for guiding the operations of the input device in correspondence with tunes reproduced based on the music data;

a tune selector for selecting one tune from the plurality of tunes;

a music reproduction device for reproducing the selected tune based on music data corresponding to the selected tune; and an operation guide device for instructing a player to operate the input device in correspondence with the reproduction of the tune by the music reproduction device, based on guide data corresponding to the selected music data;

part of the plurality of tunes being set as the hidden elements; and when permission for appearance of the hidden element has been given, the hidden element controller enables the selector to select a tune set as the hidden element, and when permission for appearance of the hidden element has not been given, the hidden element controller does not enable the tune set as the hidden element to be selected.

4. The game system according to claim 1, wherein the second game device comprises as devices for executing the game:

an input device having at least one operation member for outputting a signal in correspondence with an operation state of the at least one operation member;

a memory device for the game for storing music data for reproducing a predetermined tune and guide data required for guiding the operations of the input device in correspondence with tunes reproduced based on the music data;

a music reproduction device for reproducing the predetermined tune based on the music data stored in the memory device for game; and an operation guide device for instructing a player to operate the input device in correspondence with the reproduction of the tune by the music reproduction device, based on the guide data stored in the memory device for game;

the second game device further comprising:

a mode selector for selecting one mode from a plurality of modes comprising an edit mode set as hidden elements;

a create device for creating the guide data in accordance with an operation of the input device when the edit mode has been selected; and when permission for appearance of the hidden element has been given, the hidden element controller enables the selector to select the edit mode, and when permission for appearance of the hidden element has not been given, the hidden element controller does not enable the edit mode to be selected.

5. The game system according to claim 4, wherein the second game device further comprises as devices for executing the game:

an input device having at least one operation member for outputting a signal in correspondence with an operation state of the at least one operation member;

a memory device for the game for storing music data for reproducing the same tune as that reproduced by the music reproducing device of the second game device and guide data required for guiding the operations of the input device in correspondence with tunes reproduced based on the music data;

a music reproduction device for reproducing the tune based on the music data stored in the memory device for the game; and an operation guide device for instructing a player to operate the input device in correspondence with the reproduction of the tune by the music reproduction device, based on the guide data stored in the memory device for game; and information for identifying content of guide data created by the create device can be transmitted from the second game device to the first game device, and the operation guide device of the first game device can specify operations to the player based on the transmitted information.

6. The game system according to claim 4, wherein the guide data comprises timing data defining timings for operating the at least one operation member of the input device, and the create device can create the timing data.

7. A game system comprising first and second game devices for executing games in compliance with predetermined programs, it being possible to exchange information between the game devices, the first and second game devices respectively comprising as devices for executing the games:

an input device having at least one operation member for outputting a signal in correspondence with an operation state of the at least one operation member;

a memory device for the game for storing music data for reproducing the same tunes on the first game device and the second game device respectively, and guide data required for guiding the operations of the input device in correspondence with tunes reproduced based on the music data;

a music reproduction device for reproducing a tune based on the music data stored in the memory device for the game; and an operation guide device for displaying to a player operations of the input device in correspondence with the reproduction of the tune by the music reproduction device, based on the guide data stored in the memory device for game;

the second game device comprising:

a create device for creating the guide data in accordance with an operation of the input device, and an information output device for outputting information for identifying the contents of the created guide data; and the operation guide device of the first game device being capable of specifying operations to the player based on information for identifying the contents of the created guide data output from the second game device.

8. The game system according to claim 7, further comprising a memory device for link-up, functioning as a medium for exchanging information between the first game device and the second game device, information for identifying the contents of the guide data being transmitted from the second game device to the first game device via the memory device for link-up.

9. The game system according to claim 7, wherein information for identifying the contents of the guide data is transmitted via a predetermined communications device from the second game device to the first game device.

10. The game system according to claim 7, wherein the guide data comprises timing data defining timings for operating the at least one operation member of the input device, and the create device can create the timing data.

11. The game system according to claim 7, wherein, when a timing at which the at least one operation member of the input device is to be operated has arrived, the operation guide device guides the operation by relatively moving a predetermined indicator to a predetermined position in a game screen and displaying it at that position.

12. The game system according to claim 11, wherein the create device sets a period in which the indicator reaches the predetermined position in accordance with an operation of the input device.

13. The game system according to claim 11, wherein the guide data comprises image data required to display the indicator, and the create device may be able to create the image data required to display the indicator.

14. A game system comprising first and second game devices for executing games in compliance with predetermined programs, and a memory device for link-up functioning as a medium for exchanging information between these game devices;
the first game device comprising an information memory device for storing announcement information in the memory device constituting a notification to be provided to the player; and
the second game device comprising a display device and an information display device for reading the announcement information stored in the memory device and displaying it on a screen of the display device to enable the player to be notified of desired information.

15. The game system according to claim 14, the first game device further comprising an information input means for inputting the announcement information.

16. The game system according to claim 15, wherein the information input means are arranged to enable the input of textual information.

17. The game system according to one of claims 14 and 15, wherein the first game device and the second game device execute practically identical games, and the announcement information comprises information corresponding to play results of the first game device.

18. The game system according to one of claims 14 and 15, wherein the first game device and the second game device each comprise the following devices for executing games:
an input device having at least one operation member for outputting a signal in correspondence with an operation state of the at least one operation member;
a memory device for a game in which are stored music data for reproducing a plurality of tunes, and guide data for each of the tunes required for guiding the operations of the input device in correspondence with tunes reproduced based on the music data;
a tune selector for selecting one tune from the plurality of tunes;
a music reproduction device for reproducing the selected tune based on the music data corresponding to the selected tune;
an operation guide device for instructing a player to operate the input device in correspondence with the reproduction of the tune by the music reproduction device, based on guide data corresponding to the selected music data; and
an evaluation device for evaluating play contents of the player based on the deviation between the operations of the input device as specified by the operation guide device, and the player's actual operation of the input device;
the information memory device of the first game device being capable of storing information corresponding to the evaluation results of the evaluation device in the first game device as the announcement information in the memory device for link-up.

19. The game system according to claim 14, wherein the announcement information is information of the specification alterations relating to the first game device.

20. The game system according to claim 14, wherein the announcement information is an advertisement for individual shops where the first game device is installed.

21. The game system according to claim 14, wherein the announcement information is information about events.

22. A game system comprising first and second game devices for executing games in compliance with predetermined programs, capable of exchanging information between the game devices, wherein the first and second game devices each comprise the following devices for executing the games:
an input device having at least one operation member for outputting a signal in correspondence with an operation state of the at least one operation member;
a memory device for the game in which are stored music data for reproducing a plurality of tunes, and guide data for each of the tunes required for guiding the operations of the input device in correspondence with tunes reproduced based on the music data;
a tune selector for selecting one tune from the plurality of tunes;
a music reproduction device for reproducing the selected tune based on music data corresponding to the selected tune; and
an operation guide device for instructing a player to operate the input device in correspondence with the reproduction of the tune by the music reproduction device, based on guide data corresponding to the selected music data; and
an evaluation device for evaluating play contents of the player based on the deviation between the operations of the input device as specified by the operation guide device, and the player's actual operation of the input device;
the first game device comprising an information output device for outputting information corresponding to the evaluation results of the evaluation device provided in the first game device; and
the second game device comprising an information display device for displaying the evaluation results of the evaluation device in the first game device on a display device in the second game device, based on information corresponding to the evaluation results output from the first game device.

23. The game system according to one of claims 14 to 15 or 22, wherein the first game device comprises a game device for business, and the second game device comprises a game device for use at home.

24. A game device for executing a game in compliance with a predetermined program and exchanging information with another game device, comprising:
an information detector detecting judgement information for judging whether predetermined conditions have been satisfied in a game executed in the other game device and output from the other game device; and
a game content controller for changing the contents of a game executed by the game device itself based on the detected judgement information, the game content controller comprising:
  a judging device for judging whether permission has been given for a predetermined hidden element to appear in the game based on the judgement information; and
  a hidden element controller for making a hidden element appear in the game when permission has been given, and prohibiting the appearance of the hidden element when permission has not been given.

25. The game device according to claim 24, further comprising:
  an input device having at least one operation member for outputting a signal in correspondence with an operation state of the at least one operation member;
  a memory device for the game in which are stored music data for reproducing a plurality of tunes, and guide data for each tune required for guiding the operations of the input device in correspondence with tunes reproduced based on the music data;
  a tune selector for selecting one tune from the plurality of tunes;
  a music reproduction device for reproducing the selected tune based on music data corresponding to the selected tune; and
  an operation guide device for instructing a player to operate the input device in correspondence with the reproduction of the tune by the music reproduction device, based on guide data corresponding to the selected music data;
  part of the plurality of tunes being set as the hidden elements; and
  when permission for appearance has been given, the hidden element controller enables the selector to select a tune set as the hidden element, and when permission for appearance has not been given, the hidden element controller does not enable the tune set as the hidden element to be selected.

26. The game device according to claim 24, further comprising:
  an input device having at least one operation member for outputting a signal in correspondence with an operation state of the at least one operation member;
  a memory device for the game for storing music data for reproducing a predetermined tune and guide data for each tune required for guiding the operations of the input device in correspondence with tunes reproduced based on the music data stored in the memory device for the game;
  a music reproduction device for reproducing the predetermined tune based on music data stored in the memory device for the game; and
  an operation guide device for instructing a player to operate the input device in correspondence with the reproduction of the tune by the music reproduction device, based on the guide data stored in the memory device for the game;
  a mode selector for selecting one mode from a plurality of modes comprising an edit mode set as hidden elements;
  a create device for creating the guide data in accordance with an operation of the input device when the edit mode has been selected; and
  when permission for appearance of the hidden element has been given, the hidden element controller enables the selector to select the edit mode, and when permission for appearance of the hidden element has not been given, the hidden element controller does not enable the edit mode to be selected.

27. The game device according to claim 26, wherein the guide data comprises timing data defining timings for operating the at least one operation member of the input device, and the create device can create the timing data.

28. A game device capable of executing a game in compliance with a predetermined program and exchanging information with another game device, comprising:
  an input device having at least one operation member for outputting a signal in correspondence with an operation state of the at least one operation member;
  a memory device for the game for storing music data for reproducing a predetermined tune and guide data required for guiding the operations of the input device in correspondence with tune reproduced based on the music data;
  a music reproduction device for reproducing the tune based on the music data stored in the memory device for the game; and
  an operation guide device for instructing a player to operate the input device in correspondence with the reproduction of the tune by the music reproduction device, based on the guide data stored in the memory device for the game; and
  an information receiver for receiving information for identifying contents of guide data corresponding to the predetermined tune prepared by the other game device;
  the operation guide device being capable of specifying operations to the player based on the information received by the information receiver.

29. The game device according to claim 28, wherein the guide data comprises timing data defining timings for operating the at least one operation member of the input device, and the information receiver receives information for identifying the contents of the timing data.

30. The game device according to claim 28, wherein, when a timing at which the at least one operation member of the input device is to be operated has arrived, the operation guide device guides the operation by relatively moving a predetermined indicator to a predetermined position in a game screen and displaying it at that position.

31. The game device according to claim 30, wherein the information receiver receives information relating to a time period in which the indicator reaches the predetermined position, as the information for identifying contents of the guide data.

32. The game device according to claim 30, wherein the guide data comprises image data required for displaying the indicator, and the information receiver receives the image data required for displaying the indicator as information for identifying the content of the guide data.

33. A game device comprising:
  an input device having at least one operation member for outputting a signal in correspondence with an operation state of the at least one operation member;
  a memory device for the game for storing music data for reproducing predetermined tunes and guide data for each of the tunes required for guiding operations of the input device in correspondence with the tune reproduced based on the music data;
  a music reproduction device for reproducing the tune based on music data stored in the memory device for the game;
  an operation guide device for instructing a player to operate the input device in correspondence with the reproduction of the tune by the music reproduction device, based on the guide data stored in the memory device for the game;

a create device for creating the guide data in accordance with an operation of the input device; and an information output device for outputting information for specifying the content of the created guide data;

the operation guide device guiding the operation by relatively moving a predetermined indicator to a predetermined position in a game screen and displaying it at that position, when a timing at which the at least one operation member of the input device is to be operated has arrived;

the guide data comprising image data required to display the indicator; and the create device being capable of creating the image data required to display the indicator.

34. A computer-readable memory medium in which are stored music data for reproducing a predetermined tune, guide data required for guiding operations of an input device of a game device in correspondence with tunes reproduced based on the music data, and a program for executing a musical game using the music data and the guide data on a computer of a game device, the program giving the computer functions of:

an information receiver for receiving information for identifying contents of guide data corresponding to the predetermined tune prepared by another game device; and an operation specifier for specifying to the player operations of the input device in correspondence with the reproduction of the predetermined tune, based on the information received by the information receiver.

35. A computer-readable memory medium in which are stored music data for reproducing a predetermined tune, guide data required for guiding operations of an input device of a game device in correspondence with tunes reproduced based on the music data, and a program for executing a musical game using the music data and the guide data on a computer of a game device, the program giving to the computer functions of:

a music reproduction device for reproducing the music based on the music data;

an operation guide device for instructing a player to operate the input device in correspondence with the reproduction of the tune by the music reproduction device, based on the guide data;

an evaluation device for evaluating play contents of the player based on the deviation between the operations of the input device as specified by the operation guide device, and the player's actual operation of the input device; and an information memory device for storing information corresponding to an evaluation result of the evaluation device in a memory device used in a game device for use at home, in a state readable by the game device for use at home.

36. A computer-readable memory medium in which are stored music data for reproducing a predetermined tune, guide data required for guiding operations of an input device of a game device in correspondence with tunes reproduced based on the music data, and a program for executing a musical game using the music data and the guide data on a computer of a game device, the program giving to the computer functions of:

a music reproduction device for reproducing the tune based on the music data;

an operation guide device for instructing a player to operate the input device in correspondence with the reproduction of the tune by the music reproduction device, based on the guide data;

a create device for creating the guide data in accordance with an operation of the input device;

the operation guide device guiding the operation by relatively moving a predetermined indicator to a predetermined position in a game screen and displaying it at that position, when a timing at which an operation member of the input device is to be operated has arrived;

the guide data comprising image data required to display the indicator; and the create device being capable of creating the image data required to display the indicator.

37. A game system comprising first and second game devices for executing games in compliance with predetermined programs, and capable of exchanging information between the game devices, the first and second game devices each comprising the following devices for executing the games:

an input device having at least one operation member for outputting a signal in correspondence with an operation state of the at least one operation member;

a memory device for the game for storing music data for reproducing predetermined tunes of the first game device and the second game device, and data for play created in correspondence with operations of the input device corresponding to the tunes reproduced based on the music data;

a music reproduction device for reproducing the tunes based on music data stored in the memory device for the game; and an operation guide device for instructing a player to operate the input device in correspondence with the reproduction of the tune by the music reproduction device, based on the data for play stored in the memory device for the game;

the second game device comprising a create device for creating the data for play in accordance with an operation of the input device, and an information output device for outputting information for identifying contents of the created data for play; and the first game device being capable of executing the game using the data for play output from the second game device.

38. The game system according to claim 37, wherein the data for play comprises data defining a performance effect to be generated in response to an operation of the input device, in correspondence with a command from the operation guide device being capable of creating the data defining the performance effect.

* * * * *